United States Patent [19]

Sano

[11] Patent Number: 5,863,105
[45] Date of Patent: Jan. 26, 1999

[54] TURN CONTROL APPARATUS FOR A MOTOR VEHICLE EQUIPPED WITH ANTISKID BRAKING SYSTEM

[75] Inventor: Yoshiaki Sano, Okazaki, Japan

[73] Assignee: Mitsubishi Jidosha Kogyo Kabushiki Kaisha, Tokyo, Japan

[21] Appl. No.: 677,604

[22] Filed: Jul. 5, 1996

[30]  Foreign Application Priority Data

Jul. 7, 1995  [JP]  Japan ................................ 7-171945

[51] Int. Cl.[6] ............................... B60T 8/04; B60T 8/60
[52] U.S. Cl. ........................................... 303/146; 303/140
[58] Field of Search ....................... 180/197; 303/116.1, 303/119.1, 121, 140, 146, 147, 148, 169, 186, 199; 364/15, 16, 23, 25

[56]  References Cited

U.S. PATENT DOCUMENTS

| | | | |
|---|---|---|---|
| 4,718,013 | 1/1988 | Kubo ........................................ | 303/195 |
| 5,117,934 | 6/1992 | Tsuyawa et al. ........................ | 180/197 |
| 5,124,921 | 6/1992 | Jonner et al. ..................... | 364/426.016 |
| 5,341,296 | 8/1994 | Yasuno et al. .......................... | 180/197 |
| 5,341,297 | 8/1994 | Zomotor et al. ................... | 364/426.03 |
| 5,344,224 | 9/1994 | Yasuno ................................... | 303/111 |
| 5,428,532 | 6/1995 | Yasuno ................................... | 180/197 |
| 5,455,770 | 10/1995 | Hadeler et al. . | |
| 5,470,136 | 11/1995 | Tozu et al. .............................. | 303/147 |
| 5,474,369 | 12/1995 | Inagaki et al. .......................... | 303/146 |
| 5,482,133 | 1/1996 | Iwata et al. ............................. | 303/140 |
| 5,560,690 | 10/1996 | Hattori et al. .......................... | 303/146 |
| 5,576,959 | 11/1996 | Hrovat et al. .......................... | 303/146 |
| 5,584,541 | 12/1996 | Sone et al. .............................. | 303/146 |
| 5,645,326 | 7/1997 | Sano ........................................ | 303/140 |
| 5,711,585 | 1/1998 | Tozu et al. .............................. | 303/146 |

FOREIGN PATENT DOCUMENTS

| | | |
|---|---|---|
| 4123235 | 11/1992 | Germany . |
| 4224073 | 1/1993 | Germany . |
| 4305155 | 8/1994 | Germany . |
| 3024528 | 2/1993 | Japan . |

*Primary Examiner*—Robert J. Oberleitner
*Assistant Examiner*—Chris Schwartz

[57] ABSTRACT

A turn control apparatus for a motor vehicle comprises an arithmetic operation section for acquiring a correction amount for the target slip ratio of a target wheel to be controlled based on the required yaw moment of the vehicle in a situation where an antiskid braking system (ABS) should be activated, a computing section for computing the target slip ratio upon reception of the correction amount from the arithmetic operation section, and a section for acquiring actuation modes and pulse widths for inlet and outlet valves for wheel brakes of the individual wheels, based on the target slip ratio when the ABS is in operation.

10 Claims, 49 Drawing Sheets

F I G. 22
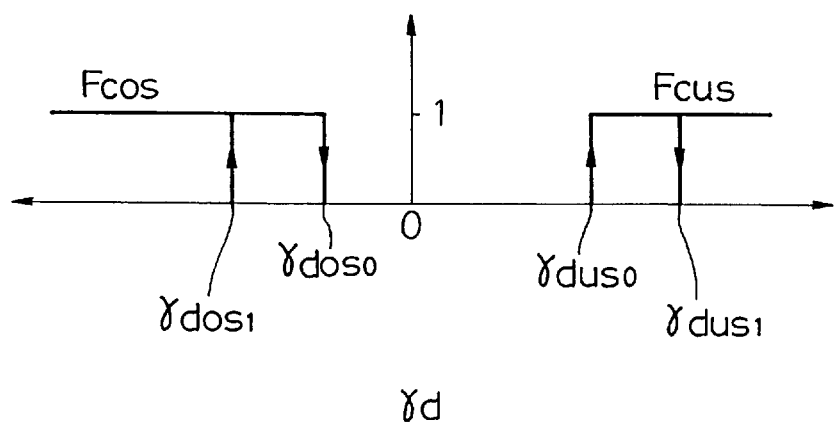

F I G. 27
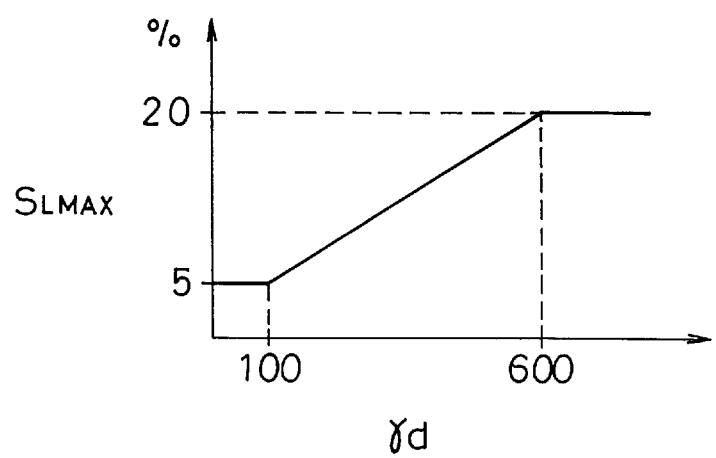

RIGHT-TURN OS + BRAKING

TURN CONTROL APPARATUS FOR A MOTOR VEHICLE EQUIPPED WITH ANTISKID BRAKING SYSTEM

BACKGROUND OF THE INVENTION

1. Field of the Invention

The present invention relates to a turn control apparatus for stabilizing the turning behavior of a motor vehicle when the vehicle makes a turn, and, more particularly, to a turn control apparatus for a motor vehicle, which has excellent cooperation with an antiskid braking system.

2. Description of the Related Art

This type of turn control apparatus for a motor vehicle is disclosed in, for example, Japanese Unexamined Patent Publication No. 5-24528. This known apparatus comprises detection means for detecting the steered angle of wheels; first speed detection means for detecting a vehicle speed; second speed detection means for detecting wheel speeds of the individual wheels; setting means for setting a target kinetic value of the vehicle based on the steered angle of the wheels and the vehicle speed; first computing means for computing a first target braking force for controlling the actual kinetic value of the vehicle to match the target kinetic value; second computing means for computing a second target braking force based on speeds of the right and left wheels and the vehicle speed to establish a predetermined slip to the wheels; and brake control means for selecting a smaller one of the first and second target braking forces as a final target braking force and controlling the actual braking forces of the right and left wheels of the vehicle independently of the final target braking force.

Specifically, when the first target braking force is selected as the final target braking force while a vehicle is turning, the known control apparatus controls the braking forces of the wheels or the yaw moment of the vehicle in such a way as to match the actual yaw rate of the vehicle with the target yaw rate. Consequently, the turning behavior of the vehicle while making a turn is stabilized. When the second target braking force is selected as the final target braking force, on the other hand, the known control apparatus controls the braking forces of the wheels in such a way that the actual slip coincides with the target slip. That is, the braking forces of the wheels are adjusted on the basis of the antiskid brake control.

According to the aforementioned known turn control apparatus, however, either the first target braking force or the second target braking force is simply selected as the final target braking force, so that the antiskid brake control does not work when the yaw moment of the vehicle is controlled, and the yaw moment control of the vehicle does not work when the antiskid brake control is effective.

SUMMARY OF THE INVENTION

Accordingly, it is a primary objective of the present invention to provide a turn control apparatus which can effectively stabilize the turning behavior of a motor vehicle in cooperation with antiskid brake control. To achieve this object, there is provided a turn control apparatus for a motor vehicle equipped with an antiskid braking system which comprises detection means for detecting a kinetic condition of the vehicle; computation means for computing a required control amount of braking force to be applied to a wheel to be controlled in order to control a yaw moment of the vehicle; correction means for correcting a target slip ratio of the wheel to be controlled based on the computed required control amount of the braking force in a situation where the antiskid braking system should be activated; and control execution means for activating the antiskid braking system based on the corrected target slip ratio.

According to this turn control apparatus, in a situation where the antiskid braking system should be activated, the target slip ratio of the wheel to be subjected to yaw moment control of the vehicle is corrected based on the computed required control amount. Therefore, the yaw moment of the vehicle is controlled at the same time as the braking force of the vehicle is controlled by the antiskid braking system, with the result of an improved yaw response of the vehicle and the stable turning of the vehicle.

The detection means of the turn control apparatus may detect at least one of the driving condition of the vehicle and the behavior of the vehicle as the kinetic condition of the vehicle.

The correction means of the turn control apparatus increases the target slip ratio of the wheel when the braking force applied to the wheel should be increased, in accordance with the yaw moment control of the vehicle. This makes the antiskid braking system unlikely to work on the wheel, and as a result the yaw moment control of the vehicle can work effectively.

In addition, the correction means decreases the target slip ratio of the wheel when braking force should be decreased. Thus, the antiskid braking system becomes liable to work on the wheel to be controlled. In this case, the yaw moment control of the vehicle also work effectively.

It is preferable that the correction means should correct the target slip ratio of the wheel to be controlled when the required control amount becomes equal to or greater than a predetermined value. In this case, the turn control apparatus may further include forcible alteration means for causing a control output from yaw moment control means to override a control output from the control execution means with respect to the wheel to be controlled only at the moment of initiation of the correction performed by the correction means. When the antiskid braking system is activated, therefore, the slip ratio of the wheel to be controlled is controlled to promptly approach the corrected target slip ratio. This improves the response of the braking force control by the antiskid braking system.

When the turn control apparatus has the forcible alteration means, it is preferable that the correction means should correct the target slip ratio of the wheel to be controlled, before the braking force of the wheel to be controlled, is controlled by the control execution means. In this case, even when the antiskid braking system works on the wheel to be controlled, the turning behavior of the vehicle does not rapidly change and the yaw moment of the vehicle is effectively controlled.

When the computation means of the turn control apparatus has computed the required control amount to give a turning moment to the vehicle, the correction means corrects the target slip ratio in such a way as to decrease the braking force of the outside front wheel as viewed in the turning direction of the vehicle and increase the braking force of the inside rear wheel. When the computation means of the turn control apparatus has computed the required control amount to apply a restoration moment to the vehicle, the correction means corrects the target slip ratio of the wheel to be controlled in such a way as to increase the braking force of the inside front wheel as viewed in the turning direction of the vehicle and decrease the braking forces of the right and left rear wheels. In this case, when the vehicle is requesting the restoration moment while the antiskid braking system is working, the braking forces of the inside front wheel and the right and left rear wheels are controlled so that the yaw moment control of the vehicle is effectively executed.

The turn control apparatus further includes yaw moment control means for controlling the braking force of the wheel to be controlled based on the required control amount when the antiskid braking system is not activated. In this case, even when the antiskid braking system is not activated, the yaw moment of the vehicle is controlled in accordance with the kinetic condition of the vehicle, thus stabilizing the turning behavior of the vehicle.

It is preferable that the computation means of the turn control apparatus should compute the required control amount based on at least one of a difference between the target yaw rate of the vehicle and the actual yaw rate of the vehicle and a time derivative of the difference. In this case, the required control amount can be computed accurately to improve the reliability of the control.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 22 is a graph depicting the standards for setting a control execution flag;

FIG. 27 is a graph showing the relationship between the required yaw moment and an allowable slip ratio;

DETAILED DESCRIPTION OF THE PREFERRED EMBODIMENTS

Figure 1:
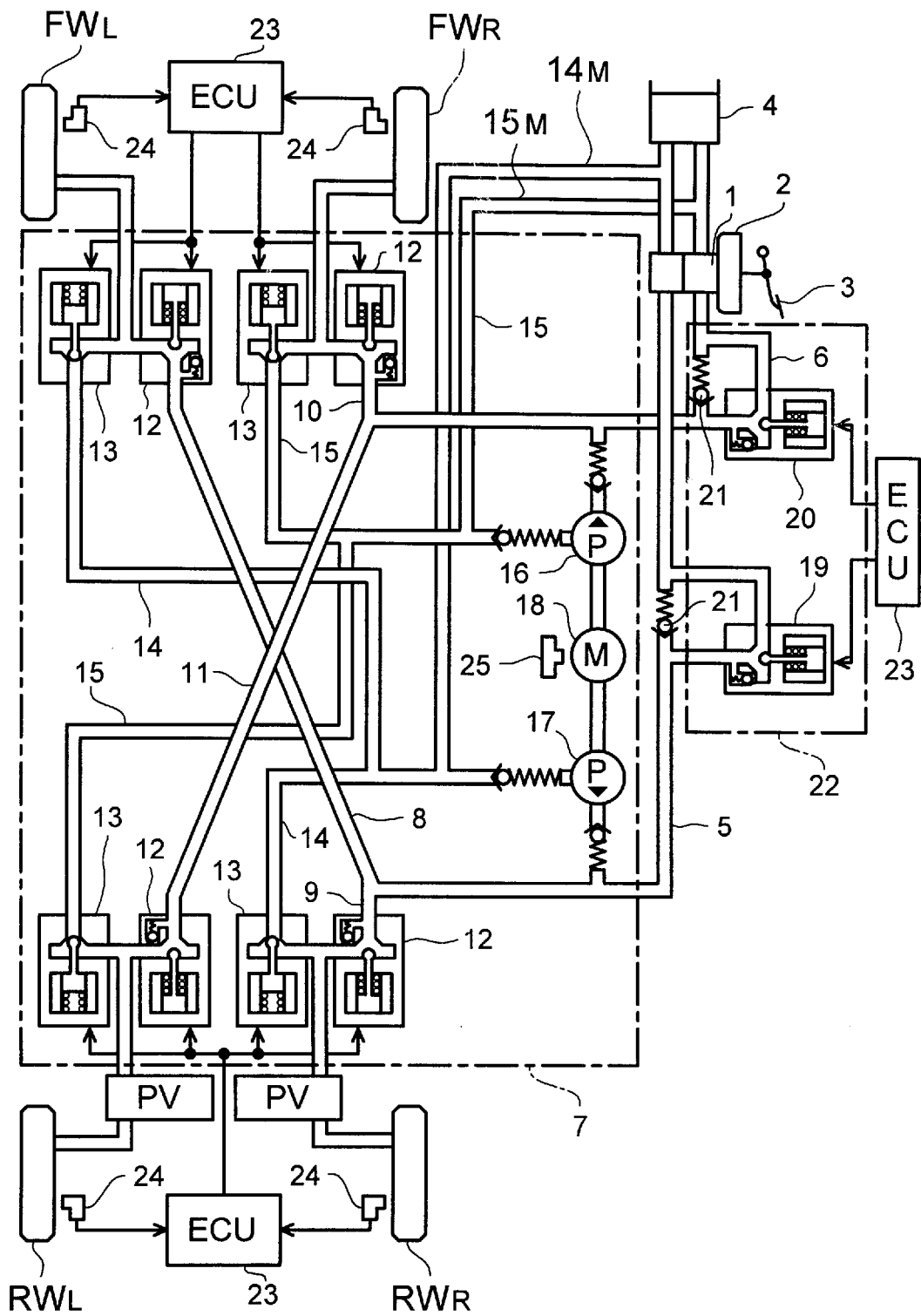
FIG. 1 is a schematic diagram of a braking system which execute yaw moment control and antiskid brake control of a vehicle.

FIG. 1 schematically illustrates a braking system for a motor vehicle. This braking system includes a tandem-type master cylinder 1 which is connected to a brake pedal 3 through a vacuum brake booster 2. The master cylinder 1 has a pair of pressure chambers connected to a reservoir 4. Two main brake lines 5 and 6 extend from the respective pressure chambers in the master cylinder 1 through a hydraulic unit (HU) 7. Inside the hydraulic unit 7, each of the main brake lines 5 and 6 diverges into a pair of branch brake lines.

Branch brake lines 8 and 9 diverging from the main brake line 5 are connected, respectively, to wheel brakes (not shown) of a left front wheel $FW_L$ and a right rear wheel $RW_R$ of the vehicle. Branch brake lines 10 and 11, which diverge from the other main brake line 6, are connected respectively to wheel brakes (not shown) of a right front wheel $FW_R$ and a left rear wheel RWL. Namely, the wheel brakes associated with the respective wheels of the vehicle are connected to the tandem master cylinder 1 via cross-piping type brake lines.

A solenoid valve unit is inserted in each of the branch brake lines 8 to 11 and comprises an inlet valve 12 and an outlet valve 13. A proportional valve (PV) is inserted between the wheel brake of each rear wheel and the inlet valve 12 of the associated solenoid valve unit.

Branch return lines 14 extend from the outlet valves 13 of the solenoid valve units connected to the branch brake lines 8 and 9, respectively. These branch return lines 14 join together into a single main return line $14_M$, which is connected to the reservoir 4. Similarly, branch return lines 15 extend from the outlet valves 13 of the solenoid valve units connected to the branch brake lines 10 and 11, respectively. These branch return lines 15 join together into a single main return line $15_M$, which is connected to the reservoir 4. Consequently, the brake pressures applied to the respective wheels (the pressures in the respective wheel brakes) can be controlled by opening/closing the inlet and outlet valves 12 and 13 of the corresponding solenoid valve units.

Pumps 16 and 17 are connected to the main brake lines 6 and 5, respectively, and a check valve is inserted between the discharge port of each pump 16, 17 and the corresponding main brake line 6, 5. These check valves permit pressure oil to flow only in the direction from the corresponding pumps to the respective main brake lines. The pumps 16 and 17 are coupled to a common motor 18, which drives the pumps 16 and 17 synchronously with each other. The suction ports of the pumps 16 and 17 are connected to the aforementioned main return lines $15_M$ and $14_M$ through check valves, respectively.

Cutoff valves 19 and 20, each comprising a solenoid valve, are inserted in the respective main brake lines 5 and 6 at locations upstream of the corresponding pumps 17 and 16. The main brake lines 5 and 6 are further provided with bypass lines bypassing the cutoff valves 19 and 20, respectively, and each bypass line is provided with a relief valve 21. The cutoff valves 19 and 20 constitute a cutoff valve unit (CVU) 22.

The aforementioned inlet and outlet valves 12 and 13 of each solenoid valves unit, the cutoff valves 19 and 20, and the motor 18 are electrically connected to an electronic control unit (ECU) 23. More specifically, the ECU 23 includes a microprocessor, storage devices such as RAM and ROM, input interfaces, output interfaces, etc., and the valves 12, 13, 19 and 20 and the motor 18 are electrically connected to the respective output interfaces. Electrically connected to the input interfaces of the ECU 23 are wheel speed sensors 24 mounted to the respective wheels, and a rotational speed sensor 25 for detecting the rotational speed of the motor 18. For the simplicity of illustration, the connection between the motor 18 and the ECU 23 and that between the rotational speed sensor 25 and the ECU 23 are omitted in FIG. 1.

Figure 2:
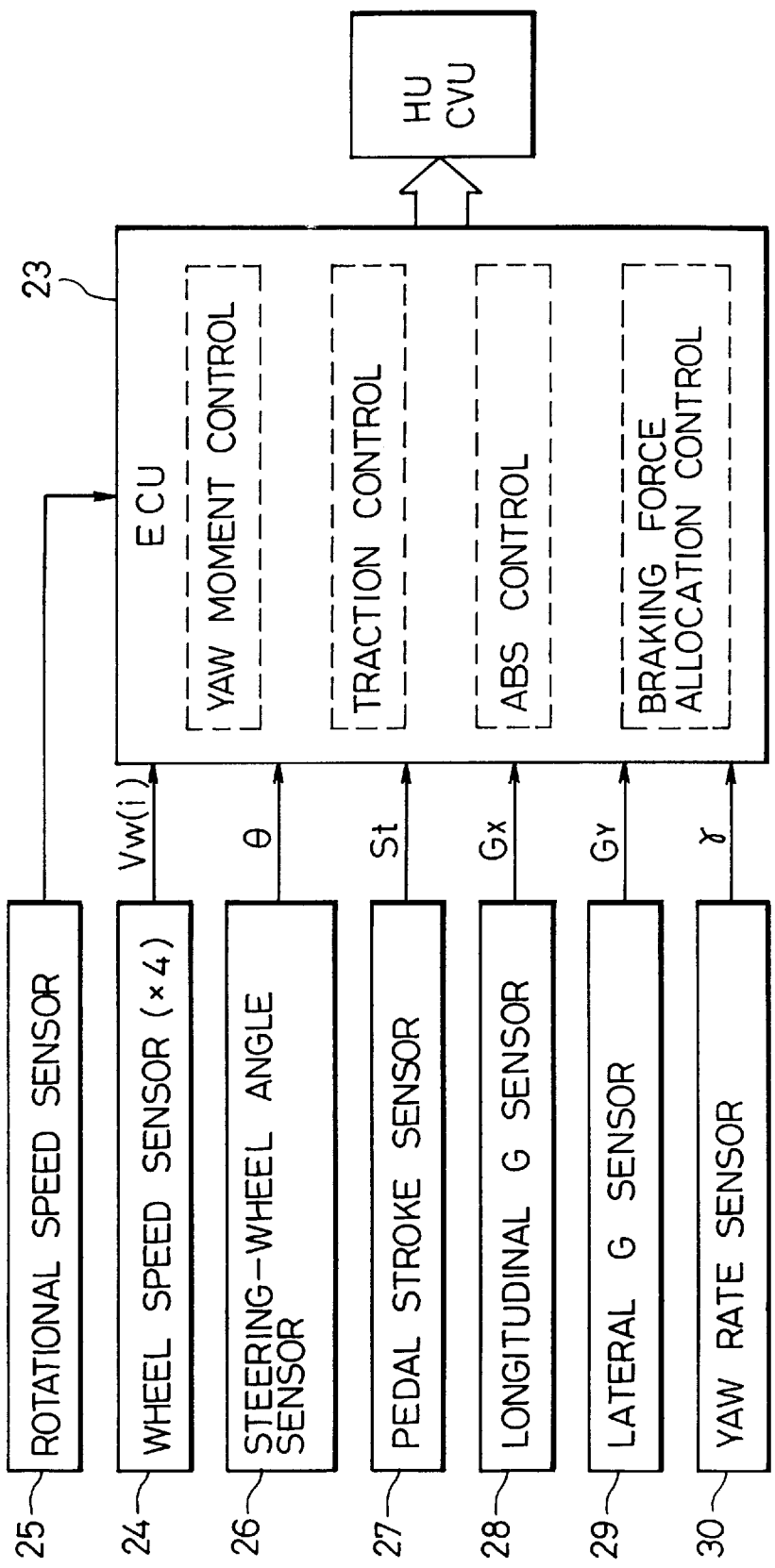
FIG. 2 is a diagram showing the connection of various sensors and HU (Hydraulic Unit) to an ECU (Electronic Control Unit) in the braking system in FIG. 1.

As shown in FIG. 2, in addition to the wheel speed sensors 24 and the rotational speed sensor 25, a steering-wheel angle sensor 26, a pedal stroke sensor 27, a longitudinal acceleration sensor (longitudinal G sensor) 28, a lateral acceleration sensor (lateral G sensor) 29, and a yaw rate sensor 30 are electrically connected to the input interfaces of the ECU 23. The steering-wheel angle sensor 26 detects the steered angle of the steering wheel of the vehicle, namely, the steering-wheel angle. The pedal stroke sensor 27 detects the depth of depression of the brake pedal 3 of the vehicle, that is the pedal stroke. The longitudinal and lateral G sensors 28 and 29 detect the longitudinal and lateral accelerations in the longitudinal and lateral directions of the vehicle, respectively. The yaw rate sensor 30 detects the angular velocity around the vertical axis of the vehicle, namely, the angular velocity of yaw.

The ECU 23 receives the output signals from the aforementioned various sensors, and controls the operations of the HU 7 and CVC 22 in accordance with these output signals and various kinetic controls for the vehicle. As shown inside the block of the ECU 23 in FIG.2, the kinetic controls for the vehicle include yaw moment control, traction control, antiskid braking system control (ABS control), and braking force allocation control for the front and rear wheels.

Figure 3:
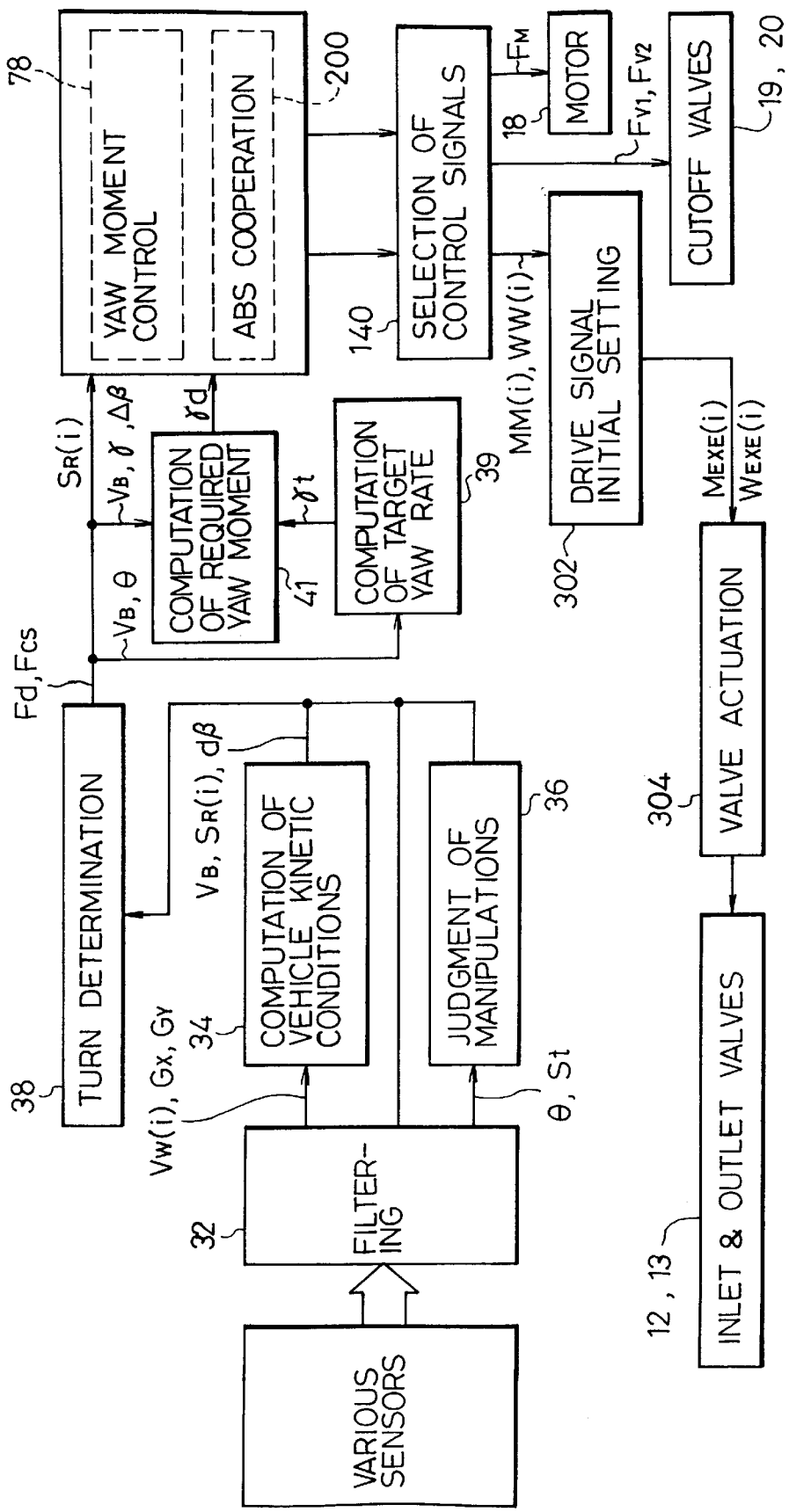
FIG. 3 is a functional block diagram used for explaining the schematic functions of the ECU.
Figure 4:
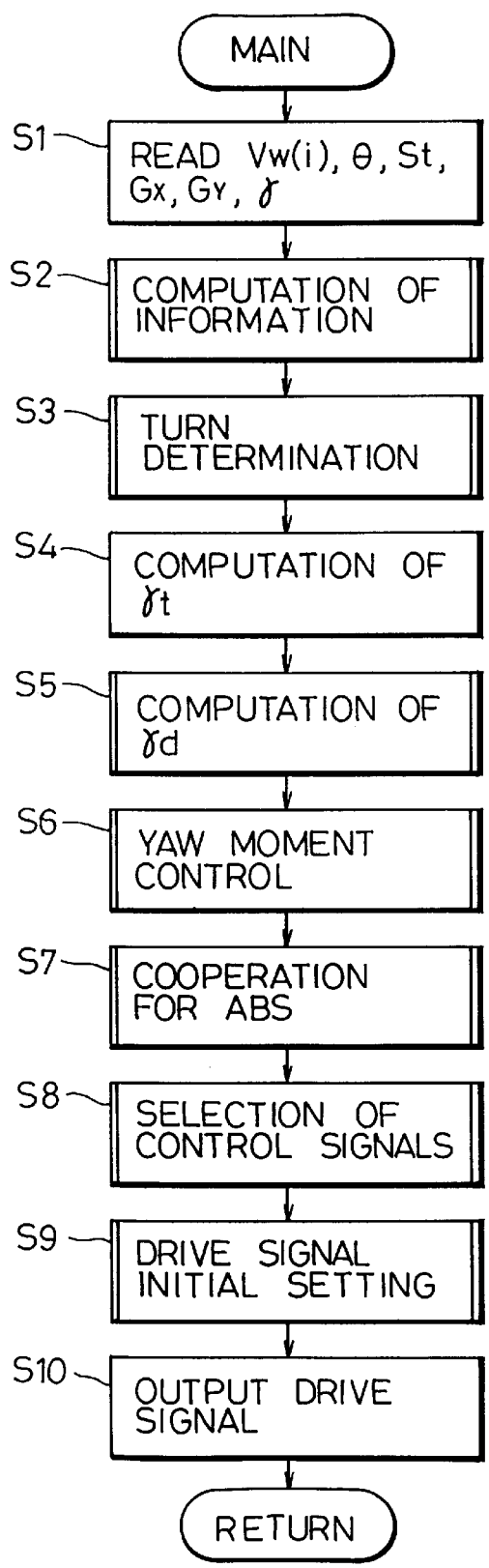
FIG. 4 is a flowchart illustrating a main routine to be executed by the ECU.

FIG. 3 is a block diagram illustrating the yaw moment control, among the various functions of the ECU 23, and FIG. 4 shows a main routine associated with this control. The control period T for the main loop is set to 8 msec, for example.

When supplied with the output signals from the aforementioned various sensors, the ECU 23 first subjects the output signals, i.e., sensor signals, to a filtering process therein (block 32 in FIG. 3). This filtering process uses a recursive primary low-pass filter. Incidentally, a recursive primary low-pass filter is also used in the filtering processes described later, unless otherwise specified.

Subsequently, the ECU 23 reads the filtered sensor signals, i.e., wheel speeds $V_W(i)$, steering-wheel angle $\theta$, pedal stroke $S_t$, longitudinal acceleration $G_X$ (longitudinal $G_X$), lateral acceleration $G_Y$ (lateral $G_Y$) and yaw rate $\gamma$ (Step S1 in FIG. 4), and based on these sensor signals, computes information indicative of kinetic conditions of the vehicle and information for determining the driving operation by the driver (Step S2). Letter "i" in the wheel speed $V_W(i)$ represents individual numbers specifying the respective wheels of the vehicle. Namely, $V_W(1)$, $V_W(2)$, $V_W(3)$ and $V_W(4)$ respectively indicate the wheel speeds of the left front wheel, right front wheel, left rear wheel and right rear wheel. In the following description, reference symbol (i) is also used to denote the similar meaning.

In FIG. 3, Step S2 is executed in computation blocks 34 and 36. Specifically, in the computation block 34, the kinetic conditions of the vehicle are computed based on the wheel speeds $V_W(i)$, longitudinal $G_X$, lateral $G_Y$ and yaw rate $\gamma$. In the computation block 36, the driver's operating or manipulating conditions of the steering wheel and the brake pedal are determined based on the steering-wheel angle $\theta$ and the pedal stroke $S_t$.

The following explains in detail the kinetic conditions of the vehicle and the driver's operating conditions.

Kinetic Conditions of Vehicle

A: Reference Wheel Speed

First, in the ECU 23, a reference wheel speed $V_S$ is selected from among the wheel speeds $V_W(i)$. At this time, for the reference wheel speed $V_S$, the speed $V_W$ of the wheel which is less affected by a slip in association with wheel braking force control is selected. Specifically, when no braking is applied to the vehicle, the higher $V_W$ of the speeds of the undriven wheels is selected as the reference wheel speed $V_S$. When braking is applied to the vehicle, on the other hand, the highest $V_W$ of the wheel speeds $V_W(i)$ is selected as the reference wheel speed $V_S$. In this connection, the ECU 23 determines based on a brake flag Fb whether the vehicle is being braked or not, as described later.

B: Vehicle Body Speed

Subsequently, the ECU 23 computes the speed of the center of gravity of the vehicle based on the reference wheel speed $V_S$, and then determines the vehicle body speed $V_B$ based on this center-of-gravity speed. The computation of the center-of-gravity speed is executed taking account of the speeds of the inside and outside wheels when the vehicle is turning as well as the ratio in speed between the front and rear wheels.

Specifically, provided that the front and rear treads of the vehicle are Tf and Tr, respectively, speed differences $\Delta V_{IF}$ and $\Delta V_{IR}$ between the inside and outside front wheels, i.e., the right and left front wheels, and between the inside and outside rear wheels, i.e., the right and left rear wheels, are each given as the product of the yaw rate $\gamma$ and the front and rear treads, respectively, as indicated by the following equations:

$$\Delta V_{IF} = \gamma \times Tf \quad (1)$$

$$\Delta V_{IR} = \gamma \times Tr \quad (2)$$

Therefore, an average of the speed differences of the right and left wheels of the vehicle as a whole, i.e., an average speed difference $\Delta V_{IA}$ between the inside and outside wheels, is given by the following equation:

$$\Delta V_{IA} = \gamma \times (Tf+Tr)/2 \quad (3)$$

Assuming that the center of turn of the vehicle lies on an extension line extending from the rear axle and also that the vehicle is turning to the right, speed ratios $R_{VR}$ and $R_{VL}$ between the front and rear right-side wheels and between the front and rear left-side wheels are given by the following equations:

$$R_{VR} = \cos(\delta) \quad (4)$$

$$R_{VL} \approx \cos(\delta) \quad (5)$$

Thus, the speed ratio $R_V$ between the front and rear wheels is represented by $\cos(\delta)$, regardless of whether the wheels in question are on the right or left side of the vehicle. Symbol $\delta$ denotes the front-wheel steered angle (steering-wheel angle/steering gear ratio).

The equations (4) and (5), however, hold true only when the vehicle travels at low speed (more precisely, when the lateral $G_Y$ is small). Accordingly, the computation of the speed ratios $R_V$ according to the equations (4) and (5) is performed only when the vehicle body speed $V_{BM}$ is low as indicated by the following equation:

$$R_V = \cos(\delta) \text{ when } V_{BM} < 30 \text{ km/h} \quad (6)$$

When the vehicle body speed $V_{BM}$ is relatively high, the speed ratios $R_V$ are set to a fixed value according to the equation shown below:

$$R_V = 1 \text{ when } V_{BM} \geq 30 \text{ km/h} \quad (7)$$

Here, $V_{BM}$ indicates the vehicle body speed $V_B$ computed during the previous execution of the main routine. The computation of the vehicle body speed $V_B$ will be described later.

In the case where the vehicle is a front engine-front drive (FF) type, the reference wheel speed $V_S$ follows the speed of the outside rear wheel when the vehicle turns with no brakes applied. In this case, the center-of-gravity speed of the vehicle is computed by subjecting the reference wheel speed $V_S$ to correction based on ½ of the average speed difference $\Delta V_{IA}$ between the inside and outside wheels and to correction based on a speed difference between the rear axle speed and the center-of-gravity speed. Since computing the center-of-gravity speed in this manner is complicated, the center-of-gravity speed is defined as a mean value between the speeds of the front and rear axles, whereby a center-of-gravity speed $V_{CGO}$ before the filtering process can be computed by the following equation:

$$V_{CGO}=(V_S-\Delta V_{IA}/2)\times(1+(1/R_V))/2 \tag{8}$$

On the other hand, when the vehicle turns while being braked, the reference wheel speed $V_S$ is considered to follow the speed of the outside front wheel. In this case, the center-of-gravity speed $V_{CGO}$ before the filtering process is computed by subjecting the reference wheel speed $V_S$ to correction based on ½ of the average speed difference $\Delta V_{IA}$ between the inside and outside wheels and to correction based on the speed difference between the speed of the front axle and the center-of-gravity speed. Namely, the center-of-gravity speed $V_{CGO}$ is computed according to the following equation:

$$V_{CGO}=(V_S-\Delta V_{IA}/2)\times(1+R_V)/2 \tag{9}$$

Then, the center-of-gravity speed $V_{CGO}$ is subjected to two consecutive filtering processes ($f_C$=6 Hz), whereby a center-of-gravity speed $V_{CG}$ (=LPF(LPF($V_{CGO}$))) is obtained.

In calculating the center-of-gravity speed $V_{CG}$ of the vehicle, it is determined based on the brake flag Fb whether or not the vehicle is being braked.

Since the center-of-gravity speed $V_{CG}$ usually follows the vehicle body speed $V_B$, the former is set as the latter. Namely, the vehicle body speed $V_B$ is usually computed according to the following equation:

$$V_B=V_{CG} \tag{10}$$

However, in a situation where the reference wheel having the reference wheel speed $V_S$ shows a tendency to lock and thus the antiskid braking system (ABS) is about to initiate brake pressure control also for the reference wheel, the reference wheel speed $V_S$ greatly drops following slip of the reference wheel. That is, the reference wheel speed $V_S$ decreases to a value significantly smaller than the actual vehicle body speed.

In such a situation, the ECU 23 determines whether or not a predetermined dissociation condition based on the longitudinal $G_X$ is fulfilled. If the dissociation condition is met, the follow-up of the vehicle body speed $V_B$ with respect to the center-of-gravity speed $V_{CG}$ is terminated and the vehicle body speed $V_B$ is dissociated from the center-of-gravity speed $V_{CG}$. After the dissociation, the ECU 23 estimates the vehicle body speed $V_B$ on the assumption that the vehicle body speed $V_B$ decreases at a predetermined gradient.

Specifically, provided that the time derivative of the center-of-gravity speed $V_{CG}$ and a dissociation criterion value are $\Delta V_{CG}$ and $G_{XS}$, respectively, the vehicle body speed $V_B$ is dissociated from the center-of-gravity speed $V_{CG}$, i.e., the dissociation condition holds true, when the state expressed by $\Delta V_{CG} \leq G_{XS}$ continues for 50 msec or when the condition $\Delta V_{CG} \leq 1.4$ g (where g is the gravitational acceleration) is satisfied. The dissociation criterion value $G_{XS}$ is set according to the following equation:

$$G_{XS}=-(|G_X|+0.2)$$

where $-1.4\ g \leq G_{XS} \leq -0.35\ g$ \hfill (11)

When the above dissociation condition is fulfilled, the vehicle body speed $V_B$ is estimated according to the following equation:

$$V_B=V_{BM}-\Delta G \tag{12}$$

In the equation, $V_{BM}$ represents a vehicle body speed before the dissociation condition is met, and $\Delta G$ represents the gradient set according to the following equation:

$$\Delta G=(|G_X|+0.15)$$

where $-1.2\ g < \leq \Delta G \leq -0.3\ g$ \hfill (13)

The following equation shows a dissociation terminating condition wherein given that the ECU 23 has estimated the vehicle body speed $V_B$ as dissociated from the center-of-gravity speed $V_{CG}$, the vehicle body speed $V_B$ is again set followable to the center-of-gravity speed $V_{CG}$.

$$V_{CG}>V_{BM} \tag{14}$$

C: Slip Ratios of Wheels

Subsequently, the ECU 23 corrects the vehicle body speed $V_B$ based on the aforementioned average speed difference $\Delta V_{IA}$ and the speed ratios $R_V$, and computes reference body speeds $V_R(i)$ for the respective wheel positions. Specifically, the reference body speeds $V_R(i)$ are computed by the following equation:

$$V_R(i)=V_B\times 2/(1+R_V)+(\text{or }-)\Delta V_{IA}/2 \tag{15}$$

With regard to the positive/negative sign of the second term of equation (15), when the vehicle is turning to the right, the positive sign (+) is used to compute the reference body speeds for the outside wheels and the negative sign (−) is used to compute the reference body speeds for the inside wheels. When the vehicle is turning to the left, the positive and negative signs are used conversely with respect to the right and left sides of the vehicle.

Slip ratios $S_R(i)$ of the respective wheels are obtained by performing a computation according to the equation (16) shown below and then subjecting the computed values to a filtering process ($f_C$=10 Hz) as indicated by the equation (17).

$$S_{R0}(i)=(V_R(i)-V_W(i))/V_R(i) \tag{16}$$

$$S_R(i)=LPF(S_{R0}(i)) \tag{17}$$

In those equations, $S_{R0}(i)$ represents the slip ratio before the filtering process.

D: Center-of-Gravity Slip Angular Velocity

While the vehicle is turning, the relationship between the center-of-gravity slip angular velocity dβ and the yaw rate γ can be expressed by the following equation, where ω represents the angular velocity (revolving speed) of the vehicle around the center of the turn:

$$\gamma=d\beta(d\beta g/dt)+\omega \tag{18}$$

βg: center-of-gravity slip angle.

Assuming that the center-of-gravity slip angle βg is small, the following equation is established for the relationship between the vehicle body speed $V_B$ and the vehicle speed V:

$$V_B=V\times\cos(\beta g)=V \tag{19}$$

Also, the vehicle speed V and the lateral $G_Y$ satisfies the relationship indicated by the following equation:

$$G_Y = V \times \omega \qquad (20)$$

By eliminating $\omega$ and V from the above equations (18), (19) and (20), a center-of-gravity slip angular velocity $d\beta_0$ before the filtering process can be obtained according to the following equation:

$$d\beta_0 = \gamma - G_Y/V_B \qquad (21)$$

Thus, the center-of-gravity slip angular velocity $d\beta_0$ before the filtering process is computed by the ECU 23 according to equation (21).

The ECU 23 then subjects the center-of-gravity slip angular velocity $d\beta_0$ to a filtering process ($f_C=2$ HzO), as indicated by the following equation, to acquire a center-of-gravity slip angular velocity $d\beta$:

$$d\beta = LPF(d\beta_0) \qquad (22)$$

In order to make the center-of-gravity slip angular velocity $d\beta$ take a positive value on the understeer (US) side of the vehicle and a negative value on the oversteer (OS) side of the vehicle, regardless of the turning direction of the vehicle, when the vehicle is turning to the right, the computed center-of-gravity slip angular velocity $d\beta$ is multiplied by (−), thereby inverting the center-of-gravity slip angular velocity $d\beta$ between negativity and positivity.

When the vehicle is traveling at a low speed, i.e., when the condition $V_B<10$ km/h is met, the computation of the center-of-gravity slip angular velocity $d\beta$ is suspended in order to prevent operation overflow of the ECU 23, and the center-of-gravity slip angular velocity $d\beta$ is set to "0".

Driver's Operating (Manipulating) Conditions
E: Steering-Wheel Angular Velocity

Figure 5:
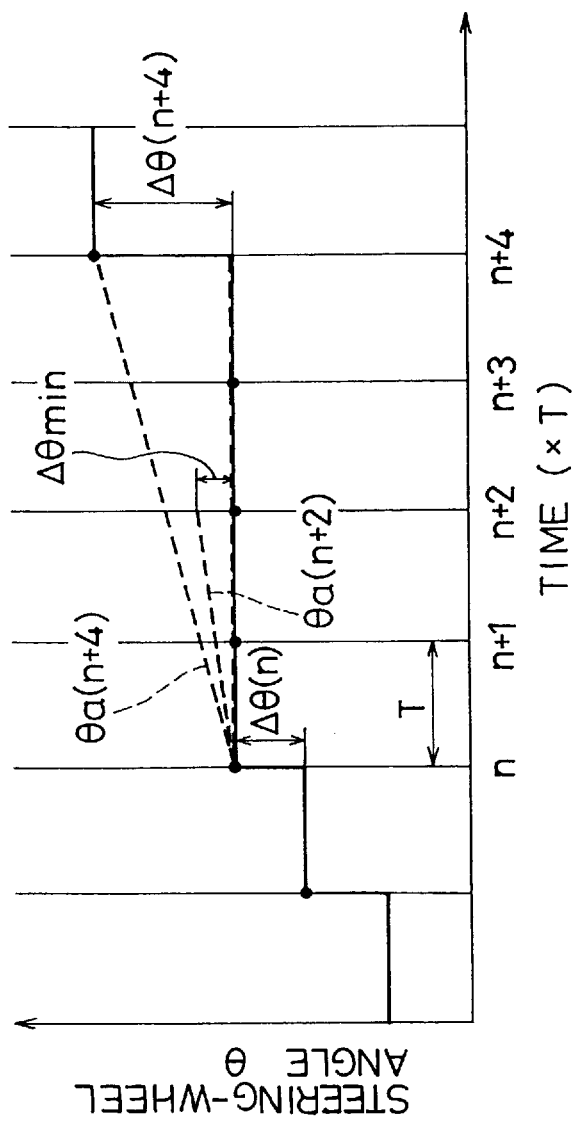
FIG. 5 is a graph showing a change in a steering-wheel angle θ with the passage of time when the steering wheel is manipulated.

It is assumed here that the steering-wheel angle $\theta$ has changed as shown in FIG. 5. When the steering-wheel angle $\theta$ has changed, its angular velocity $\theta_A$ can be obtained by dividing the amount of change in the steering-wheel angle $\theta$ by the time period required by the change. For example, when the steering-wheel angle $\theta$ changes by $\Delta\theta(n+4)$ at time $n+4$ with respect to reference time n as shown in FIG. 5, the steering-wheel angular velocity $\theta_{A0}(n+4)$ at the point of time $n+4$ is computed by the ECU 23 according to the following equation:

$$\theta_{A0}(n+4) = \Delta\theta(n+4)/(4 \times T) \qquad (23)$$

In the equation, "T" represents the control period of the main routine, as mentioned earlier.

In a situation where the steering-wheel angle $\theta$ remains unchanged, it is assumed that the steering-wheel angle $\theta$ changes by a minimum amount AOMIN in the same direction as that in which the steering-wheel angle $\theta$ changed last. In this case, the steering-wheel angular velocity $\theta_{A0}$ is obtained by dividing the minimum amount $\Delta\theta_{MIN}$ of change by the time period required by the change. For example, the steering-wheel angular velocity $\theta_{A0}(n+2)$ at the point of time $n+2$ is computed by the ECU 23 according to the following equation:

$$\theta_{A0}(n+2) = \Delta\theta_{MIN}/(2 \times T) \qquad (24)$$

Subsequently, the steering-wheel angular velocity $\theta_{A0}$ is subjected to a filtering process ($f_C=2$ Hz), as indicated by the following equation, to obtain a steering-wheel angular velocity $\theta_A$.

$$\theta_A = LPF(\theta_{A0}) \qquad (25)$$

F: Effective Value of Steering-Wheel Angular Velocity

The ECU 23 subjects the absolute value of the steering-wheel angular velocity $\theta_A$ to a filtering process, as indicated by the following equation, to thereby obtain an effective value $\theta_{AE}$ of steering-wheel angular velocity:

$$\theta_{AE} = LPF(|\theta_A|) \qquad (26)$$

The value of cutoff frequency $f_C$ employed in this filtering process varies depending on whether the steering-wheel angle $\theta$ shows a tendency to increase or decrease, i.e., depending on whether the steering-wheel angular velocity $\theta_A$ takes a positive or negative value. For example, when the steering-wheel angular velocity $\theta_A$ takes a positive value, $f_C$ is set to 20 Hz; on the other hand, when the steering-wheel angular velocity $\theta_A$ takes a negative value, $f_C$ is set to 0.32 Hz.

G: Brake Pedal Stroke Speed

The ECU 23 subjects the difference, or the time derivative, of the pedal stroke $S_t$ to a filtering process ($f_C=1$ Hz), as indicated by the following equation, to thereby obtain a pedal stroke speed $V_{ST}$:

$$V_{ST} = LPF(S_t(n) - S_t(n-1)) \qquad (27)$$

In the equation, $S_t(n-1)$ represents the pedal stroke obtained as the result of the execution of the preceding cycle of the main routine, and $S_t(n)$ represents the pedal stroke obtained through the execution of the present cycle of the main routine.

H: Brake Flag for Brake Pedal

Based on the pedal stroke St or the pedal stroke speed $V_{ST}$, the ECU 23 sets the aforementioned brake flag Fb in the following manner:

Fb=1, if the condition $S_t > S_{te}$ or $V_{ST} > 50$ mm/s is fulfilled;

Fb=0, if neither of the two conditions is fulfilled.

Symbol $S_{te}$ represents the amount of depression of the brake pedal 3 when pressure actually builds up within the master cylinder 2.

The brake flag Fb is used for the selection of the reference wheel speed $V_S$ as well as for the computation of the center-of-gravity speed $V_{CG}$, as mentioned above.

I: Depression Increment Flag for Brake Pedal

Based on the pedal stroke speed $V_{ST}$, the ECU 23 sets a depression increment flag $F_{PP}$ in the following manner:

Fpp=1, if $V_{ST} > 50$ mm/s;

Fpp=0, if $V_{ST} < 20$ mm/s.

Turn Determination

Figure 6:
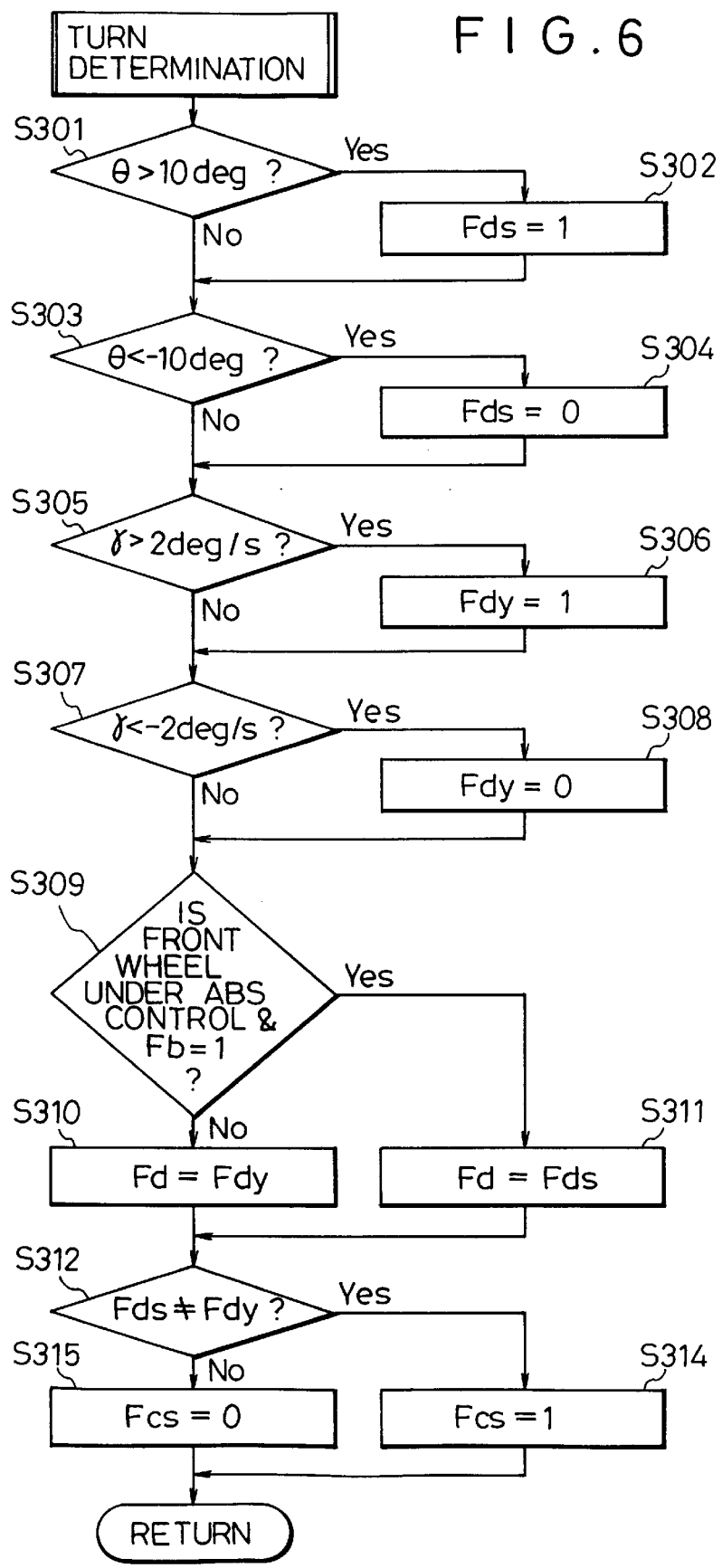
FIG. 6 is a flowchart illustrating the details of a turn determining routine.

Subsequently, the ECU 23 executes Step S3 (see FIG. 4), that is, it makes a determination as to vehicle turn. In FIG. 3, the determination as to the turning direction is performed in the computation block 38, and details thereof are shown the flowchart in FIG. 6.

When the steering-wheel angle $\theta$ increases in the positive direction by greater than 10 deg (Step S301), the direction flag Fds which is based on the steering-wheel angle $\theta$ is set to "1" (Step S302). In this case, the direction flag Fds having a value of 1 indicates that the vehicle is turning to the right. When the steering-wheel angle θ increases in the negative direction by smaller than −10 deg (Step S303), on the other hand, the direction flag Fds is set to "0". In this case, the direction flag Fds having a value of 0 indicates that the vehicle is turning to the left. When the steering-wheel angle θ is equal to or greater than −10 deg and is equal to or smaller than 10 deg, the value of the direction flag Fds is maintained.

When the yaw rate γ increases in the positive direction by greater than 2 deg (Step S303), the direction flag Fdy which is based on the yaw rate is set to "1" (Step S306). In this case, the direction flag Fdy having a value of 1 indicates that the vehicle is turning to the right. When the yaw rate γ increases in the negative direction by smaller than −2 deg (Step S307), on the other hand, the direction flag Fdy is set to "0" (Step S308). The direction flag Fdy having a value of 0 indicates that the vehicle is turning to the left. When the yaw rate γ is equal to or greater than −2 deg and is equal to or smaller than 2 deg, the value of the direction flag Fdy is maintained.

Next, it is determined if brake pressure control by the antiskid braking system (ABS) is performed on at least one front wheel and 1 is set to the brake flag Fb (Step S309). When the decision is YES, the direction flag Fds which is based on the steering-wheel angle θ is set to the turning flag Fd, whereas when the decision is NO, the direction flag Fdy which is based on the yaw rate γ is set to the turning flag Fd (Step S310).

Subsequently, it is determined if the value of the direction flag Fds coincides with the value of the direction flag Fdy (Step S312). When the decision is NO, i.e., when the yawing direction of the vehicle does not coincide with the direction of the manipulation of the steering wheel, the counter steer flag Fcs is set to "1" (Step S314). When the decision is YES, on the other hand, the counter steer flag Fcs is set to "0" (Step 315).

Computation of Target Yaw Rate

Subsequently, in Step S4, that is, in the computation block 39 in FIG. 3, the ECU 23 computes a target yaw rate γt for the vehicle. Details of the computation block 39 are shown in FIG. 7.

Figure 7:
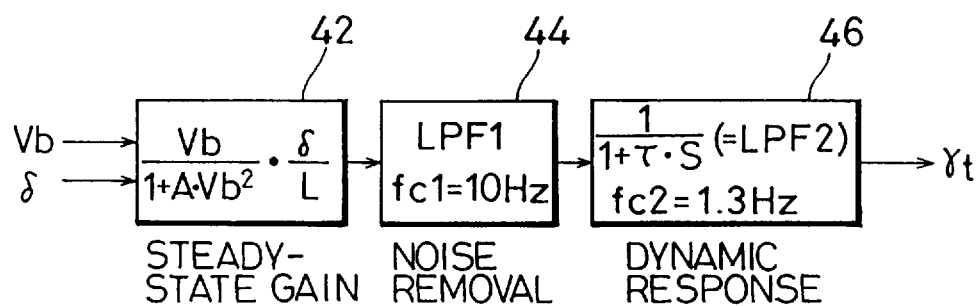
FIG. 7 is a diagram showing the details inside a computation block for computing a target yaw rate.

As clearly seen from FIG. 7, the vehicle body speed $V_B$ and the front-wheel steered angle δ are supplied to a computing section 42, wherein a steady-state gain is obtained. The steady-state gain is then successively subjected to a filtering process in subsequent filtering sections 44 and 46, whereby a target yaw rate γt is obtained.

Provided that the aforementioned steering gear ratio is ρ, the front-wheel steered angle δ is obtained according to the following equation:

$$\delta = \theta/\rho \tag{28}$$

The steady-state gain is a value indicative of the response of yaw rate of the vehicle with respect to operation of the steering wheel. Specifically, the steady-state gain can be derived from a linear two-wheeled vehicle model. A low-pass filter (LPF1) for removing noise is used in the first-stage filtering section 44, and a low-pass filter (LPF2) for response with first-order lag is used in the second-stage filtering section 46.

Consequently, the ECU 23 computes the target yaw rate γt according to the following equation:

$$\gamma t = LPF2((LPF1(V_B/(1+A \times V_B^2) \times (\delta/L)))) \tag{29}$$

In equation (29), A and L represent the stability factor and the wheelbase, respectively.

Computation of Required Yaw Moment

Then, in Step S5 (FIG. 4), that is, in a computation block 41 in FIG. 3, the ECU 23 computes required yaw moment γd. Details of the computation block 41 and Step S5 are shown in FIGS. 8 and 9, respectively.

Figure 8:
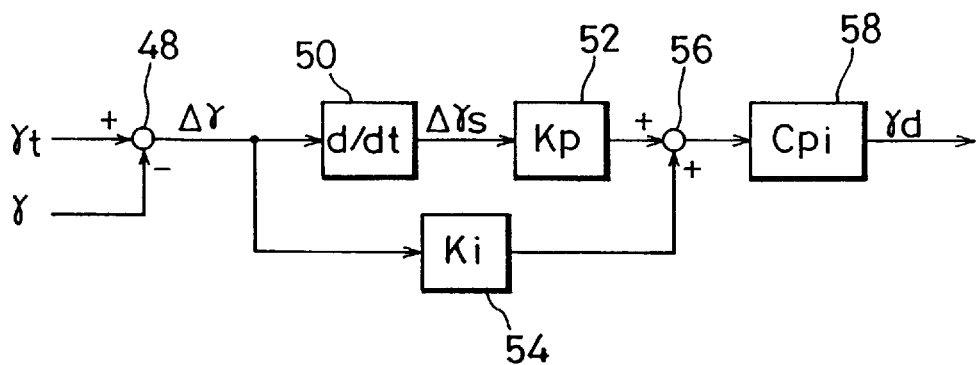
FIG. 8 is a diagram showing the details inside a computation block for computing a required yaw moment.
Figure 9:
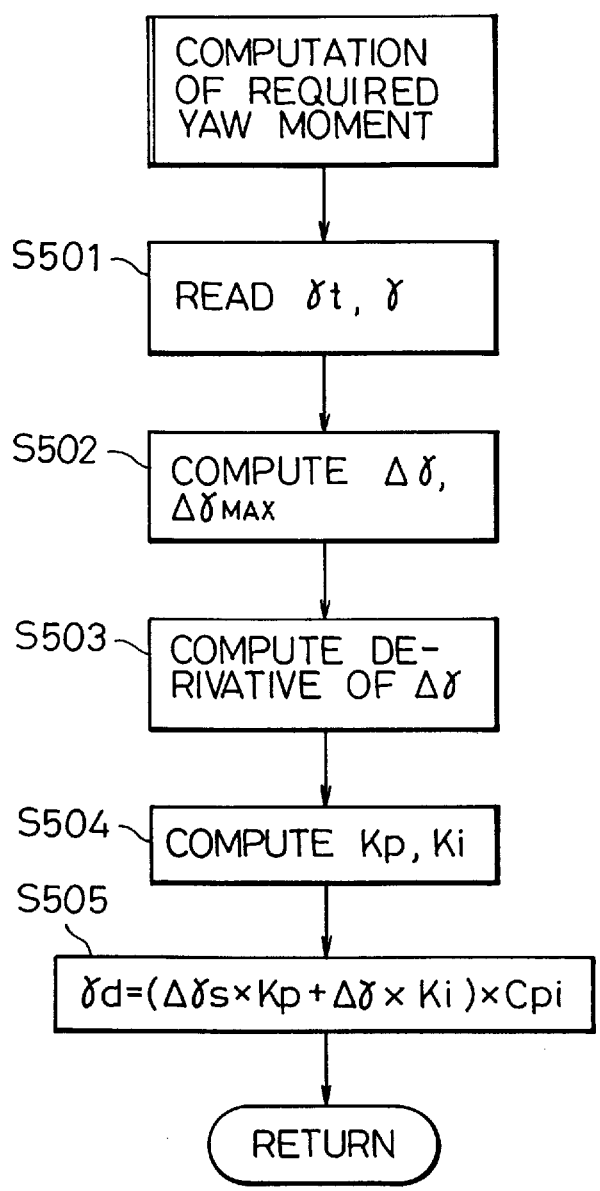
FIG. 9 is a flowchart illustrating a routine for computing the required yaw moment.

As clearly seen from FIG. 8, the computation block 41 includes a subtracting section 48, wherein the difference, or yaw rate deviation Δγ, between the target yaw rate γt and the yaw rate γ is computed. The procedure for computing the yaw rate deviation Δγ is shown in Steps S501 and S502 in the flowchart of FIG. 9.

Step S502 will now be explained in detail. In order to make the yaw rate deviation Δγ take a positive value on the understeer (US) side of the vehicle and a negative value on the oversteer (OS) side of the vehicle, when the vehicle is turning to the left, the yaw rate deviation Δγ is inverted between positivity and negativity. The turning direction of the vehicle is determined based on the value of a turn flag Fd.

Further, in Step S502, the absolute value of the yaw rate deviation Δγ is subjected to a filtering process, as indicated by the following equation, to thereby obtain a maximum yaw rate deviation $\Delta\gamma_{MAX}$.

$$\Delta\gamma_{MAX} = LPF(|\Delta\gamma|) \tag{30}$$

The cutoff frequency $f_C$ employed in this filtering process varies depending on whether the yaw rate deviation Δγ is increasing or not. For example, when the yaw rate deviation Δγ is increasing, $f_C$ is set to 10 Hz; when the yaw rate deviation Δγ is decreasing, $f_C$ is set to 0.08 Hz.

After yaw moment control described later is completed (when an enable/disable flag Fymc for the yaw moment control is reset to "o"), the absolute value of the yaw rate deviation Δγ is set as the maximum yaw rate deviation $\Delta\gamma_{MAX}$, as shown in the following equation:

$$\Delta\gamma_{MAX} = \Delta\gamma \tag{31}$$

Then, the yaw rate deviation Δγ is supplied to a differentiating section 50 (FIG. 8), wherein the difference, or derivative Δγs, of the yaw rate deviation is computed. Subsequently, the derivative Δγs is subjected to a filtering process ($f_C$=5 Hz). Namely, the ECU 23 computes the derivative Δγs of the yaw rate deviation according to the following equation:

$$\Delta\gamma s = LPF(\Delta\gamma - \Delta\gamma m) \tag{32}$$

In equation (32), Δγm represents the yaw rate deviation computed in the preceding cycle of the routine (FIG. 9). As has been explained above with reference to the yaw rate deviation Δγ, when the vehicle is turning to the left, the derivative Δγs of the yaw rate deviation is inverted between positivity and negativity.

The computation of the derivative Δγs of the yaw rate deviation is executed in Step S503 in the flowchart of FIG. 9.

Subsequently, as shown in FIG. 8, the derivative $\Delta\gamma s$ of the yaw rate deviation is supplied to a multiplying section 52, where the derivative $\Delta\gamma s$ is multiplied by a proportional gain Kp. The yaw rate deviation $\Delta\gamma$ is also supplied to a multiplying section 54, in which the yaw rate deviation $\Delta\gamma$ is multiplied by an integral gain Ki. The outputs from the multiplying sections 52 and 54 are summed up in an adding section 56.

The output from the adding section 56 is supplied to a multiplying section 58 which multiplies the output of the adding section 56 by a correction value Cpi, thereby obtaining required yaw moment $\gamma d$. Consequently, the ECU 23 computes the required yaw moment $\gamma d$ according to the following equation:

$$\gamma d = (\Delta\gamma s \times Kp + \Delta\gamma \times Ki) \times Cpi \qquad (33)$$

The correction value Cpi is set to different values depending on whether the vehicle is braked or not. For example, the correction value Cpi is set as follows:

Cpi=1.0, when the vehicle is braked (Fb=1);
Cpi=1.5, when the vehicle is not braked (Fb=0).

The computation of the required yaw moment $\gamma d$ is executed in Steps S504 and S505 in the flowchart of FIG. 9. Specifically, the proportional and integral gains Kp and Ki are computed in Step S504 and the computation of the proportional gain Kp is illustrated in detail in FIG. 10. The computation of the required yaw moment $\gamma d$ is expressed by the following equation.

$$\gamma d = (\Delta\gamma s \times Kp + \Delta\gamma \times Ki) \times Cpi$$

Figure 10:
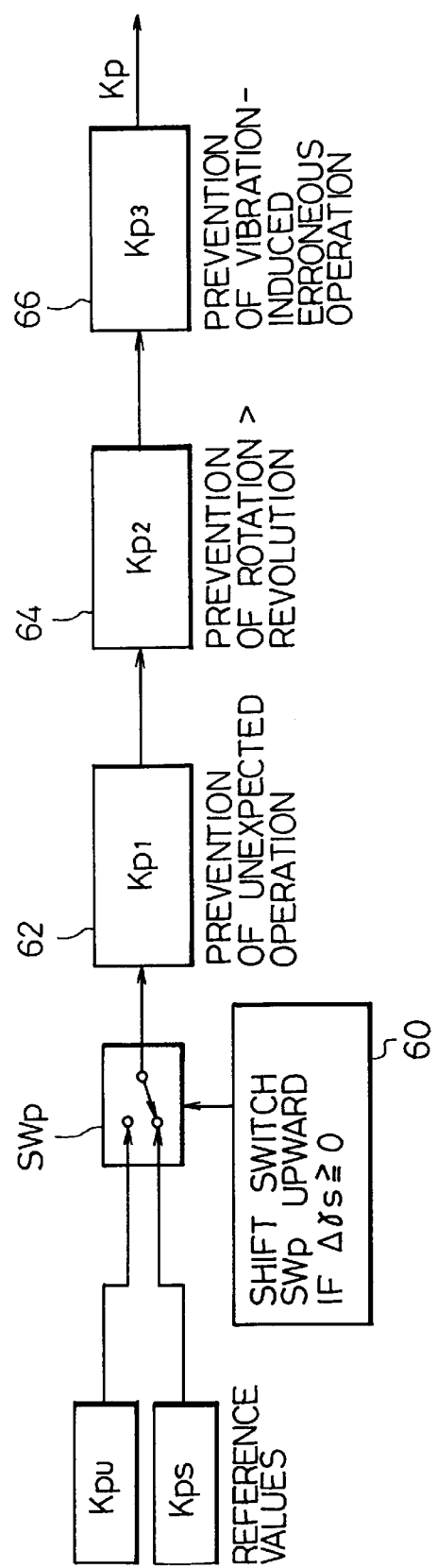
FIG. 10 is a block diagram for acquiring a proportional gain in association with the computation of the required yaw moment.

As clearly seen from FIG. 10, in relation to the computation of the proportional gain Kp, the ECU 23 has different reference values Kpu (e.g., 4 kgm/s/(deg/s$^2$)) and Kpo (e.g., 5 kgm/s/(deg/s$^2$)) applied depending on whether the vehicle understeers or oversteers while turning. The reference value Kpu or Kpo is selected by a switch $SW_p$ to be used.

The switch $SW_p$ is changed over by a decision signal supplied thereto from a determining section 60. When the vehicle understeers and the derivative $\Delta\gamma s$ of the aforementioned yaw rate deviation is "0" or greater, the determining section 60 outputs a decision signal which causes the switch $SW_p$ to be shifted to the reference value Kpu side.

The reference value output from the switch $SW_p$ is multiplied successively by correction coefficients Kp1, Kp2 and Kp3 in multiplying sections 62, 64 and 66, respectively, thereby yielding a proportional gain Kp.

Thus, the proportional gain Kp is computed in accordance with vehicle turning characteristics, as indicated by the following equations:

$Kp=Kpu \times Kp1 \times Kp2 \times Kp3$, when the vehicle understeers;

$Kp=Kpo \times Kp1 \times Kp2 \times Kp3$, when the vehicle oversteers.

If yaw moment control is performed on the vehicle before the vehicle traveling conditions reach a critical region, then the driver is given a queer feeling. To prevent this, the proportional gain Kp is corrected by the correction coefficient Kp1 only when the yaw rate deviation $\Delta\gamma$ or the lateral $G_Y$ of the vehicle body is large, so that the proportional gain Kp functions effectively. Specifically, the correction coefficient Kp1 is computed in the computation routine shown in FIG. 11.

Figure 11:
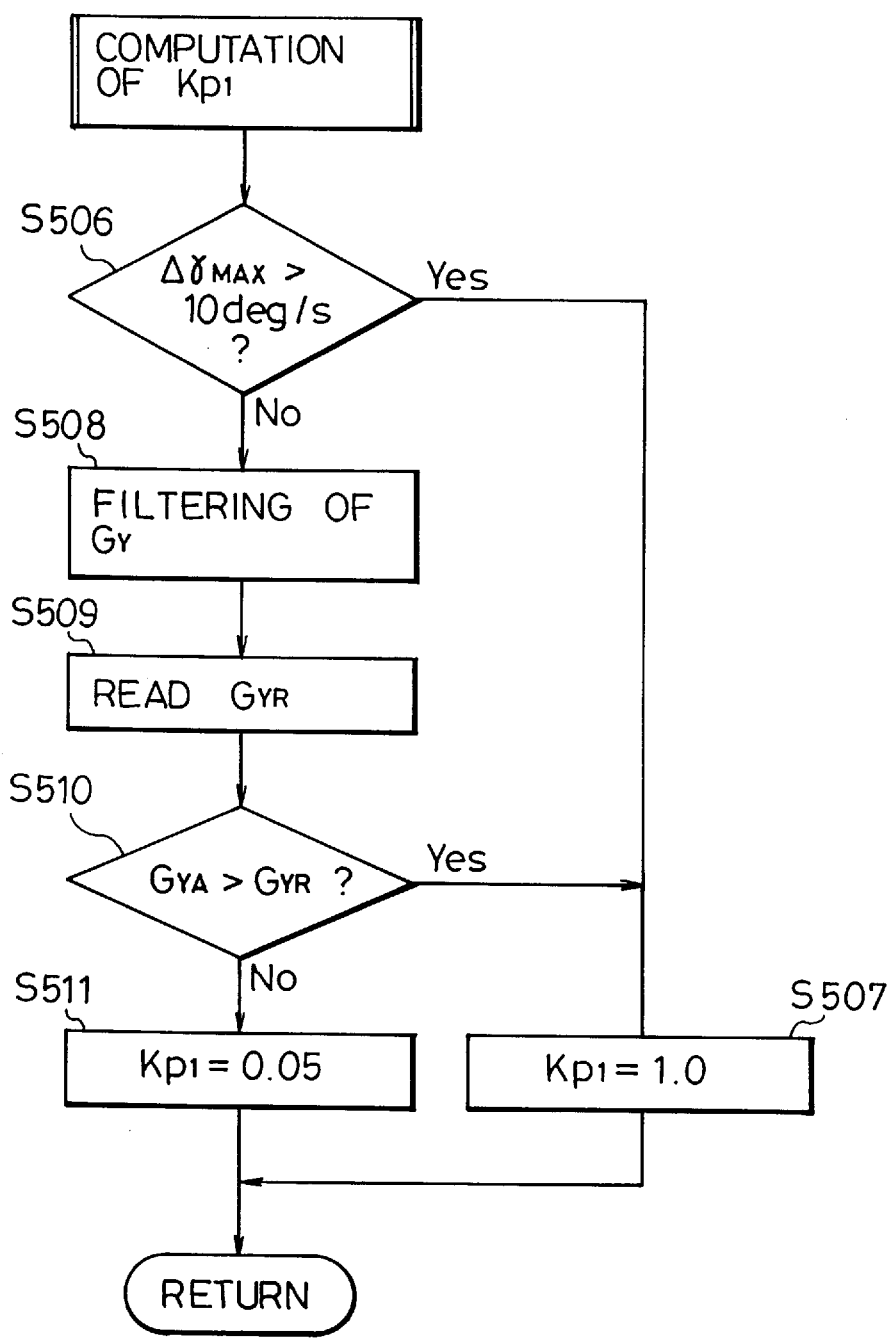
FIG. 11 is a flowchart illustrating a routine for computing a correction coefficient in association with the computation of the proportional gain.

In the routine in FIG. 11, first, it is determined whether the maximum yaw rate deviation $\Delta\gamma_{MAX}$ has exceeded 10 deg/s (Step S506), and if the decision is YES, "1.0" is set for the correction coefficient Kp1 (Step S507).

If the decision in Step S506 is NO, the absolute value of the lateral $G_Y$ of the vehicle body is subjected to a filtering process, as indicated by the following equation, to obtain an average lateral GYA (Step S508).

$$G_{YA}=LPF(|G_Y|)$$

Figure 12:
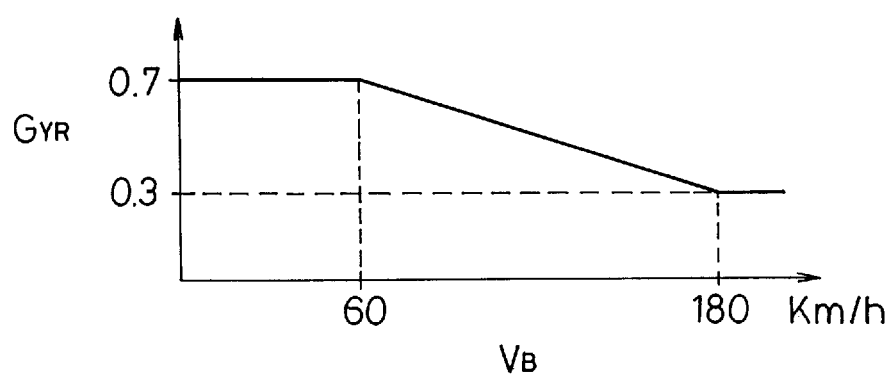
FIG. 12 is a graph showing the relationship between a vehicle body speed and a reference lateral acceleration.

The cutoff frequency $f_C$ used in this filtering process is set to 20 Hz when the lateral $G_Y$ tends to increase, and is set to 0.23 Hz when the lateral $G_Y$ tends to decrease. Then, a reference lateral $G_{YR}$ is computed based on the vehicle body speed $V_B$ (Step S509). Specifically, the storage device in the ECU 23 stores in advance a map as shown in FIG. 12, and a corresponding reference lateral $G_{YR}$ is read out from the map based on the vehicle body speed $V_B$. As the vehicle body speed $V_B$ increases, the traveling of the vehicle is more likely to become unstable; therefore, in a high-speed region, the reference lateral $G_{YR}$ is gradually decreased with an increase in the vehicle body speed $V_B$, as seen from the map in FIG. 12.

After the average lateral $G_{YA}$ and the reference lateral $G_{YR}$ are computed in the above-described manner, it is determined whether the average lateral $G_{YA}$ is greater than the reference lateral $G_{YR}$ (Step S510). If the decision is YES, "1.0" is set for the correction coefficient Kp1 (Step S507). If the decision in Step S510 is NO, on the other hand, "0.05" is set for the correction coefficient Kp1 (Step S511).

The correction coefficient Kp2 is used to correct the proportional gain Kp for the following reason: If the yaw rate $\gamma$ is allowed to simply follow the target yaw rate $\gamma t$, the lateral force acting on the vehicle immediately reaches a critical value when the friction coefficient of the road surface is small, with the result that the center-of-gravity slip angle $\beta$ of the vehicle suddenly increases. Consequently, the vehicle is very liable to spin.

By correcting the proportional gain Kp by a suitably set correction coefficient Kp2, therefore, the center-of-gravity slip angle $\beta$ of the vehicle can probably be kept small, so that the vehicle is prevented from the spinning. Specifically, the correction coefficient Kp2 is determined in the setting routine shown in FIG. 13. In this setting routine, first, the center-of-gravity slip angular velocity $d\beta$ is read (Step S512), based on which a corresponding reference correction coefficient Kcb is read from a map shown in FIG. 14 (Step S513). As apparent from the map in FIG. 14, the reference correction coefficient Kcb is set, for example, in such a manner that it gradually decreases from a maximum value (1.0) as the center-of-gravity slip angular velocity $d\beta$ increases above 2 deg/s and is fixed at a minimum value (0.1) when the angular velocity $d\beta$ is 5 deg/s or greater.

In the next Step S514, the yaw rate deviation $\Delta\gamma$ is read, and based on the positivity/negativity of the yaw rate deviation $\Delta\gamma$, it is determined whether the vehicle is making an understeer (US) turn (Step S515). If the decision is YES, the reference correction coefficient Kcb is set as the correction coefficient Kp2 (Step S516); if the decision is NO, "1.0" is set as the correction coefficient Kp2 (Step S517). More specifically, when the vehicle is making an understeer turn, the correction coefficient Kp2 is set based on the center-of-gravity slip angular velocity $d\beta$. When the vehicle is making an oversteer turn, on the other hand, the correction coefficient Kp2 is set to the fixed value of "1.0". Step S518 and the subsequent steps in the flowchart in FIG. 13, will be explained later.

The correction coefficient Kp3 is used to correct the proportional gain Kp for the following reason: While the vehicle is traveling on a rough road, a vibration component is added to the output of the yaw rate sensor 30 or the yaw rate $\gamma$. The vibration component of the yaw rate $\gamma$ is amplified when the derivative $\Delta\gamma s$ of the yaw rate deviation is computed, making it impossible to accurately compute the derivative $\Delta\gamma s$ or the required yaw moment $\gamma d$. This may cause an erroneous control operation based on the required yaw moment $\gamma d$ or impair the stability of such control operation. Therefore, the correction coefficient Kp3 is used to reduce the proportional gain Kp, in order to eliminate the adverse influence of the vibration component on the derivative $\Delta\gamma s$.

Figure 15:
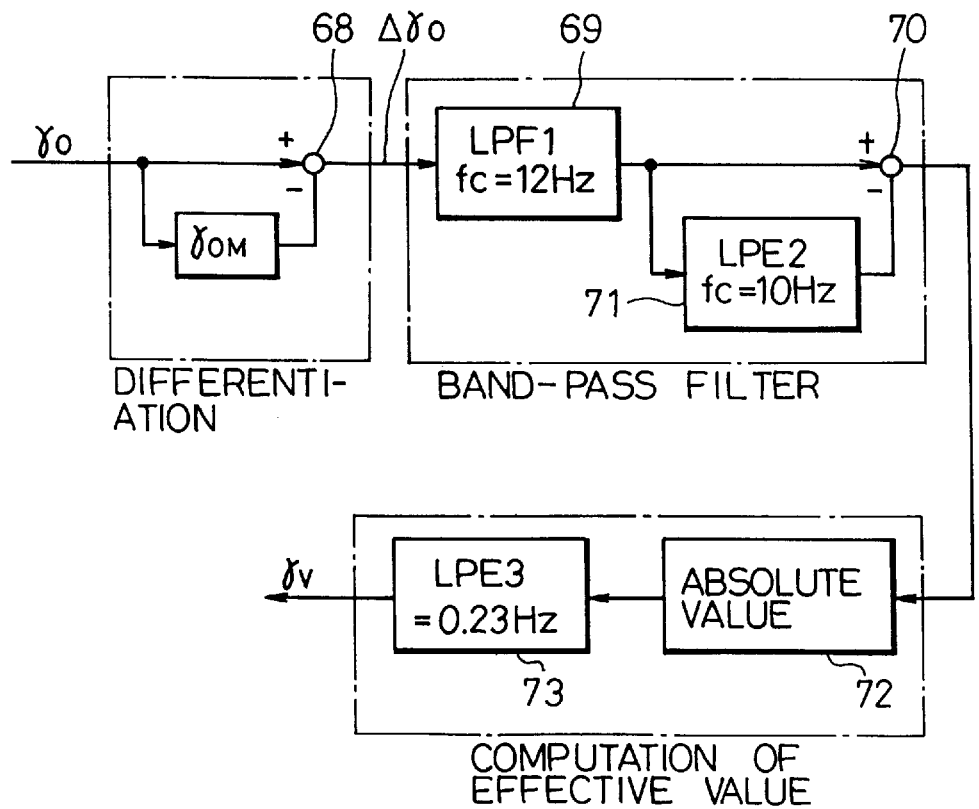
FIG. 15 is a block diagram for computing the vibration component of the yaw rate.

To obtain the correction coefficient Kp3, the vibration component $\gamma v$ of the yaw rate is computed first. Specifically, as shown in the block diagram of FIG. 15, the yaw rate $\gamma_0$ output from the yaw rate sensor 30 and the yaw rate $\gamma_{OM}$ acquired in the preceding cycle of the setting routine (FIG. 16) are supplied to a subtracting section 68 (Step S522 in FIG. 16). The subtracting section 68 computes the deviation between the yaw rates $\gamma_0$ and $\gamma_{OM}$ or the derivative $\Delta\gamma_0$ thereof.

Subsequently, the derivative $\Delta\gamma_0$ is subjected to a filtering process ($f_C$=12 Hz) in a first filtering section 69, and the filtered derivative $\Delta\gamma_0$ is then supplied to a subtracting section 70. The output of the first filtering section 69 is also supplied to a second filtering section 71 which performs a filtering process ($f_C$=10 Hz). The result of the filtering process is supplied to the subtracting section 70 where the deviation between the two filtered derivatives $\Delta\gamma_0$ is computed and the derivation is then output to a computing section 72. The absolute value of the deviation between those derivatives is attained in the computing section 72, and is subjected to a filtering process ($f_C$=0.23 Hz) in a third filtering section 73, which in turn outputs the vibration component $\gamma v$ of the yaw rate (Step S523 in FIG. 16). Thus, the vibration component $\gamma v$ of the yaw rate is computed according to the following two equations:

$$\Delta\gamma_0 = \gamma_0 - \gamma_{OM} \tag{34}$$

$$\gamma v = LPF3(|LPF1(\Delta\gamma_0) - LPF2(\Delta\gamma_0)|) \tag{35}$$

Figure 16:
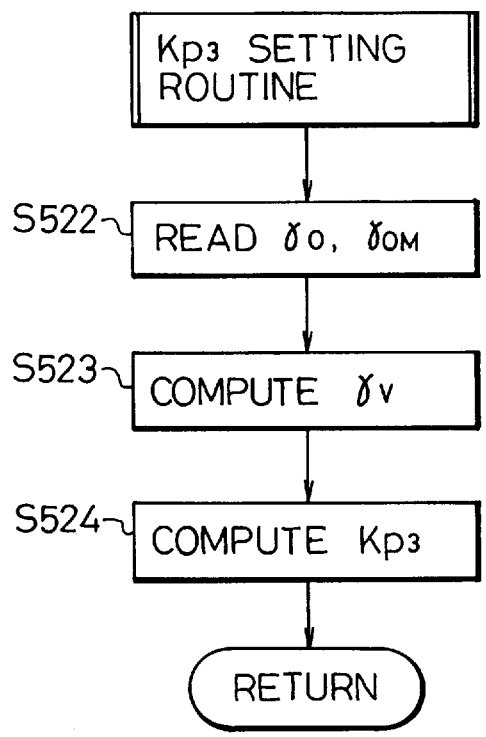
FIG. 16 is a flowchart illustrating another correction-coefficient computing routine in association with the computation of the proportional gain.
Figure 17:
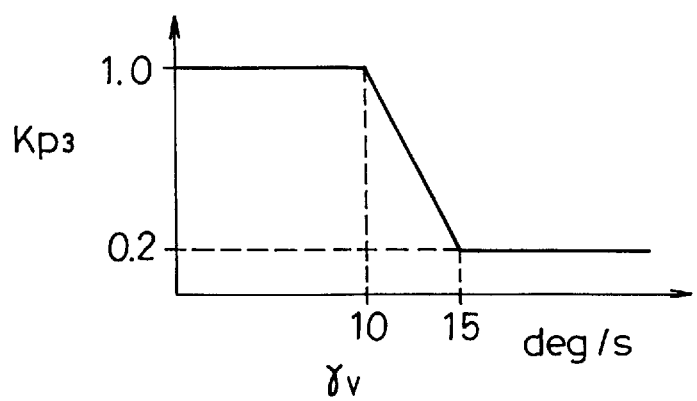
FIG. 17 is a graph showing the relationship between the vibration component of the yaw rate and the correction coefficient to be computed by the flowchart in FIG. 16.

Then, as shown in Step S524 in FIG. 16, the correction coefficient Kp3 is computed based on the vibration component $\gamma v$ of the yaw rate. Specifically, the storage device in the ECU 23 stores in advance a map as shown in FIG. 17, and a corresponding correction coefficient Kp3 is read out from the map of FIG. 17 based on the vibration component $\gamma v$ of the yaw rate. As seen from the map of FIG. 17, the correction coefficient Kp3 is set, for example, in such a manner that it sharply decreases from "1.0" with an increase in the vibration component $\gamma v$ of the yaw rate when the vibration component $\gamma v$ exceeds 10 deg/s, and it is set to a fixed value of "0.2" when the vibration component $\gamma v$ is 15 deg/s or greater.

Figure 18:
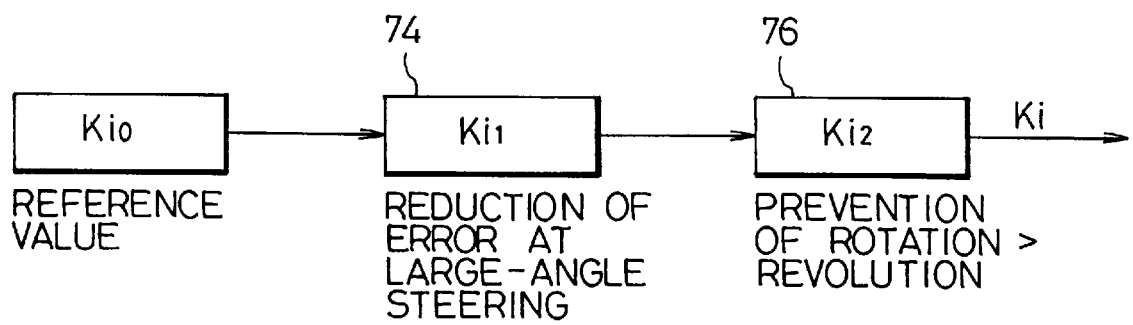
FIG. 18 is a block diagram for acquiring the integral gain in association with the computation of the required yaw moment.

The computation of the aforementioned integral gain Ki is shown in the block diagram of FIG. 18. As in the case of computing the proportional gain Kp, a reference integral gain Ki0 (e.g., 10 kgm/s/(deg/s$^2$)) is prepared for use. The reference integral gain Ki0 is multiplied by a correction coefficient Ki1 in a multiplying section 74 whose output is multiplied by a correction coefficient Ki2 in a multiplying section 76. The output of the multiplying section 76 is used as the integral gain Ki. Thus, the integral gain Ki is computed according to the following equation:

$$Ki = Ki0 \times Ki1 \times Ki2 \tag{36}$$

The correction coefficient Ki1 is used to decrease the integral gain Ki for the following reason: As the front-wheel steered angle increases, an error in the target yaw rate $\gamma t$ or an error in the yaw rate deviation $\Delta\gamma$ becomes even larger, causing the possibility of an erroneous control operation based on the yaw rate deviation. Therefore, in such a situation, the integral gain Ki is decreased by using the correction coefficient Ki0.

Figure 19:
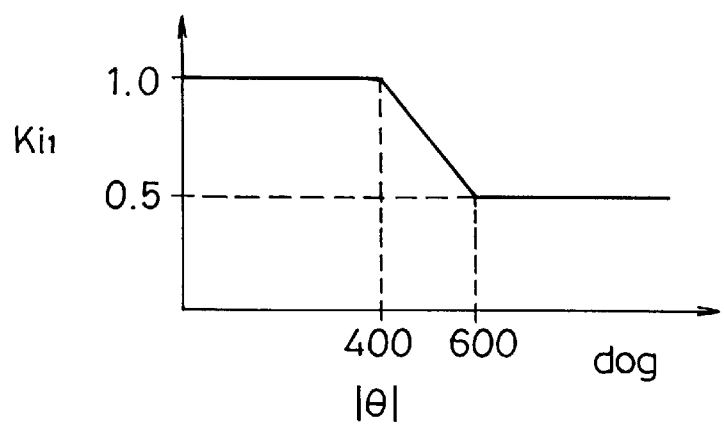
FIG. 19 is a graph showing the relationship between the absolute value of the steering-wheel angle θ and the correction coefficient of the integral gain.

Specifically, the correction coefficient Ki1 is set in accordance with the steering-wheel angle $\theta$ by using a map shown in FIG. 19. As seen from FIG. 19, the correction coefficient Ki1 has such a characteristic that it sharply decreases from a maximum value with an increase in the steering-wheel angle $\theta$ as the absolute value of the steering-wheel angle $\theta$ increases above 400 deg (in large-angle steering), and it is fixed at a minimum value of 0.5 when the steering-wheel angle $\theta$ is 600 deg or greater.

The correction coefficient Ki2 is used to decrease the integral gain Ki for the same reason as that for the use of the correction coefficient Kp2 to correct the aforementioned proportional gain Kp. Therefore, the procedures for computing the correction coefficient Ki2 are illustrated together with the setting routine for the correction coefficient Kp2 shown in FIG. 13.

Figure 13:
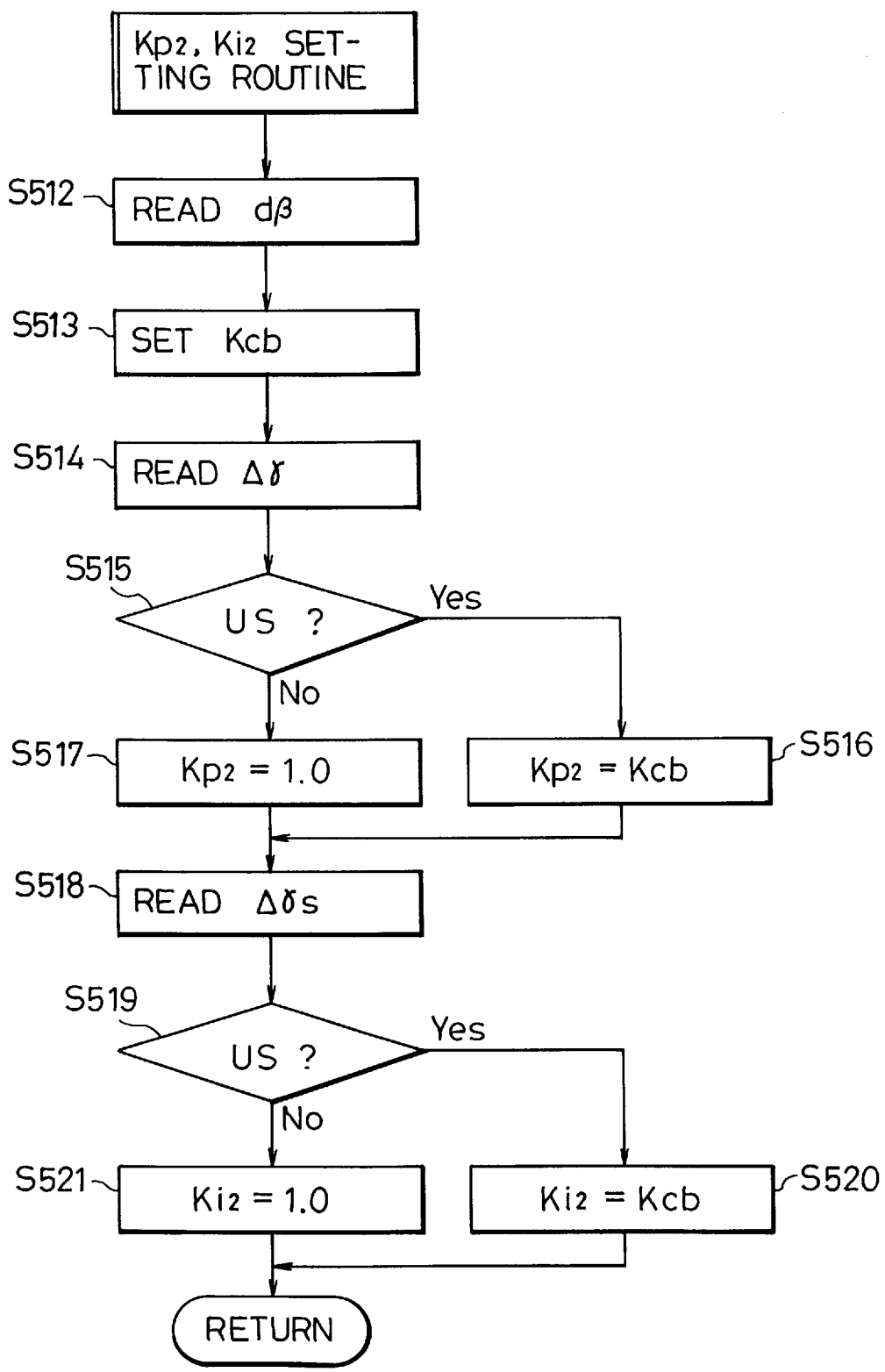
FIG. 13 is a flowchart illustrating another correction-coefficient computing routine in association with the computation of the proportional gain and an integral gain.
Figure 14:
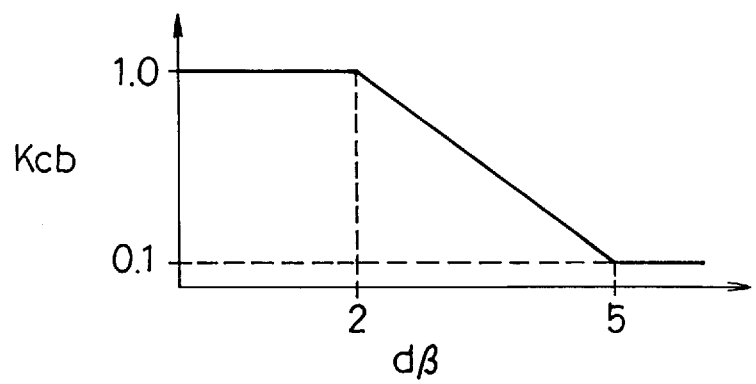
FIG. 14 is a graph showing the relationship between a center-of-gravity slip angular velocity and a reference correction coefficient.

In Step S518 in FIG. 13, the derivative $\Delta\gamma s$ of the yaw rate deviation is read, and it is determined, based on the rate positivity/negativity of the derivative $\Delta\gamma s$, whether the vehicle is making an understeer turn (Step S519). If the decision is YES, the aforementioned reference correction coefficient Kcb (see FIG. 13) is set for the correction coefficient Ki2 (Step S520); and if the decision is NO, a maximum value of "1.0" is set as the correction coefficient Ki2 (Step S521).

Yaw Moment Control for Vehicle

When the required yaw moment $\gamma d$ is computed in the above-described manner, the yaw moment control of the vehicle is executed in Step S6 in the main routine in FIG. 4, i.e., in an arithmetic operation block 78 in FIG. 3. The details of the arithmetic operation block 78 are illustrated in FIG. 20.

Figure 20:
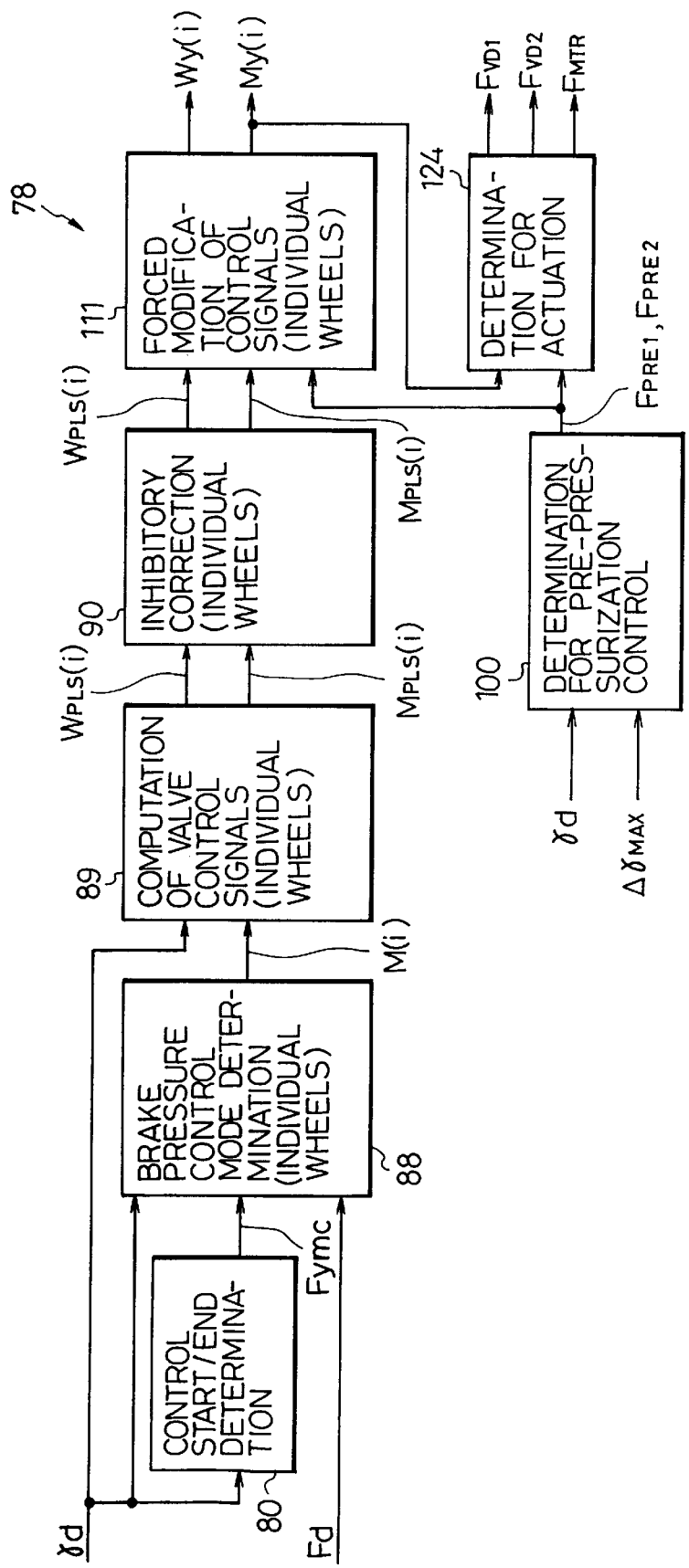
FIG. 20 is a block diagram showing the details of the yaw moment control shown in FIG. 3.

As shown in FIG. 20, the arithmetic operation block 78 has a determining section 80 which determines the start or end of the yaw moment control. The determining section 80 determines an enable/disable flag Fymc based on the required yaw moment $\gamma d$.

Figure 21:
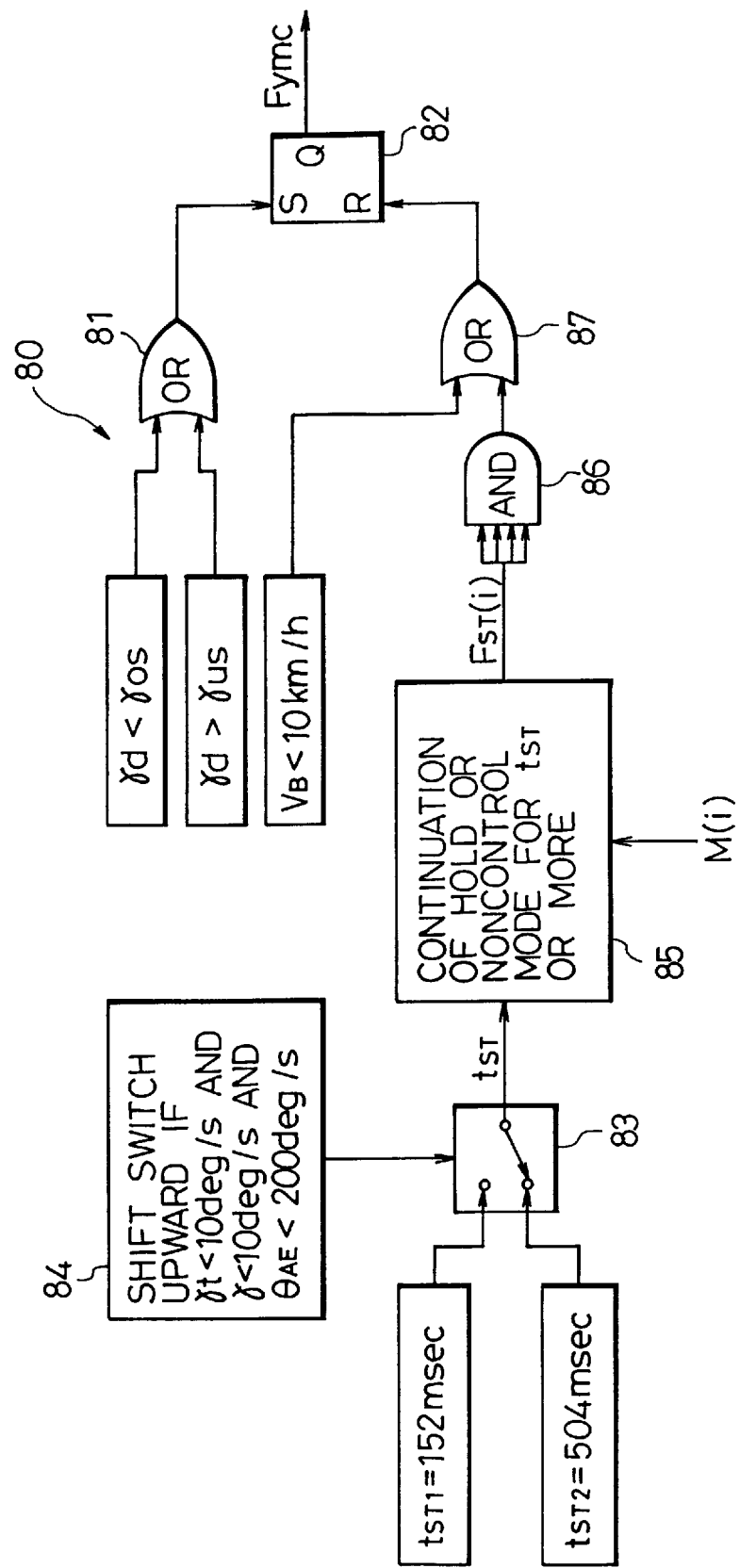
FIG. 21 is a diagram showing the details of an enable/disable determination block in FIG. 20.

Specifically, the enable/disable flag Fymc is determined in the determining circuit in FIG. 21. The determining circuit includes an OR gate 81 having two input terminals to which an enable signal or a disable signal is input in accordance with the required yaw moment $\gamma d$. More specifically, the enable signal is input to one input terminal of the OR gate 81 when the required yaw moment $\gamma d$ is smaller than an oversteer threshold value $\gamma os$ (e.g., 100 kgm/s). When the required yaw moment $\gamma d$ is greater than an understeer threshold value $\gamma us$ (e.g., 200 kgm/s), the enable signal is input to the other input terminal of the OR gate 81. When the required yaw moment $\gamma d$ exceeds either threshold value, therefore, the enable signal is output from the output terminal of the OR gate 81 and is input to the set terminal S of a flip-flop 82. Consequently, the enable/disable flag Fymc (=1 indicating the start of the control in this case) is sent out from the output terminal Q of the flip-flop 82.

The absolute value (100 kgm/s) of the oversteer threshold value $\gamma os$ is smaller than the absolute value (200 kgm/s) of the understeer threshold value $\gamma us$. On the oversteer side, therefore, the timing for outputting the enable/disable flag (=1) becomes quicker than that on the understeer side. That is, the start timing for the yaw moment control is quicker on the oversteer side than on the understeer side.

A reset signal can be supplied to the reset terminal R of the flip-flop 82, and is used to determine the reset timing for the enable/disable flag Fymc or the output timing of Fymc=0 from the flip-flop 82.

As shown in FIG. 21, the circuit for generating the reset signal has a switch 83 which has two input terminals. A first judgment time $t_{ST1}$ (e.g., 152 msec) is supplied to one of the input terminals of the switch 83, and a second judgment time $t_{ST2}$ (e.g., 504 msec) is supplied to the other input terminal.

The switch 83 is changed over in response to a switch signal output from a determining section 84. When the vehicle's behavior is stable or when the following conditions are all satisfied, the determining section 84 supplies the switch signal to the switch 83 to output the first judgment time $t_{ST1}$ as an end judgment time $t_{ST}$ from the switch 83. When any one of the following conditions are not fulfilled, the second judgment time $t_{ST2}$ is output as the end judgment time $t_{ST}$ from the switch 83.

Condition 1: target yaw rate γt<10 deg/s
Condition 2: yaw rate γ<10 deg/s
Condition 3: effective value $θ_{AE}$ of steering-wheel angular velocity<200 deg/s Then, the end judgment time $t_{ST}$ is supplied to a determining section 85, which in turn determines if a control signal to control the brake pressure of each wheel indicates a hold state or noncontrol state (where the control mode M(i) to be described later is in the hold mode or noncontrol mode) and if that state has continued for the end judgment time $t_{ST}$ or longer. When this decision is YES, the determining section 85 sets "1" to an end indication flag $F_{ST}(i)$ and outputs the flag. When this decision is NO, on the other hand, the determining section 85 sets "0" to the end indication flag $F_{ST}(i)$ and outputs the flag. The letter "i" of the end indication flag $F_{ST}(i)$ represents the wheel number. The control signals for controlling the brake pressures of the individual wheels will be discussed later.

The end indication flags $F_{ST}(i)$ are supplied to the respective input terminals of an AND gate 86 whose output terminal is connected to one input terminal of an OR gate 87. An enable signal is input to the other input terminal of the OR gate 87 when the vehicle body speed $V_B$ is lower than 10 km/h. The output terminal of the OR gate 87 is connected to the reset terminal R of the aforementioned flip-flop 82.

When all the input signals to the AND gate 86 are enabled, i.e., when the values of the end indication flags $F_{ST}(i)$ are all "1", the AND gate 86 supplies the enable signal to the OR gate 87. When one of the input signals to the OR gate 87 is the enable signal, the OR gate 87 supplies the enable signal to the reset terminal R of the flip-flop 82. In other words, when the vehicle body speed $V_B$ is lower than 10 km/h or the control signal for the brake pressure of each wheel satisfies the aforementioned conditions, the reset signal is supplied to the flip-flop 82.

When the reset signal is supplied to the flip-flop 82, the flip-flop 82 sets "0" to the enable/disable flag Fymc indicating the end of the control and outputs the flag.

As shown in FIG. 20, the determining section 80 supplies the enable/disable flag Fymc to a determining section 88 for determining the brake pressure control mode. When the supplied enable/disable flag Fymc has a value of "1", this determining section 88 selects the brake pressure control mode for each wheel based on the required yaw moment γd and the turning flag Fd.

Specifically, first, control execution flags Fcus and Fcos for the brake pressure control are set based on the size relationship between the required yaw moment γd and the threshold value from a map shown in FIG. 22. The control execution flag Fcus is a flag when the vehicle is making an understeer turn, and the control execution flag Fcos is a flag when the vehicle is making an oversteer turn.

In the understeer state:
Fcus=1 when γd >γd $_{US1}$ (=100 kgm/s)
Fcus=0 when γd <γd $_{US0}$ (=80 kgm/s)
In the oversteer state:
Fcos=1 when γd <γrd$_{OS1}$ (=−80 kgm/s)
Fcos=0 when γd >γd$_{OS1}$ (=−60 kgm/s)

Figure 23:
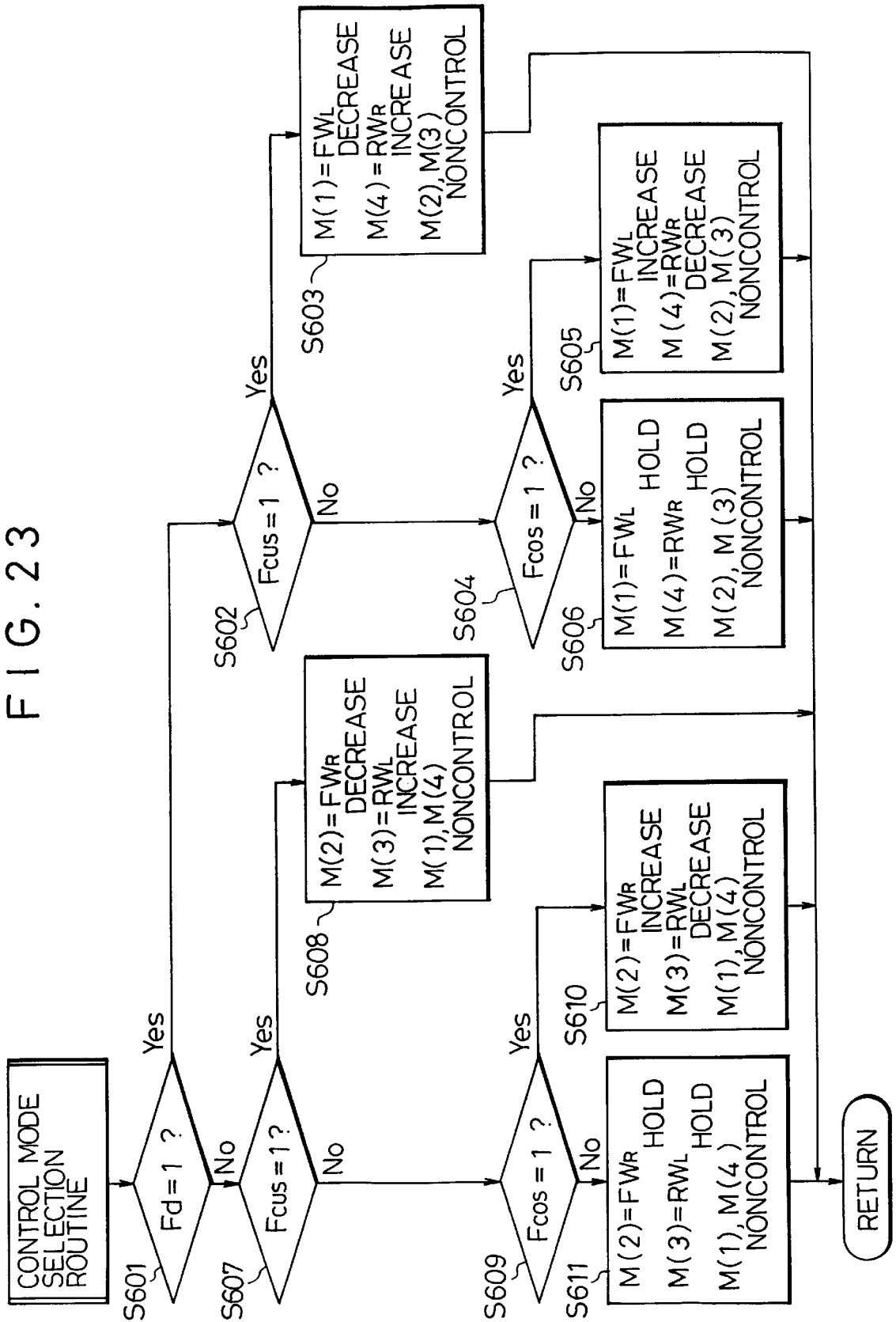
FIG. 23 is a flowchart illustrating a routine for selecting a control mode.

Then, the brake pressure control mode M(i) for each wheel is selected based on the combination of the control execution flags Fcus and Fcos and the turning flag Fd; the selecting routine is illustrated in FIG. 23.

In the control mode selecting routine in FIG. 23, first, it is determined if the value of the turning flag Fd is "1" (Step S601). When the decision is YES or when the vehicle is turning to the right, a determination is made as to whether or not the value of the control execution flag Fcus is "1" (Step S602). When this decision is YES too, the right turning of the vehicle shows an understeer tendency and the required yaw moment γd is a large value which is equal to or greater than the threshold value γd $_{US1}$. In this case, Fcus =1 indicates that a turning moment should be given to the vehicle. In the next Step S603, therefore, the control mode M(1) for the left front wheel $FW_L$ is set to a pressure decrease mode, the control mode M(4) for the right rear wheel $RW_R$ is set to a pressure increase mode, and the control modes M(2) and M(3) for the right front wheel $FW_R$ and the left rear wheel $RW_L$ are set to a noncontrol mode.

When the decision in Step S602 is NO, it is determined if the value of the control execution flag Fcos is "1" (Step S604). When the decision here is YES, the right turning of the vehicle shows an oversteer tendency and the required yaw moment γd is larger than the threshold value γd $_{OS1}$ on the negative side. In this case, Fcos=1 indicates that a restoration moment should be given to the vehicle head. In the next Step S605, therefore, the control mode M(1) for the left front wheel $FW_L$ is set to the pressure increase mode, the control mode M(4) for the right rear wheel $RW_R$ is set to the pressure decrease mode, and the control modes M(2) and M(3) for the right front wheel $FW_R$ and the left rear wheel $RW_L$ are set to the noncontrol mode.

When the decisions in the aforementioned Steps S602 and S604 are both NO, the turning of the vehicle neither shows a strong understeer tendency nor a strong oversteer tendency. In this case, the control modes M(1) and M(4) for the left front wheel $FW_L$ and the right rear wheel $RW_R$ are both set to the hold mode, and the control modes M(2) and M(3) for the right front wheel $FW_R$ and the left rear wheel $RW_L$ are set to the noncontrol mode (step S606).

When the decision in Step S601 is NO or when the vehicle is turning to the left, it is determined if the value of the control execution flag Fcus is "1" (Step S607).

When the decision in this step is YES, it indicates that a turning moment should be given to the vehicle as in the above-described case of the right turn. In the next Step S608, therefore, the control mode M(2) for the right front wheel $FW_R$ is set to the pressure decrease mode, the control mode M(3) for the left rear wheel $RW_L$ is set to the pressure increase mode, and the control modes M(1) and M(4) for the left front wheel $FW_L$ and the right rear wheel $RW_R$ are set to the noncontrol mode.

When the decision in Step S607 is NO, it is determined if the value of the control execution flag Fcos is "1" (Step S609). When the decision here is YES, the restoration moment should be given to the vehicle. In the next Step S610, therefore, the control mode M(2) for the right front wheel $FW_R$ is set to the pressure increase mode, the control mode M(3) for the left rear wheel $RW_L$ is set to the pressure decrease mode, and the control modes M(1) and M(4) for the left front wheel $FW_L$ and the right rear wheel $RW_R$ are set to the noncontrol mode.

When the decisions in Steps S607 and S609 are both NO, the control modes M(2) and M(3) for the right front wheel $FW_R$ and the left rear wheel $RW_L$ are both set to the hold mode, and the control modes M(1) and M(4) for the left front wheel $FW_L$ and the right rear wheel $RW_R$ are set to the noncontrol mode (step S611).

The selection of the above-discussed control modes M(i) is summarized in Table 1 below.

TABLE 1

| | Right turn (Fd = 1) | | | Left turn (Fd = 0) | | |
|---|---|---|---|---|---|---|
| Fcus | 1 | 0 | 0 | 1 | 0 | 0 |
| Fcos | 0 | 1 | 0 | 0 | 1 | 0 |
| $FW_L$: M(1) | pressure decrease | pressure increase | hold | non-control | non-control | non-control |
| $FW_R$: M(2) | non-control | non-control | non-control | pressure decrease | pressure increase | hold |
| $RW_L$: M(3) | non-control | non-control | non-control | pressure increase | pressure decrease | hold |
| $RW_R$: M(4) | pressure increase | pressure decrease | hold | non-control | non-control | non-control |

The control modes M(i) for the individual wheels selected by the determining section 88 and the required yaw moment γd are supplied to a computing section 89 for computing valve control signals. This computing section 89 computes the control signals for the solenoid valve units (inlet and outlet valves 12 and 13) which control the brake pressures of the respective wheels, based on the control modes M(i) and the required yaw moment γd.

This computation will now be discussed specifically. First, the computing section 89 computes a control rate at the time of increasing or decreasing the brake pressure of each wheel in order to acquire the required yaw moment γd. At the time the brake pressure of the wheel is changed every given pressure value ΔP (e.g., ±5 kg/cm²) in accordance with this control rate, the drive pulse for the inlet valve 12 or the outlet valve 13, i.e., the valve control signal, that is needed to change the brake pressure of the wheel by the given pressure value ΔP is computed. The valve control signal is represented by a pulse period $T_{PLS}$ and a pulse width $W_{PLS}(i)$. To secure the response of the brake pressure control, the initial pressure value ΔP is set to ±10 kg/cm².

Figure 24:
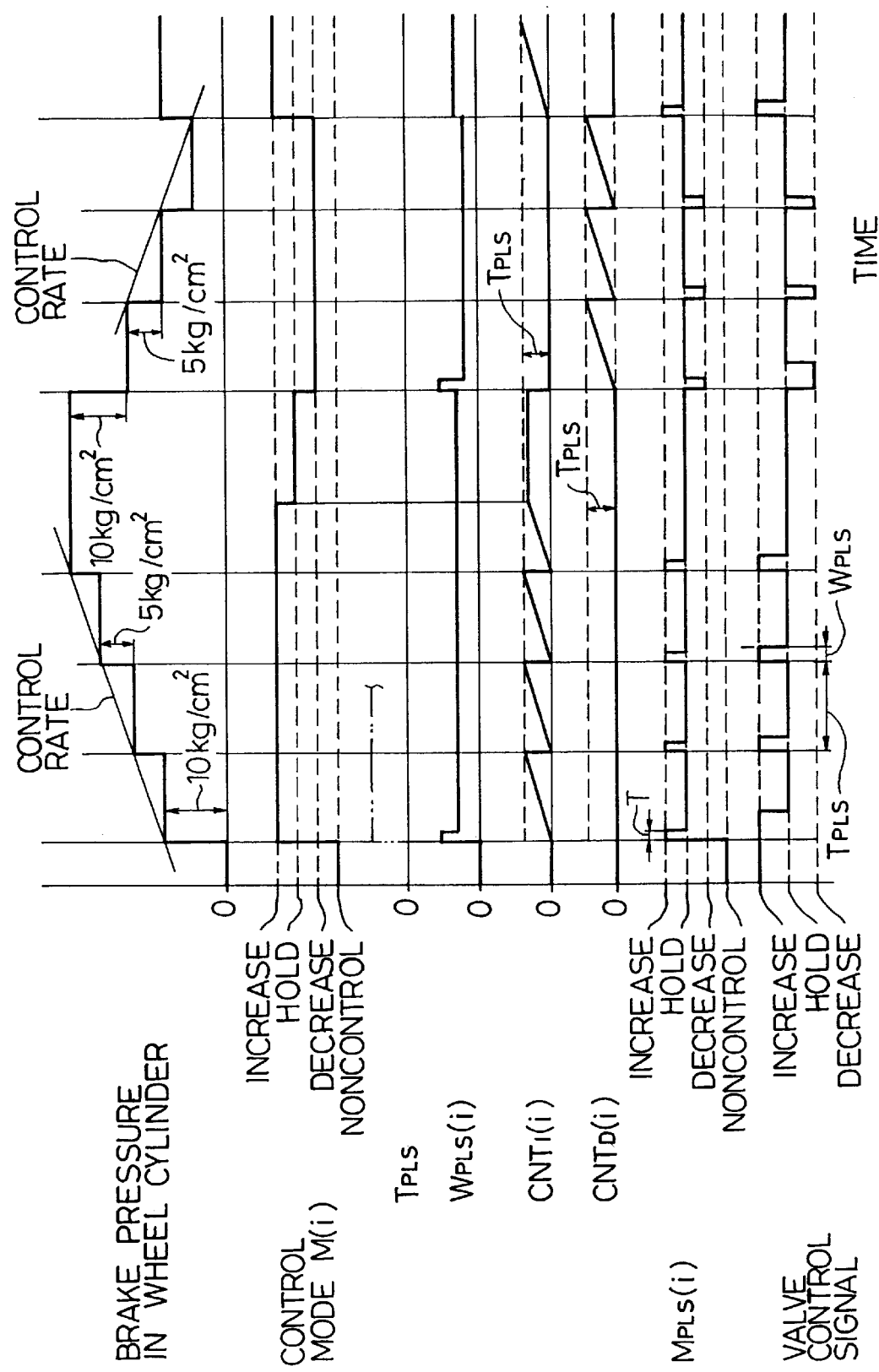
FIG. 24 is a time chart showing the relationship among the control mode, actuation mode and pulse width.

FIG. 24 illustrates how the value of the brake pressure in the wheel cylinder is increased and decreased by the pressure value ΔP.

The inlet and outlet valves 12 and 13 receive the valve control signal based on the hold mode and are actuated in accordance with the valve control signal. As an actuation instruction is given to the inlet and outlet valves 12 and 13 every control period T (8 msec) of the main routine, the actuation mode $M_{PLS}(i)$ is set so that the actual valve actuation is executed every pulse period $T_{PLS}$.

The following describes the pulse period $T_{PLS}$, the pulse width $W_{PLS}(i)$ and the actuation mode $M_{PLS}(i)$ in detail. First, when the brake pressure of the front wheel (in the wheel cylinders) is changed by $\Delta P_{WC}$, a change in the yaw moment acting on the vehicle body, ΔMz can be expressed by the following equation if the lateral force of the vehicle body is neglected.

$$\Delta Mz = \Delta P_{WC} \times B_F \times T_F / 2 \quad (37)$$

where $B_F$ is the front brake coefficient (kg/cm²→kg) of the vehicle and $T_F$ indicates the front tread of the vehicle.

Thus, the brake pressure control rate $R_{PWC}$ (kg/cm²/s) when the required yaw moment γd is given can be expressed by the following equation:

$$R_{PWC} = 2 \times \gamma d / B_F / T_F \quad (38)$$

When the pressure value ΔP (5 kg/cm² or 10 kg/cm²) is fixed, the following equation is derived from the relationship between the control rate RPWC and the pulse period $T_{PLS}$.

$$|R_{PWC}| = \Delta P / (T_{PLS} \times T(=8 \text{ msec})) \quad (39)$$

From the equations (38) and (39), the following equation for the pulse period $T_{PLS}$ is derived.

$$T_{PLS} = \Delta P \times B_F \times T_F / (2 \times T \times |\gamma d|) \quad (40)$$

$$2 \leq T_{PLS} \leq 12$$

The pulse period $T_{PLS}$ is also applied to the inlet and outlet valves 12 and 13 of the solenoid valve units for the rear wheels.

The pulse width $W_{PLS}(i)$ is set in advance through an experiment. In this experiment, reference pressures are respectively given for the master cylinder pressure and wheel brake pressure (brake pressure). Under this situation, the time from the point of the actuation of the inlet valve or the outlet valve to the appearance of a change in pressure value ΔP (5 kg/cm² or 10 kg/cm²) in the wheel brake pressure is measured, and the pulse width $W_{PLS}(i)$ is set based on this measured time. As the discharge pressure from the aforementioned pump 16 (or 17) is used to increase the wheel brake pressure, the pulse width $W_{PLS}(i)$ is set taking account of the response delay of the pump 16 (or 17).

Figure 25:
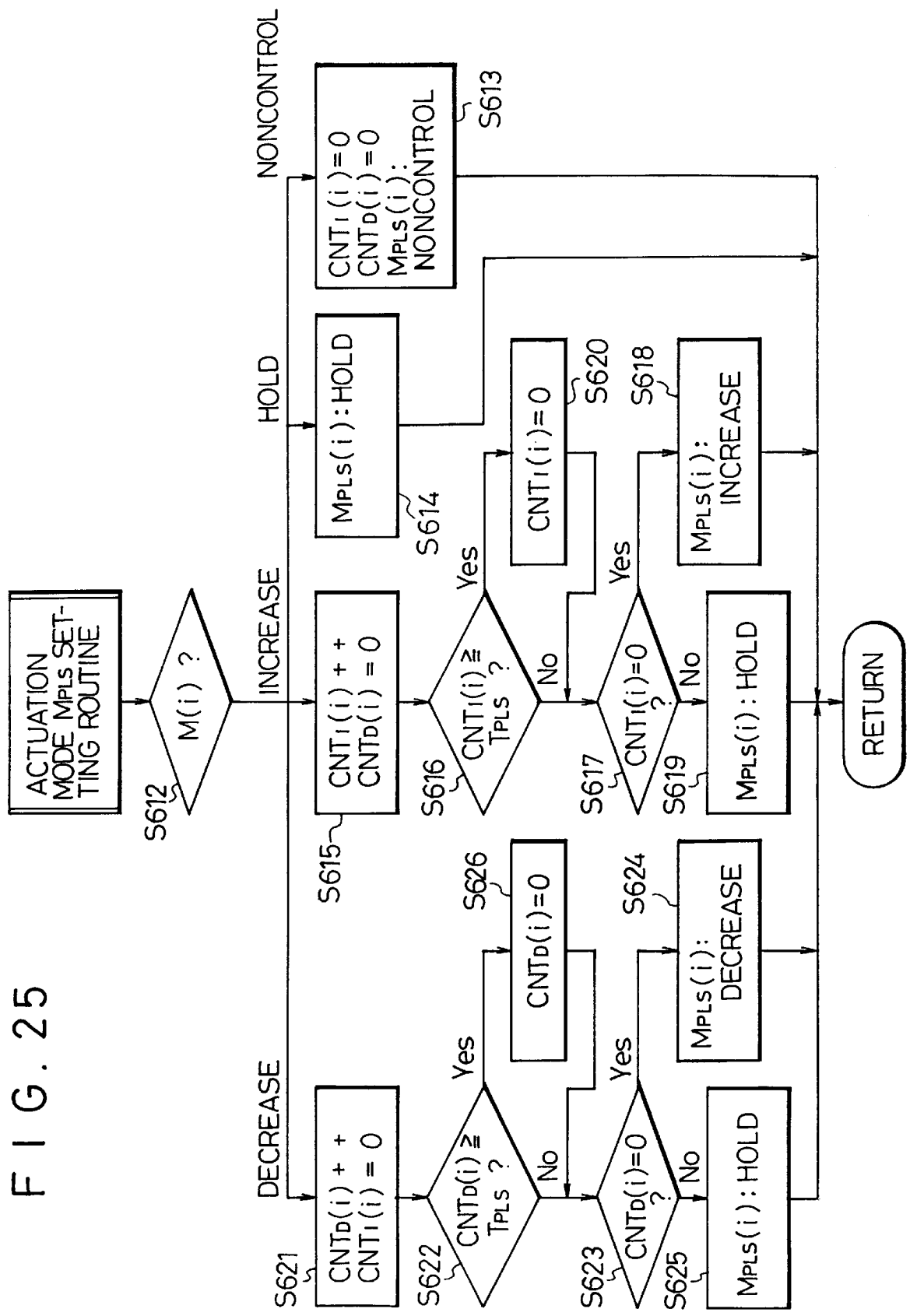
FIG. 25 is a flowchart illustrating a routine for setting the actuation mode.

The actuation mode $M_{PLS}(i)$ is set in accordance with the setting routine illustrated in FIG. 25. In this setting routine, first, the control mode M(i) is determined first (Step S612). When the control mode M(i) is the noncontrol mode, the value of an increment counter $CNT_I(i)$ for the pressure increase control and the value of a n increment counter $CNT_D(i)$ for the pressure decrease control are both reset to "0" and the actuation mode $M_{PLS}(i)$ is set to the noncontrol mode (Step S613). When the control mode M(i) is the hold mode, the actuation mode $M_{PLS}(i)$ is set to the hold mode (Step S614). When the control mode M(i) is the pressure increase mode, the actuation of only the increment counter $CNT_I(i)$ is started (Step S615). It is then determined if the value of the increment counter $CNT_I(i)$ has reached the pulse period $T_{PLS}$ (Step S616). Immediately after the start of the actuation of the increment counter $CNT_I(i)$, the decision in Step S617 becomes NO and a determination is made in the next Step S617 as to whether the value of the increment counter $CNT_I(i)$ is "0". Since the decision here becomes YES, the actuation mode $M_{PLS}(i)$ is set to the pressure increase mode (Step S618).

When the setting routine is repeated thereafter, the value of the increment counter $CNT_I(i)$ is incremented by "1" in Step S615. Consequently, as long as the decision in Step S616 is kept NO, the decision in Step S617 becomes NO and the actuation mode $M_{PLS}(i)$ is set to the hold pressure mode (Step S619).

As the time passes and the decision in Step S616 becomes YES, however, the value of the increment counter $CNT_I(i)$ is reset to "0" (Step S620). In this case, the decision in Step S617 becomes YES and the actuation mode $M_{PLS}(i)$ is set to the pressure increase mode (Step S618). As a result, as long as the control mode M(i) is kept set to the pressure increase mode, the actuation mode $M_{PLS}(i)$ is set to the pressure increase mode every pulse period $T_{PLS}$.

When the control mode M(i) is the pressure decrease mode, Steps S621 to S626 in the flowchart in FIG. 25 are executed, with the result that the actuation mode $M_{PLS}(i)$ is set to the pressure decrease mode every pulse period $T_{PLS}$.

Then, an inhibition section 90 (see FIG. 20) at the next stage corrects the pulse width $W_{PLS}(i)$ to inhibit the brake pressure control, when the steering wheel is countersteered or when the slip of the wheels is excessive, and further when the required yaw moment tends to decreases. The details of the inhibition section 90 are illustrated in the block diagram in FIG. 26.

Figure 26:
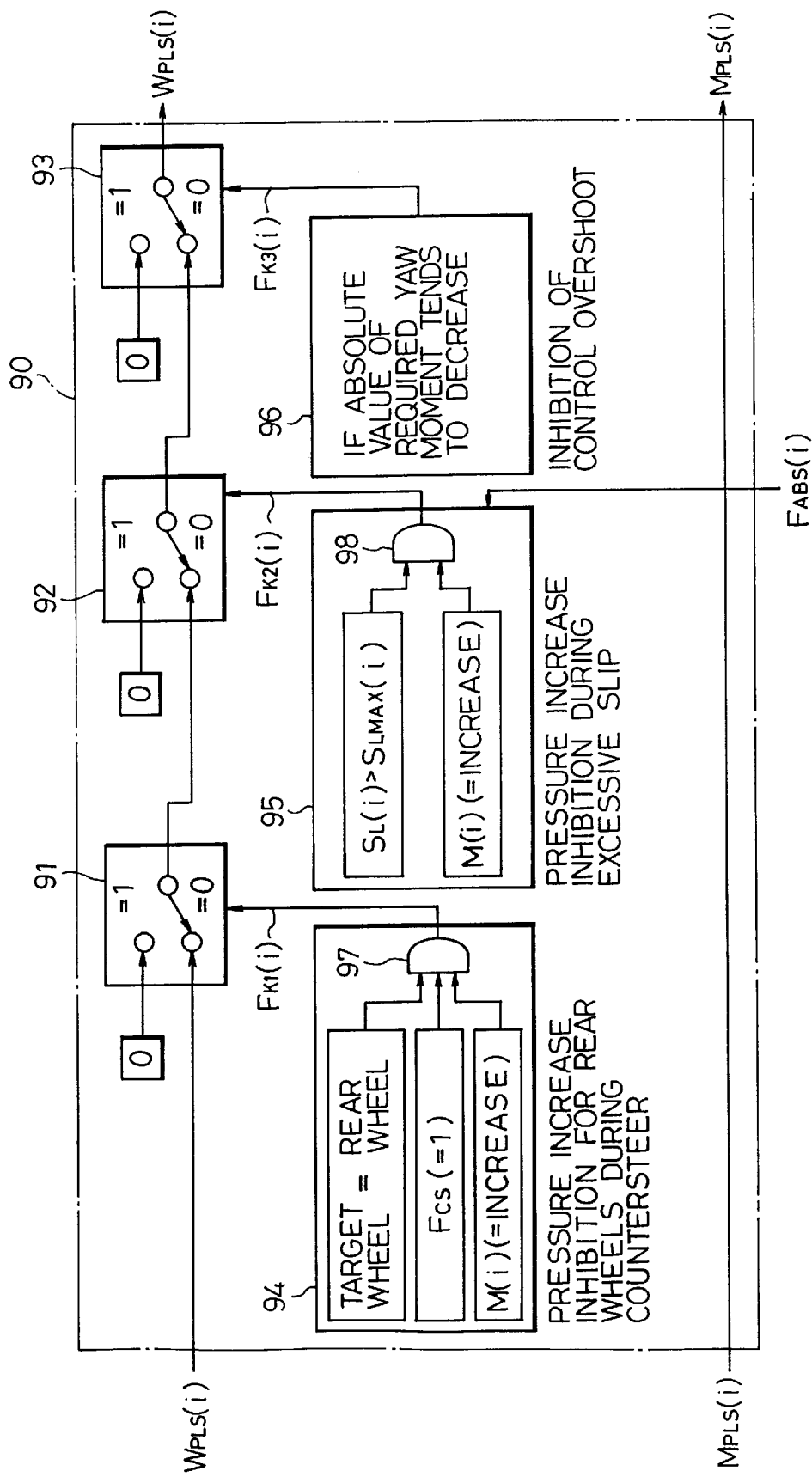
FIG. 26 is a detailed block diagram showing the details of an inhibition section in FIG. 20.

As shown in FIG. 26, the inhibition section 90 has three switches 91, 92 and 93. The pulse width $W_{PLS}(i)$ output from the computing section 89 at the preceding stage passes through the switches 91 to 93 and is then output from the inhibition section 90. The switches 91, 92 and 93 are switched over based on the values of flags respectively set by setting sections 94, 95 and 96. Specifically, when the switches 91, 92 and 93 are set as illustrated, the value of the pulse width $W_{PLS}(i)$ output from the inhibition section 90 is maintained, while when any of the switches 91 to 93 is changed over from the illustrated position, the value of the pulse width $W_{PLS}(i)$ is reset to "0". The value of the pulse width $W_{PLS}(i)$ may be set smaller instead of being rest to "0". As is apparent from FIG. 26, the actuation mode $M_{PLS}(i)$ passes unchanged through the inhibition section 90.

The setting section 94 sets an inhibition flag $F_{K1}(i)$ during countersteer. Specifically, the setting section 94 has an AND gate 97 whose output is supplied as the inhibition flag FK1(i) to the switch 91. When the four input conditions are all met, i.e., when all the inputs are enabled, the AND gate 97 sets the value of the inhibition flag $F_{K1}(i)$ to "1". When any of the input conditions is not satisfied, the AND gate 97 sets the value of the inhibition flag $F_{K1}(i)$ to "0". The first input condition is enabled when the brake flag Fb is "1" and the second input condition is enabled when the target wheel is a rear wheel, i.e., when the wheel number "i" is "3" or "4". The third input condition is enabled when a countersteer flag $F_{CS}$ is "1" and the fourth input condition is enabled when the control mode M(i) is the pressure increase mode. When the inhibition flag $F_{K1}(i)$ is 0, the switch 91 is changed over from the illustrated position to set the value of the pulse width $W_{PLS}(i)$ to 0.

When the slip of the wheel is excessive, the setting section 95 sets "1" to an inhibition flag $F_{K2}(i)$. Namely, the setting section 95 has an AND gate 98 whose output is supplied as the inhibition flag $F_{K2}(i)$ to the switch 92. When the two input conditions are all met, i.e., when all the inputs are enabled, the AND gate 98 sets the value of the inhibition flag $F_{K2}(i)$ to "1". When one of the input conditions is disabled, the AND gate 98 resets the value of the inhibition flag $F_{K2}(i)$ to "0". One of the input conditions is enabled when the slip ratio $S_L(i)$ of the wheel is greater than an allowable slip ratio $S_{LMAX}(i)$, and the other input condition is enabled when the control mode M(i) is the pressure increase mode. The allowable slip ratio $S_{LMAX}(i)$ is read from a map in FIG. 27 based on the required yaw moment γd. The allowable slip ratio $S_{LMAX}(i)$ increases at a given ratio as the required yaw moment yd increases, and its maximum value is set to 20%.

With regard to the map in FIG. 27, when the ABS-invoked brake pressure control on the target wheel for the yaw moment control is initiated, the characteristic of the map may be changed so that the maximum value of the allowable slip ratio $S_{LMAX}(i)$ is limited to the slip ratio of the target wheel at that point in time.

When receiving the flag $F_{K2}(i)=1$, the switch 92 is changed over from the illustrated position, in which case "0" is set as the value of the pulse width $W_{PLS}(i)$.

When the absolute value of the required yaw moment γd decreases at a ratio equal to or greater than a predetermined ratio, i.e., when the conditions are fulfilled, a setting section 96 (see FIG. 26) sets an inhibition flag $F_{K3}$ to "1" to prevent overshoot of the yaw moment control. When the conditions are not met, on the other hand, the inhibition flag $F_{K3}$ is reset to "0". The inhibition flag $FK_3$ is supplied from the setting section 96 to the switch 93 which is switched according to the value of the inhibition flag $F_{K3}$. When the inhibition flag $F_{K3}$ is set to "1", the switch 93 is changed over from the illustrated position to reset the value of the pulse width $W_{PLS}(i)$ to "0".

Figure 28:
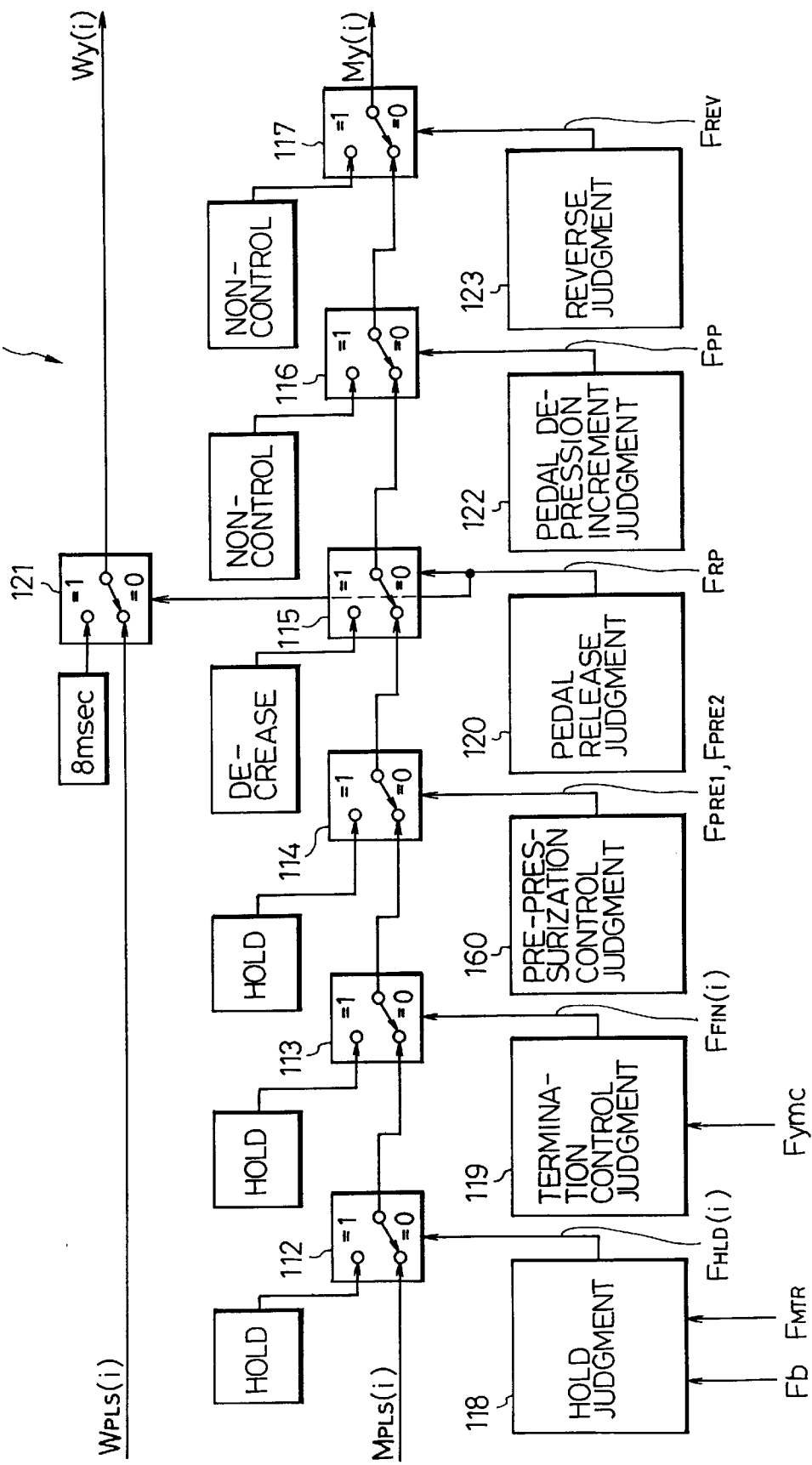
FIG. 28 is a block diagram showing the details of a forcible alteration section in FIG. 20.

Referring to FIG. 20 again, the block for the yaw moment control includes a determining section 100 for pre-pressurization control. This determining section 100 sets pre-pressure flags $F_{PRE1}$ and $F_{PRE2}$ to control the actuation of the individual solenoid valve units (inlet and outlet valves 12 and 13) and the cutoff valves 19 and 20 prior to the initiation of the yaw moment control. Specifically, when the absolute value of the required yaw moment increases to or above a predetermined value or when the maximum yaw rate deviation $\Delta\gamma_{MAX}$ increases to or above a predetermined value so that the yaw moment control is to be initiated, the pre-pressure flags $F_{PRE1}$ or $F_{PRE2}$ is set to "1" and this state continues for a given period of time (e.g., 96 msec). When the yaw moment control starts during this period, the pre-pressure flags $F_{PRE1}$ or $F_{PRE2}$ is reset to "0" at the point of the initiation. The pre-pressure flags $F_{PRE1}$ is prepared for the right turning of the vehicle, whereas the pre-pressure flags $F_{PRE2}$ is prepared for the vehicle's left turning. As shown in FIG. 20, the block for the yaw moment control further includes a forcible alteration section 111 for forced modification of the valve control signals. FIG. 28 illustrates the details of the forcible alteration section 111. This section 111 forcibly modifies the pulse width $W_{PLS}(i)$ and the actuation mode $M_{PLS}(i)$ in accordance with various conditions. Those pulse width $W_{PLS}(i)$ and the actuation mode $M_{PLS}(i)$ are output from the forcible alteration section 111 as a pulse width Wy(i) and actuation mode My(i).

Specifically, as clearly seen from FIG. 28, after passing switches 112 to 117, the actuation mode $M_{PLS}(i)$ is output as the actuation mode My(i). Those switches 112–117 are switched according to values of flags respectively supplied thereto.

The switch 112 is changed over according to the value of a hold flag $F_{HLD}(i)$ output from a hold determining section 118. The determining section 118 sets "1" to the hold flag $F_{HLD}(i)$ for the wheels in the noncontrol mode when the vehicle is not under braking (Fb=0) and when the pumps 16 and 17 are functioning (when an actuation flag $F_{MTR}$ is set to "1"). In this case, the switch 112 is changed over from the illustrated position so that only the actuation mode $M_{PLS}(i)$ which has the noncontrol mode is forcibly changed to the hold mode. When all the hold flags $F_{HLD}(i)$ are reset to "0", the actuation mode $M_{PLS}(i)$ is directly output from the switch 112. Even if the pumps 16 and 17 are actuated when the vehicle is not under braking, therefore, the actuation mode $M_{PLS}(i)$ having the noncontrol mode is forcibly changed to the hold mode so that the discharge pressure from the pump 16 or 17 will not be supplied to the wheel brakes of the wheels.

The switch 113 is changed over according to the value of an end flag $F_{FIN}(i)$ output from a determining section 119 for termination control. When the yaw moment control is terminated and the enable/disable flag Fymc is reset to "0", the determining section 119 periodically sets the end flag $F_{FIN}(i)$ to "1" for a given period of time (e.g., 340 msec). That is, the end flag $F_{FIN}(i)$ is set to "1" only for a predetermined period of time (e.g., 16 msec) every given period (e.g., 40 msec). The end flag $F_{FIN}(i)$ is also used for the open/close control for the cutoff valves 19 and 20, as will be discussed later.

When "1" is set to the end flag $F_{FIN}(i)$, the switch 113 is shifted from the illustrated position. In the actuation modes $M_{PLS}(i)$, therefore, the actuation mode for the target wheel for the yaw moment control is forcibly changed to the hold mode. When all the end flags $F_{FIN}(i)$ are reset to "0", the actuation mode $M_{PLS}(i)$ is directly output from the switch 113. After the termination of the yaw moment control, when the actuation mode of the target wheel to be controlled is periodically changed to the hold mode, the brake pressure of the target wheel does not change rapidly and the behavior of the vehicle becomes stable.

The switch 114 is changed over according to the value of the pre-pressure flag $F_{PRE1}$ or $F_{PRE2}$ output from the determining section 100 for pre-pressurization control. When the pre-pressure flag $F_{PRE1}$ or $F_{PRE2}$ is set to "1", the switch 114 is shifted from the illustrated position. In this case, as to the actuation mode $M_{PLS}(i)$, the actuation mode for the target wheel for the yaw moment control is forcibly changed to the hold mode. When the pre-pressure flags $F_{PRE1}$ and $F_{PRE2}$ are both reset to "0", the actuation mode $M_{PLS}(i)$ is directly output from the switch 114.

FIG. 20 illustrates that the determining section 88 sets the control mode M(i) and the actuation mode $M_{PLS}(i)$ upon reception of the enable/disable flag Fymc. As apparent from FIGS. 23 and 25, however, those control mode M(i) and the actuation mode $M_{PLS}(i)$ are set regardless of the value of the enable/disable flag Fymc. Even when the pre-pressurization control (which will be discussed later) is initiated before the yaw moment control, therefore, the brake pressure of the target wheel to be controlled is not adversely affected.

The switch 115 is changed over based on a release flag $F_{RP}$ which is set by a determining section 120 for determining the release of the brake pedal. When the force on the brake pedal 3 is released while the yaw moment control is being carried out with braking force applied to the vehicle, the determining section 120 sets the release flag $F_{RP}$ to "1" for a predetermined time (e.g., 64 msec). In this case, the switch 115 is shifted from the illustrated position and, as to the actuation mode $M_{PLS}(i)$, the actuation mode for the target wheel to be controlled is forcibly changed to the pressure decrease mode. When the release flag $F_{RP}$ is reset to "0", the switch 115 directly outputs the actuation mode $M_{PLS}(i)$.

As apparent from FIG. 28, the release flag $F_{RP}$ is also supplied to a switch 121. When the release flag $F_{RP}$ is set to "1", the switch 121 is changed over from the illustrated position to forcibly change the value of the pulse width $W_{PLS}(i)$ or the value of the pulse width Wy(i) to the control period T (=8 msec). When the release flag $F_{RP}$ is reset to "0", the pulse width $W_{PLS}(i)$ is directly output as the pulse width Wy(i) from the switch 121.

The switch 116 is switched over in accordance with the value of the aforementioned depression increment flag $F_{PP}$ from a determining section 122 which determines the increment of the depression of the brake pedal. When the depression increment flag $F_{PP}$ is set to "1", the switch 116 is shifted from the illustrated position and all the actuation modes $M_{PLS}(i)$ are forcibly changed to the noncontrol mode. When the depression increment flag $F_{PP}$ is reset to "0", the actuation mode $M_{PLS}(i)$ is directly output from the switch 116. When the actuation modes for all the wheels are forcibly changed to the noncontrol mode, the manipulation of the brake pedal by the driver is reflected on the brake pressures of all the wheels.

The switch 117 is switched over in accordance with the value of a reverse flag $F_{REV}$ output from a reverse determining section 123. When the reverse gear in the transmission gears is selected, the reverse determining section 123 sets the reverse flag $F_{REV}$ to "1". When a forward drive gear is selected, the reverse determining section 123 resets the reverse flag $F_{REV}$ to "0". When the reverse flag $F_{REV}$ is set to "1," the switch 117 is shifted from the illustrated position and the actuation modes $M_{PLS}(i)$ are all forcibly changed to the noncontrol mode. When the reverse flag $F_{REV}$ is reset to "0", the actuation mode $M_{PLS}(i)$ is directly output as the actuation mode My(i) from the switch 117.

As seen from FIG. 20, the output of the section 111 for forcibly modifying the valve control signal, i.e., the actuation mode My(i), or the output of the pre-pressurization control determining section 100, i.e., the pre-pressure flag $F_{PRE1}$ or $F_{PRE2}$ is also supplied to a actuation determining section 124. The details of the actuation determining section 124 are illustrated in FIGS. 29 to 32.

Figure 29:
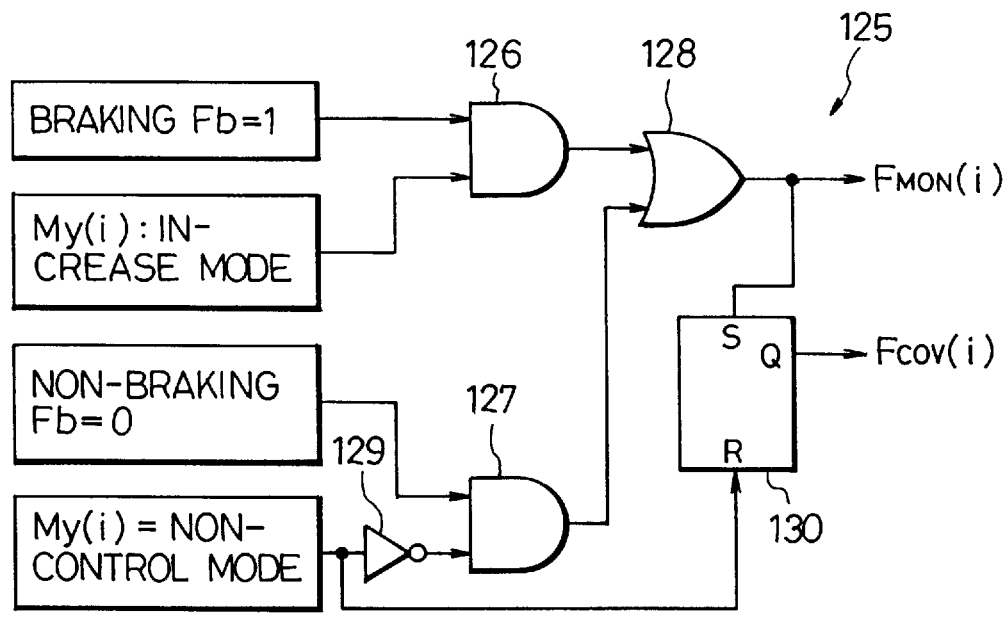
FIGS. 29 through 32 are diagrams showing the details of a drive determining section in FIG. 20.

The actuation determining section 124 has a determining circuit 125 in FIG. 29, which sets a request flag for each of the wheel cylinders of the individual wheels to request the actuation of the cutoff valves 19 and 20 and the motor 18. The determining circuit 125 has two AND gates 126 and 127. When the brake flag Fb is set to "1" and the actuation mode My(i) is the pressure increase mode, all the inputs to the AND gate 126 become enabled. In this case, the AND gate 126 outputs the wheel number i of the wheel in the pressure increase mode to an OR gate 128.

When the brake flag Fb is reset to "0" and the actuation mode My(i) is not the noncontrol mode, all the inputs to the other AND gate 127 become enabled. In this case, the AND gate 127 outputs the wheel number i of the wheel which is not in the noncontrol mode to the OR gate 128. In other words, as apparent from FIG. 29, one input condition to the AND gate 127 is inverted by a NOT gate 129.

Upon reception of the outputs of the AND gates 126 and 127, the OR gate 128 outputs a request flag $F_{MON}(i)$ to request the activation of the motor 18. In this case, "1" is set to the request flag $F_{MON}(i)$ corresponding to the wheel number i supplied to the OR gate 128.

The output of the OR gate 128 is also supplied to the set terminal of a flip-flop 130 whose reset terminal is supplied with a reset signal corresponding to the wheel number i of the wheel in the noncontrol mode as the actuation mode My(i).

When the request flag $F_{MON}(i)$ is supplied to the set terminal of the flip-flop 130, the flip-flop 130 sends out request flags $F_{COV}(i)$ to request the actuation of the cutoff valves 19 and 20. In this case, "1" is set to that of the request flags $F_{COV}(i)$ which is associated with the wheel number i corresponding to the request flag $F_{MON}(i)$ whose value is set to "1". When the flip-flop 130 receives the reset signal, all the request flags $F_{COV}(i)$ are reset to "0".

Figure 30:
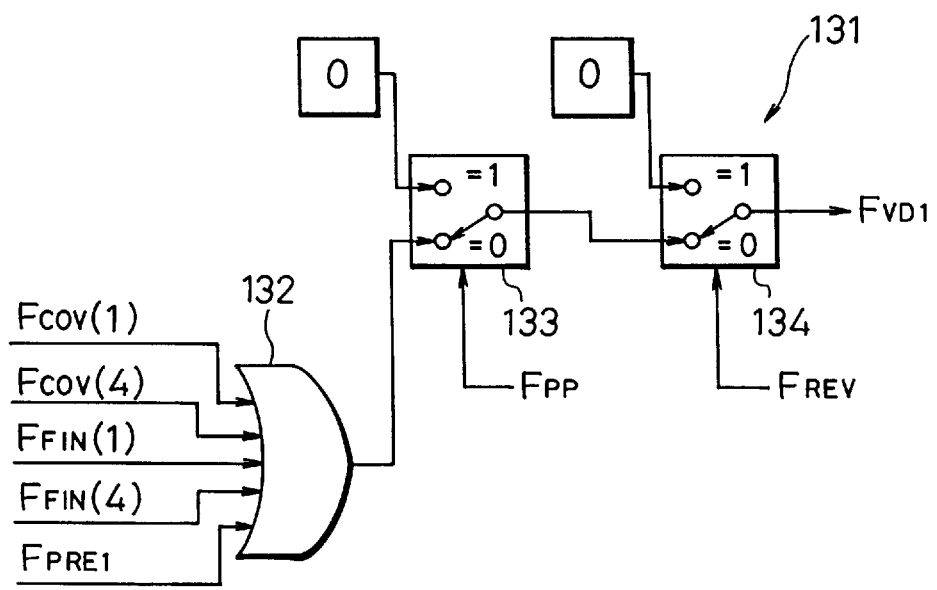

The actuation determining section 124 further includes a determining circuit 131 shown in FIG. 30. This determining circuit 131 has an OR gate 132. When "1" is set to one of the request flags $F_{COV}(1)$ and $F_{COV}(4)$ for the cutoff valve 19 in the side of the left front wheel $FW_L$ and the right rear wheel $RW_R$ side, the end flags $F_{FIN}(1)$ and $F_{FIN}(4)$, and the pre-pressure flag $F_{PRE1}$, the OR gate 132 sets "1" to an actuation flag $F_{VD1}$ for actuating the cutoff valve 19 and outputs the flag.

Switches 133 and 134 are connected to the output line from the OR gate 132. The switch 133 is switched over in accordance with the value of the depression increment flag $F_{PP}$, and the switch 134 is switched over in accordance with the value of the reverse flag $F_{REV}$. That is, when the depression increment flag $F_{PP}$ or the reverse flag $F_{REV}$ is set to "1", the switch 133 or the switch 134 is changed over from the illustrated position. In this case, even if "1" is set to the actuation flag $F_{VD1}$ by the OR gate 132, the actuation flag $F_{VD1}$ is reset to "0" (noncontrol mode).

Figure 31:
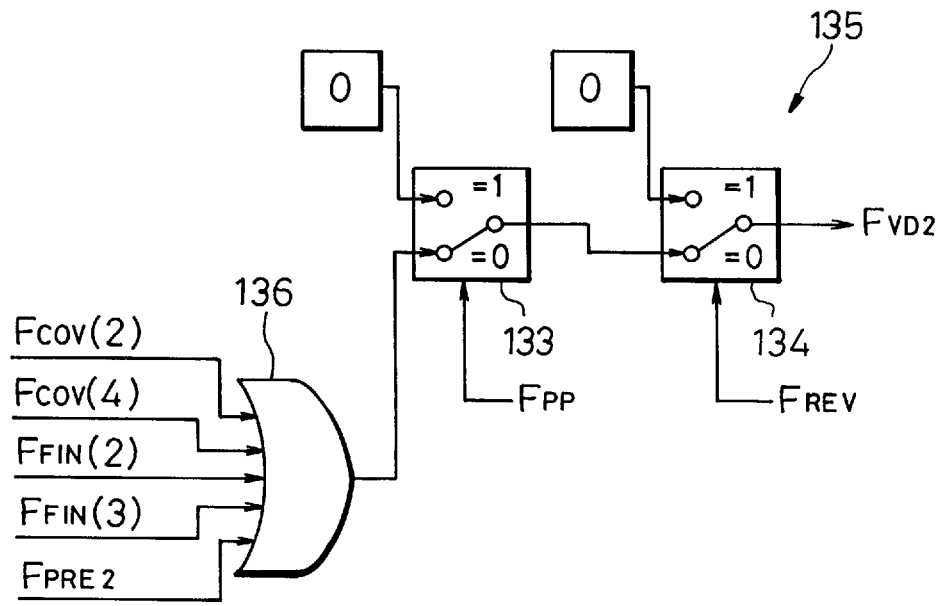

The actuation determining section 124 also includes a determining circuit 135 in FIG. 31, which has the same structure and function as the determining circuit 131 in FIG. 30 except the following points. When "1" is set to one of the request flags $F_{COV}(2)$ and $F_{COV}(3)$, the end flags $F_{FIN}(2)$ and $F_{FIN}(3)$ and the pre-pressure flag $F_{PRE2}$ for the cutoff valves 20 for the right front wheel $FW_R$ and the left rear wheel $RW_L$, an OR gate 136 in the determining circuit 135 sets "1" to an actuation flag $F_{VD2}$ for actuating the cutoff valve 20 and outputs the flag.

Figure 32:
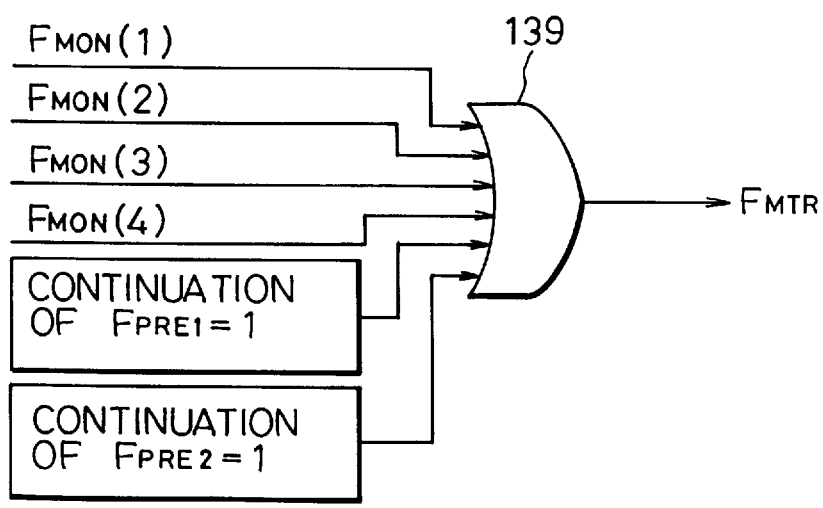

The actuation determining section 124 further includes a determining circuit shown in FIG. 32. This determining circuit has an OR gate 139. When any one of the request flags $F_{COV}(i)$ is kept set to "1" or at least one of the pre-pressure flags $F_{PRE1}$ and $F_{PRE2}$ is kept set to "1", the OR gate 139 sets "1" to an actuation flag $F_{MTR}$ for activating the motor and outputs the actuation flag.

Cooperative Control for ABS

Figure 33:
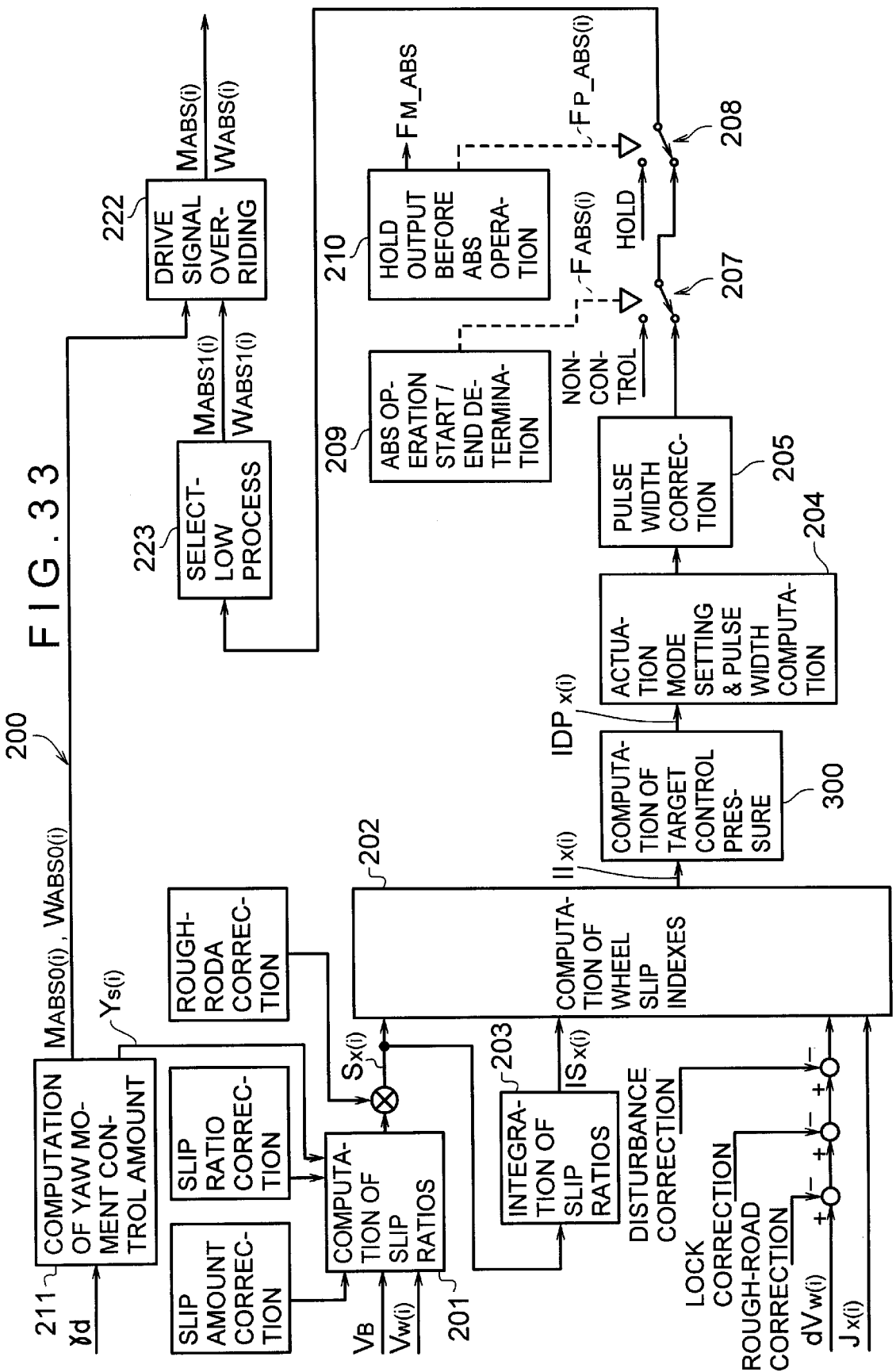
FIG. 33 is a block diagram showing a cooperative control section for cooperative control with an antiskid braking system.

When the actuation mode My(i), the pulse width Wy(i) and the flags $F_{VD1}$, $F_{VD2}$ and $F_{MTR}$ for the yaw moment control are set in the above-described manner, cooperative control with the brake pressure control by the ABS is executed next (see a block 200 in FIG. 3 and Step S7 in FIG. 4). FIG. 33 illustrates the details of the cooperative control block 200.

To begin with, the ABS-invoked brake pressure control will now be described briefly.

When the vehicle body speed $V_B$ and the wheel speed $V_W(i)$ are supplied to a slip-ratio computing section 201, this computing section 201 computes the slip ratio $S_X(i)$ of the wheels according to the following equation:

$$S_X(i) = (V_B - V_W(i))/V_B \times 100 \tag{41}$$

In computing the slip ratio $S_X(i)$, correction in consideration of the yaw moment control is made in addition to correction to the slip amount and correction to the slip ratio. The correction to the slip amount takes account of the frictional coefficient of the road surface where the vehicle runs, whether or not the ABS-initiated brake pressure control has just started, the returning yaw of the vehicle body and so forth. The correction to the slip ratio takes account of the vehicle speed, whether or not the target wheel is a rear wheel, whether the vehicle is turning, the disturbance, etc. Further, the computed slip ratio $S_X(i)$ is subjected to correction in the light of whether the road surface is rough.

Then, the slip ratio $S_X(i)$ is supplied to arithmetic operation sections 202 and 203. The arithmetic operation section 203 integrates the slip ratio $S_X(i)$ and supplies the integration result or the integral value $IS_X(i)$ to the arithmetic operation section 202. The arithmetic operation section 202 is also supplied with a wheel acceleration $dV_W(i)$ and a differentiated wheel acceleration or wheel double acceleration (the double differential of the wheel speed) $J_X(i)$. The wheel acceleration $dV_W(i)$ is subjected to correction associated with whether the road is rough, correction associated with whether the wheels are locked and disturbance-based correction.

The arithmetic operation section 202 computes the slip index $II_X(i)$ based on the slip ratio $S_X(i)$, the integral value $IS_X(i)$, the wheel acceleration $dV_W(i)$ and the wheel double acceleration $J_X(i)$.

The slip index $II_X(i)$ represents slip information of the wheels. Specifically, when the slip index $II_X(i)$ is shifted from the maximum slip ratio (which varies depending on the frictional coefficient $\mu$ of the road surface) or the wheel acceleration $dV_W(i)$ is shifted from the target value, the slip index $II_X(i)$ increases or decreases. When the slip ratio $S_X(i)$ becomes greater than the maximum slip ratio, for example, the slip index $II_X(i)$ increases in the negative direction.

The wheel acceleration $dV_W(i)$ represents the tendency of the recovery of the wheel speed. When the wheel acceleration $dV_W(i)$ is shifted from the target value in the positive direction, the slip index $II_X(i)$ increases in the positive direction. In the opposite case, the slip index $II_X(i)$ increases in the negative direction.

If the wheel double acceleration $J_X(i)$ is taken into consideration in computing the slip index $II_X(i)$, the tendency of the recovery of the wheel acceleration $dV_W(i)$ is detected early, and if the integral value $IS_X(i)$ of the slip ratio $S_X(i)$ is taken account, it is possible to detect the transition of the road surface from a low $\mu$ surface to a high $\mu$ surface. This allows the accurate computation of the slip index $II_X(i)$.

Specifically, the arithmetic operation section 202 computes the slip index $II_X(i)$ of the wheels based on a fuzzy inference involving the slip ratio $S_X(i)$, its integral value $IS_X(i)$, the wheel acceleration $dV_W(i)$ and the wheel double acceleration $J_X(i)$ as input variables. As there are various ways of computing the slip index $II_X(i)$ based on the fuzzy inference, membership functions which specify the fuzzy rules of the fuzzy inference and membership functions for outputting the slip index $II_X(i)$ are omitted.

When the computed slip index $II_X(i)$ is supplied to the next arithmetic operation section 300, this section 300 computes a target control pressure $IDP_X(i)$ which is to be applied to the wheel brakes, based on the slip index $II_X(i)$. The target control pressure $IDP_X(i)$ is acquired by correcting a reference change amount DP(i) which is determined by the slip index $II_X(i)$. The correction amount here is determined in consideration of the optimization of the switching operation of the aforementioned solenoid valve units or the inlet and outlet valves 12 and 13.

Figure 34:
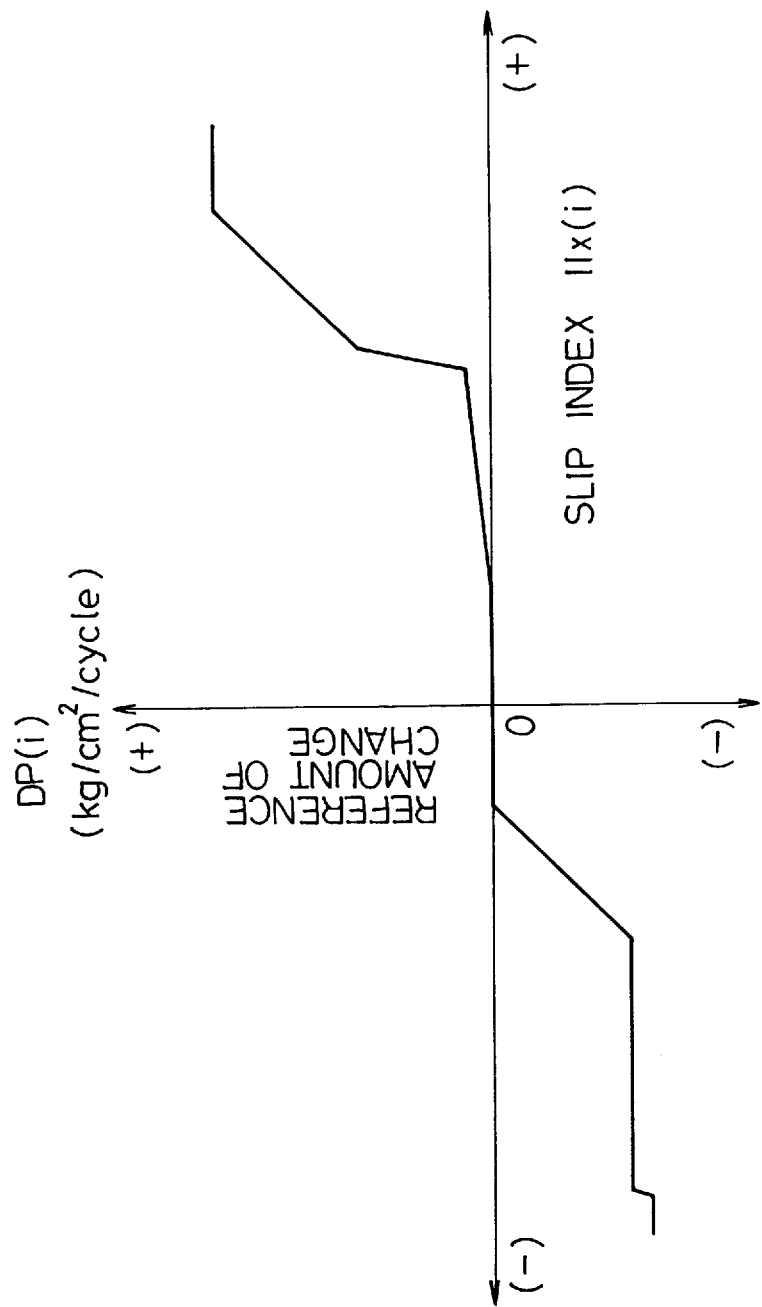
FIG. 34 is a graph showing the relationship between a wheel slip index and a reference change amount of brake pressure.

FIG. 34 shows a conversion map for the reference change amount DP(i). It is apparent from this conversion map that the reference change amount DP(i) increases further according to the pattern shown in FIG. 34 as the slip index $II_X(i)$ starts increasing from a predetermined positive value in the positive direction. As the slip index $II_X(i)$ further increases beyond a predetermined negative value in the negative direction, the reference change amount DP(i) increases in the negative direction according to the pattern shown in FIG. 34.

When the target control pressure $IDP_X(i)$ is supplied to a subsequent arithmetic operation section 204, this section 204 sets the actuation modes for the inlet and outlet valves 12 and 13 and computes the pulse widths in the set actuation modes.

The actuation modes are indicated by "$M_{ABS1}(i)$" and the pulse width by "$W_{ABS1}(i)$" as will be discussed later. Specifically, when the target control pressure $IDP_X(i)$ is a positive value, the associated actuation mode is set to the pressure increase mode, and, when the target control pressure $IDP_X(i)$ takes a negative value, the associated actuation mode is set to the pressure decrease mode. When the target control pressure $IDP_X(i)$ is "0", the associated actuation mode is set to the hold mode.

The relationship between the target control pressure $IDP_X(i)$ and the pulse width satisfies the following equation:

$$IDP_X(i) = \text{gain} \times \text{pulse width}$$

Thus, the pulse width can be computed using the following equation:

$$\text{Pulse width} = IDP_X(i)/\text{gain}$$

where either an increase gain GAPL or a decrease gain $G_{REL}$ is used as the gain in view of the consideration of a variation in the actuation characteristics of the inlet and outlet valves 12 and 13.

The pulse width computed by the arithmetic operation section 204 is corrected by a subsequent arithmetic operation section 205 for the pressure increase mode or the pressure decrease mode in consideration of the switch delay times $T_{DA}$ and $T_{DR}$ of the inlet and outlet valves 12 and 13.

The actuation mode and pulse width acquired in the above manner are output through switches 207 and 208. The switch 207 is changed over in response to a judgment signal from a determining circuit 209. The determining circuit 209 determines if the operation of the ABS should be started and outputs a start/end flag $F_{ABS}(i)$ indicative of the determination result. The switch 208 is changed over in response to a judgment signal from a determining circuit 210. The determining circuit 210 determines if it is just before the start of the operation of the ABS and outputs an actuation flag $F_{P-ABS}(i)$ indicative of the determination result. At the same time of outputting the actuation flag $F_{P-ABS}(i)$, the determining circuit 210 sets "1" to a motor actuation flag $F_{M-ABS}$ to drive the motor 18 for the pumps 16 and 17 and outputs the flag.

When the determining circuit 210 detects that it is just before the start of the operation of the ABS, the switch 208 is shifted to the hold mode side first. When the determining circuit 209 then determines that the operation of the ABS should be initiated, the determining circuits 209 and 210 shift the switches 207 and 208 to the illustrated positions, thus allowing the acquired actuation mode and pulse width to be output. The determinations in the determining circuits 209 and 210 are made on the basis of, for example, the vehicle body speed $V_B$ and the wheel slip index $II_X(i)$.

Figure 35:
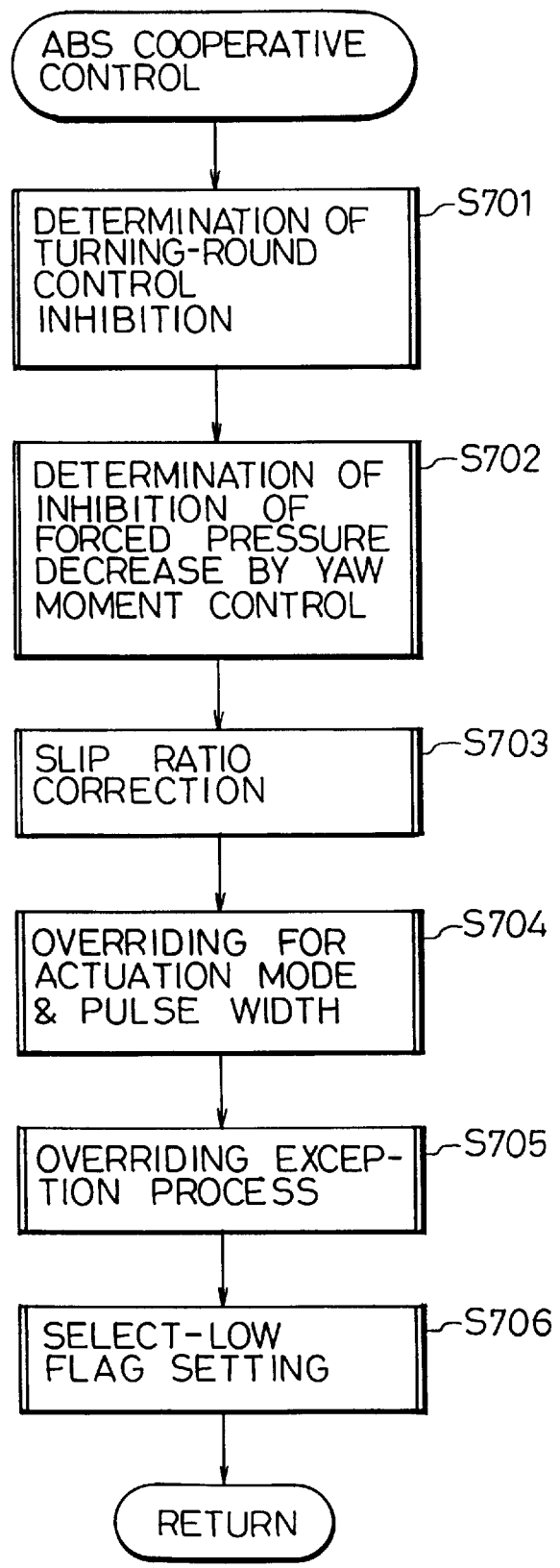
FIG. 35 is a flowchart illustrating a cooperative control routine for cooperative control with the antiskid braking system.

The cooperative control block 200 in FIG. 33 includes a structure for effecting the yaw moment control in addition to the above-described basic structure for the ABS. The following discusses the structure for effecting the yaw moment control. FIG. 35 illustrates a schematic control routine associated with the ABS cooperative control.

Figure 36:
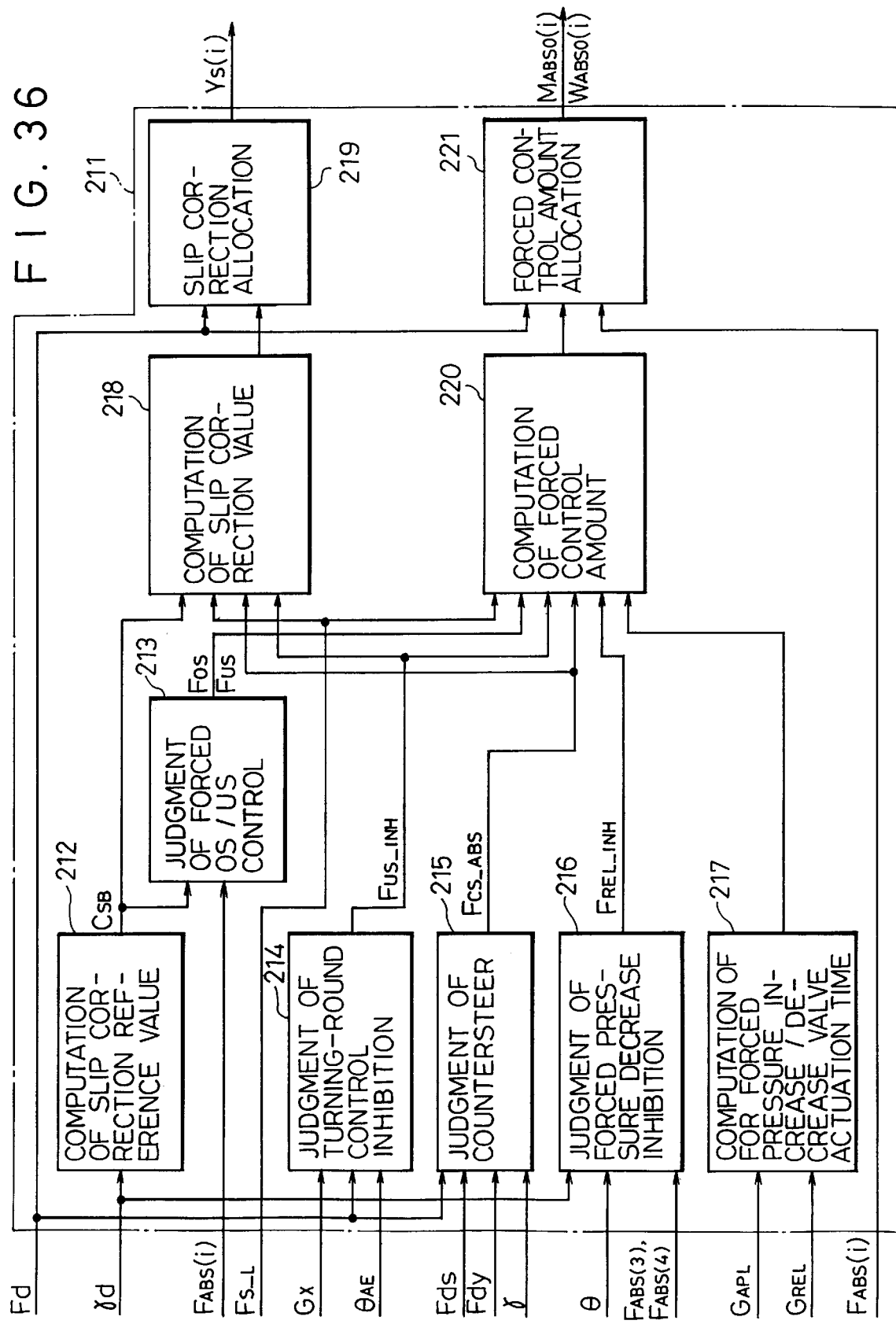
FIG. 36 is a detailed diagram of an arithmetic operation section for computing the control amount of the yaw moment in FIG. 33.

As seen from FIG. 33, the cooperative control block 200 includes an arithmetic operation section 211 for computing the amount of the yaw moment control, and the details of this section 211 are shown in FIG. 36. An arithmetic operation section 212 in FIG. 36 first computes the reference correction amount $C_{SB}$ of slip based on the required yaw moment γd. Specifically, the reference correction amount $C_{SB}$ is read from a map in FIG. 37 based on the required yaw moment γd. It is apparent from the map in FIG. 37 that when the vehicle is making an understeer turn and the required yaw moment γd exceeds 200 kgm/s, the reference correction amount $C_{SB}$ increases in the negative direction. When the vehicle is making an oversteer turn and the required yaw moment γd exceeds −100 kgm/s, the reference correction amount $C_{SB}$ increases in the positive direction.

Then, the reference correction amount $C_{SB}$ of slip is supplied to a determining section 213 which sets timing flags $F_{OS}$ and $F_{US}$ for determining forced control timings, based on the reference correction amount $C_{SB}$. Specifically, those timing flags $F_{OS}$ and $F_{US}$ are set based on the value of the reference correction amount $C_{SB}$ according to a map shown in FIG. 38. More specifically, as seen from FIG. 38, the timing flag $F_{OS}$ is set to "1" from "0" when the reference correction amount $C_{SB}$ exceeds 10%, and it is reset to "0" when the reference correction amount $C_{SB}$ reaches −20%. The timing flag $F_{US}$ is set to "1" from "0" when the reference correction amount $C_{SB}$ increases in the negative direction from −10%, and it is reset to "0" when the reference correction amount $C_{SB}$ reaches 20%. When the brake pressure control by the ABS is not applied to all the wheels, the timing flags $F_{OS}$ and $F_{US}$ are both reset to "0".

A determining section 214 in FIG. 36 is supplied with the required yaw moment γd, the longitudinal acceleration $G_X$ of the vehicle and the effective value $\theta_{AE}$ of the steering-wheel angular velocity, and sets an inhibition flag $F_{US-INH}$ for inhibiting the turning-around control of the vehicle, based on those inputs. This setting routine is shown in Step S701 in FIG. 35 and its details are illustrated in FIG. 39.

Figure 39:
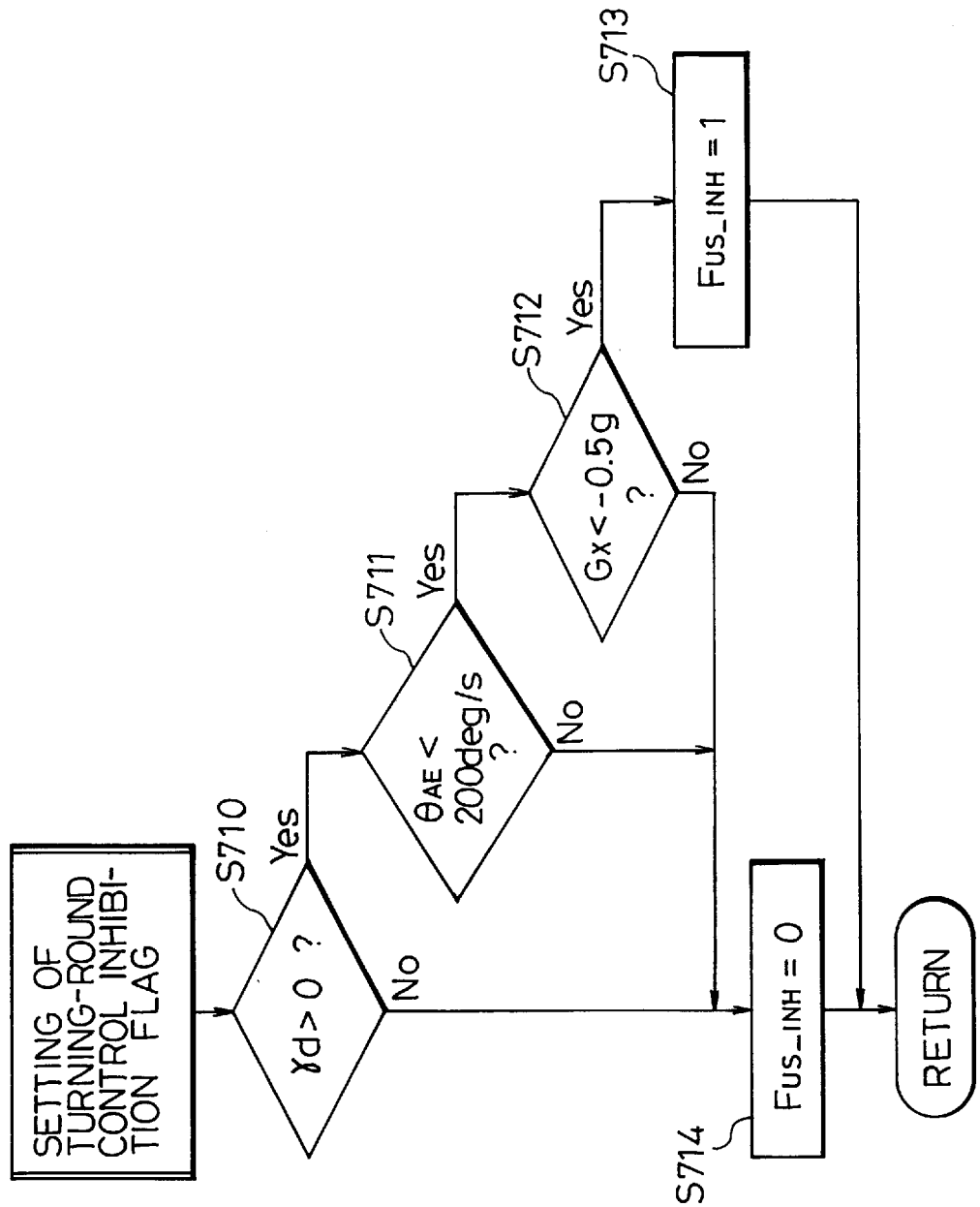
FIG. 39 is a flowchart illustrating a routine for setting a flag to inhibit the turn control of the vehicle head.

As apparent from FIG. 39, first, it is determined in Step S710 if the required yaw moment γd has a positive value, i.e., if the vehicle needs the turning-around control. When the decision is YES, it is then determined if the effective value $\theta_{AE}$ of the steering-wheel angular velocity is smaller than 200 deg/s, for example (Step S711). When this decision is YES too, it is then determined if the longitudinal $G_X$ of the vehicle is smaller than 0.5 g. When the decision is YES, "1" is set to the turning-around inhibition flag $F_{US-INH}$ (Step S713). When any of the decisions in Steps S710, S711 and S712 is NO, the turning-around inhibition flag $F_{US-INH}$ is reset to "0" (Step S714).

A determining section 215 in FIG. 36 is supplied with the required yaw moment γd, the direction flag Fds, the direction flag Fdy, and the yaw rate y, based on which the determining section 215 sets a countersteer flag $F_{CS-ABS}$ indicating whether or not the manipulation of the steering wheel is in a countersteer state under the ABS's brake pressure control. Specifically, the countersteer flag $F_{CS-ABS}$ is set to "1" when all of the conditions given in the following equations are satisfied.

$F_{CS-ABS}=1$ when $Fdy \neq Fds$, and $\gamma d>0$, and $|\gamma|<5$ deg/s $F_{CS-ABS}=0$ otherwise.

Figure 40:
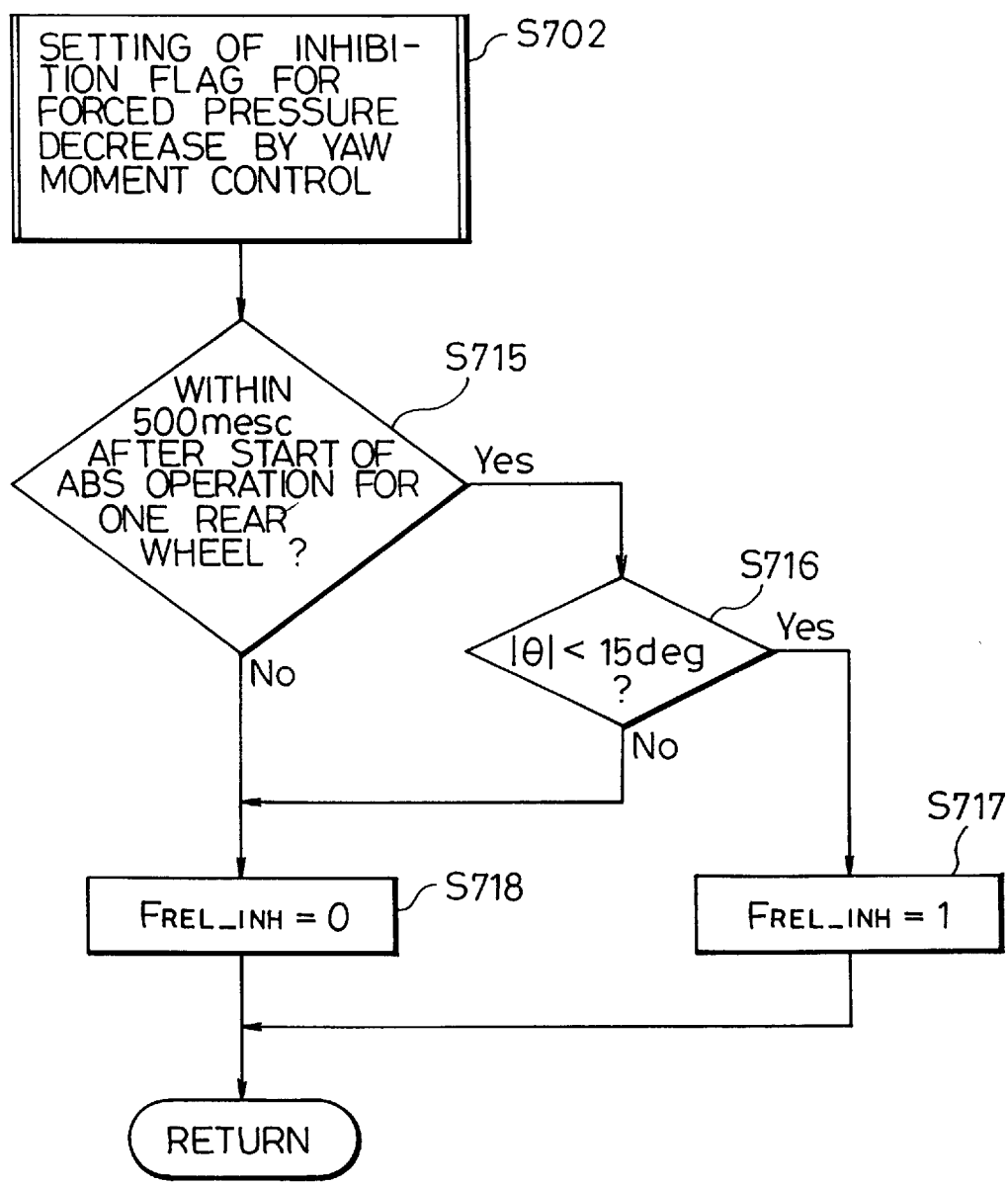
FIG. 40 is a flowchart illustrating a routine for setting a flag to forcibly disable the control of the brake pressure during yaw moment control.

A determining section 216 in FIG. 36 is supplied with the steering-wheel angle θ and the start/end flags $F_{ABS}(3)$ and $F_{ABS}(4)$ for the rear wheels, based on which the determining section 216 sets an inhibition flag $F_{REL-INH}$ for inhibiting the forced reduction of the brake pressure by the yaw moment control. This setting is performed in Step S702 in the routine shown in FIG. 35, and its details are illustrated in FIG. 40. In Step S715 in FIG. 40, it is first determined if the time is within 500 msec after the initiation of the brake pressure control by the ABS on one rear wheel, i.e., after one of the start/end flags $F_{ABS}(3)$ and $F_{ABS}(4)$ was set to "1". When the decision is YES, it is then determined if the vehicle is traveling straight, i.e., if the absolute value of the steering-wheel angle θ is smaller than 15 deg (Step S716). When this decision is YES too, "1" is set to the inhibition flag $F_{REL\_INH}$ (Step S717). When the decision in Step S715 or S716 is NO, the inhibition flag $F_{REL\_INH}$ is reset to "0" (Step S718).

Further, a computing section 217 in FIG. 36 is supplied with the aforementioned increase gain $G_{APL}$ and decrease gain $G_{REL}$. According to the following equations, the computing section 217 computes valve actuation times for the inlet and outlet valves 12 and 13 under forced control in association with the flags $F_{OS}$ and $F_{US}$ for determining the forced control timings.

The valve actuation time $T_{APL\_F}$ when the brake pressure of the front wheels increases is:

$$T_{APL\_F}=T_{GA\_F}\times 1000/G_{APL}+T_{V\_APL}.$$

The valve actuation time $T_{APL\_R}$ when the brake pressure of the rear wheels increases is:

$$T_{APL\_R}=T_{GA\_R}\times 1000/G_{APL}+T_{V\_APL}.$$

The valve actuation time $T_{REL\_F}$ when the brake pressure of the front wheels decreases is:

$$T_{REL\_F}=T_{GR\_F}\times 1000/G_{REL}+T_{V\_REL}.$$

The valve actuation time $T_{REL\_R}$ when the brake pressure of the rear wheels decreases is:

$$T_{REL\_R}=T_{GR\_R}\times 1000/G_{REL}+T_{V\_REL}.$$

In those equations, $T_{GA\_F}=25$ kg/cm², $T_{GA\_R}=25$ kg/cm², and $T_{GR\_F}=T_{GR\_R}=15$ kg/cm². $T_{V\_APL}$ indicates a changeover delay time of the inlet valve 12 when the brake pressure increases, and $T_{V\_REL}$ indicates a change-over delay time of the outlet valve 13 when the brake pressure decreases.

A computing section 218 in FIG. 36 for computing the slip correction amount is supplied with a select-low flag $F_{S\_L}$ (which will be discussed later) in addition to the reference correction amount $C_{SB}$ computed in the computing section 212, the inhibition flag $F_{US\_INH}$ and the countersteer flag $F_{CS\_ABS}$. The select-low flag $F_{S\_L}$ is used to determine a rear wheel to be selected at the time the select-low control for the rear wheels is performed.

The computing section 218 sets the correction amounts of the slip ratios of the outside front wheel, the inside rear wheel and the outside rear wheel as viewed in the vehicle's turning direction, as follows.

When the slip reference correction amount $C_{SB}>0$ and in the oversteer state, correction amount of outside front wheel: $C_{SF\_OUT}=-C_{SB}$ correction amount of inside rear wheel: $C_{SR\_IN}=C_{SB}/2$ correction amount of outside rear wheel: $C_{SR\_OUT}=C_{SB}/2$ When the slip reference correction amount CSB<0 and in the understeer state, correction amount of outside front wheel: $C_{SF\_OUT}=-C_{SB}/2$ correction amount of inside rear wheel: $C_{SR\_IN}=C_{SB}$ correction amount of outside rear wheel: $C_{SR\_OUT}=0$ As exception processes, when the turning-around inhibition flag $F_{US\_INH}=1$ and the slip reference correction amount $C_{SB}<0$, correction amount of outside front wheel: $C_{SF\_OUT}=0$ When the countersteer flag $F_{CS\_ABS}=1$ or the select-low flag $F_{S\_L}=1$, correction amount of outside front wheel: $C_{SF\_OUT}=0$ correction amount of outside rear wheel: $C_{SR\_OUT}=0$ Upon reception of the correction amounts of the slip ratios, a setting section 219 sets correction allocated values $Y_S(i)$ for the slip ratio as follows based on the slip ratio correction amounts and the turning flag Fd.

When Fd=1, $Y_S(1)=C_{SF\_OUT}$, $Y_S(2)=0$, $Y_S(3)=C_{SR\_OUT}$ and $Y_S(4)=C_{SR\_IN}$;

When Fd=0, $Y_S(1)=0$, $Y_S(2)=C_{SF\_OUT}$, $Y_S(3)=C_{SR\_IN}$ and $Y_S(4)=C_{SR\_OUT}$.

As seen from FIG. 33, the correction allocated values $Y_S(i)$ computed in the setting section 219 are supplied to the slip ratio computing section 201, where the correction allocated values $Y_S(i)$ are added to the slip ratio $S_X(i)$. Thus, the slip ratio computing equation is changed to the following equation.

$$S_X(i)=(V_B-V_W(i)-HFV)/V_B\times 100-HSR+Y_S(i) \qquad (42)$$

In equation (42), HFV indicates the aforementioned corrected value of the slip amount, and HSR indicates the corrected value of the slip ratio.

Figure 41:
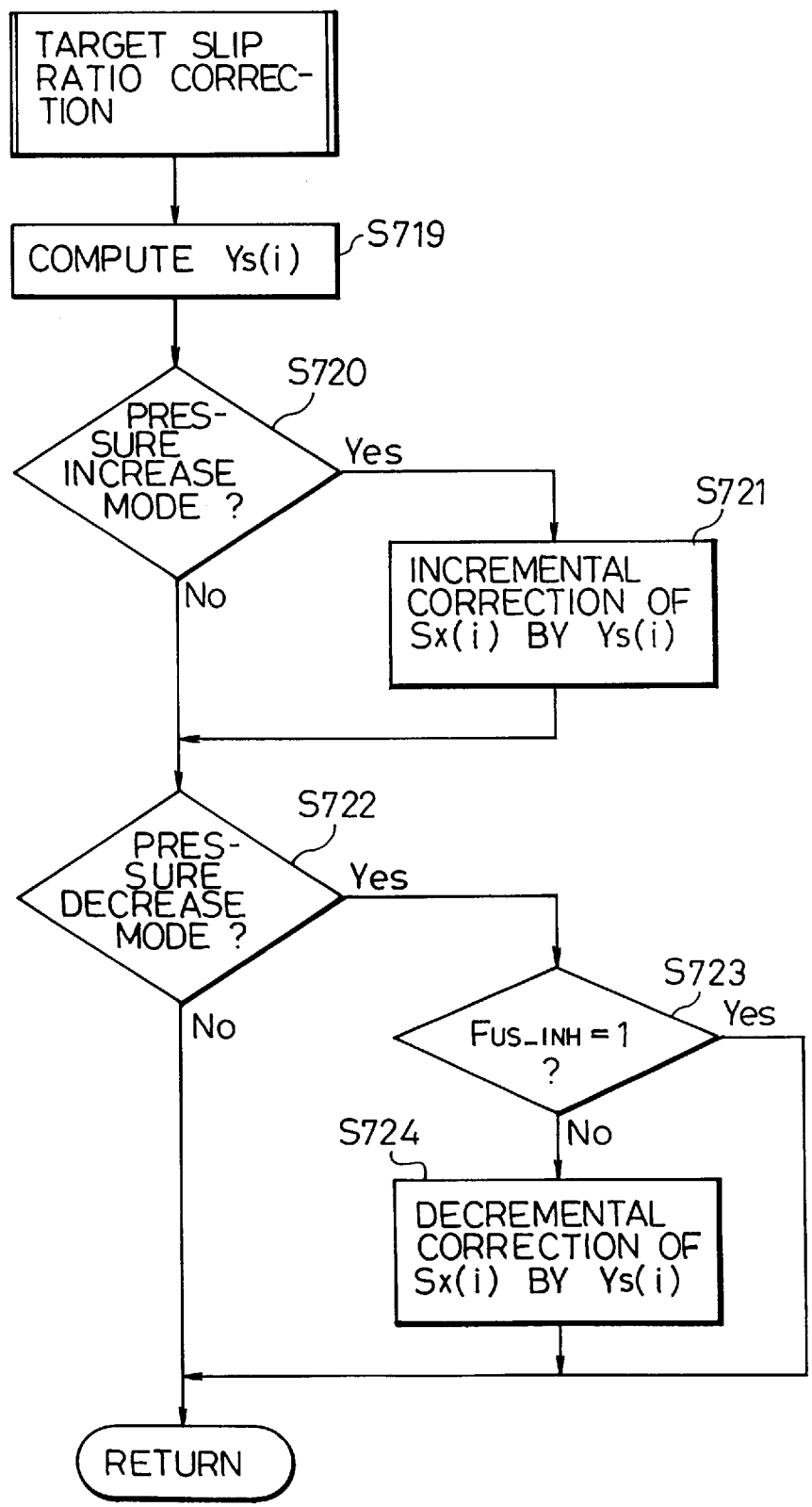
FIG. 41 is a flowchart illustrating a routine for correcting the target slip ratio of wheels in the cooperative control with the antiskid brake control.

The correction associated with the slip ratio is performed in Step S703 in the routine shown in FIG. 35, and only its basic portion is illustrated in FIG. 41. In the flowchart in FIG. 41, first, the correction allocated values $Y_S(i)$ are computed in Step S719, and it is determined if the control mode of the target wheel is the pressure increase mode (Step S720). When the decision is YES, the slip ratio $S_X(i)$ of the wheel which is in the pressure increase mode is corrected based on the correction allocated value $Y_S(i)$ (Step S721). As a result, the slip ratio $S_X(i)$ is increased.

When the decision in Step S720 is NO, on the other hand, it is determined if the control mode of the target wheel is the pressure decrease mode (Step S722). When the decision is YES, it is determined whether the turning-round inhibition flag $F_{US\_INH}$ is set to "1" or not (Step S723). When the decision in this step is NO, the slip ratio $S_X(i)$ of the wheel which is in the pressure decrease mode is corrected based on the correction allocated value $Y_S(i)$ (Step S724). As a result, the slip ratio $S_X(i)$ is decreased.

When the decision in Step S723 is YES, however, Step S724 is bypassed and the slip ratio $S_X(i)$ of the wheel in the pressure decrease mode is not corrected.

In the state that the vehicle shows the understeer tendency at the time of making a turn, when the brake pressure of the outside front wheel is controlled in the pressure decrease mode under the above-described yaw moment control, the braking force of the outside front wheel is reduced. If the ABS works and "1" is set to the turning-around inhibition flag $F_{US\_INH}$ at this time, however, i.e., the driver does not intend to perform an emergency avoiding operation and the effective value $\theta_{AE}$ of the steering-wheel angular velocity is small enough that the steering wheel is kept steered, the slip ratio $S_X(i)$ of the outside front wheel is not corrected. Thus, the decrease of the slip ratio $S_X(i)$ of the outside front wheel is inhibited. Consequently, the decelerating speed of the vehicle is sufficiently secured without reducing the braking force of the outside front wheel.

If the reference correction amount $C_{SB}$ of slip is greater than 0 in computing the aforementioned correction amount of the slip ratio of the wheel in the pressure decrease mode, and the vehicle is making an oversteer turn, $C_{SB}/2$ is set for the correction amount $C_{SR\_OUT}$ of the slip ratio of the outside rear wheel as viewed in the turning direction of the vehicle. As a result, the slip ratio $S_X(i)$ of the outside rear wheel is corrected to increase. Although only the outside front wheel and the inside rear wheel are selected under the above-described yaw moment control (see FIG. 23), therefore, when the ABS works, the outside rear wheel is also selected as the control target wheel. In this case, the slip ratio of the outside rear wheel is corrected to increase, with the result that the brake pressure of the outside rear wheel is controlled in the pressure decrease mode.

Figure 42:
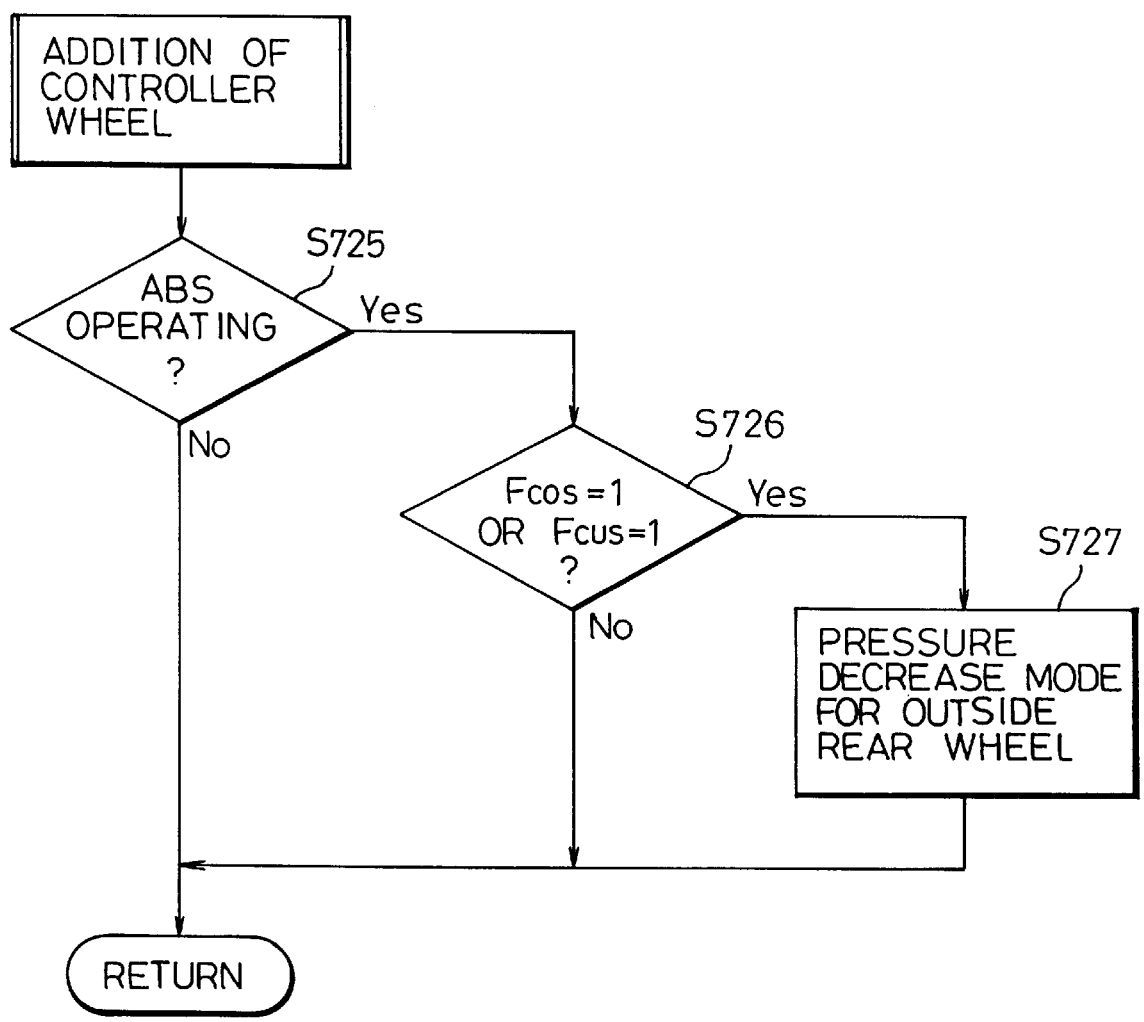
FIG. 42 is a flowchart illustrating a routine for adding a wheel to be controlled during the cooperative control.

Namely, when the ABS is in operation, the target wheel to be controlled is added as shown in the flowchart in FIG. 42. In the flowchart in FIG. 42, first, it is determined if the ABS is in operation (Step S725). When the decision is YES, it is determined if the vehicle head needs the restoration moment at the time of making a turn, i.e., "1" is set to the control execution flag $F_{COS}$ or $F_{CUS}$ (Step S726). When the decision is YES too, the control mode of the outside rear wheel is set to the pressure decrease mode (Step S727).

Referring again to FIG. 36, the arithmetic operation section 211 has a computing section 220 for computing a forced control amount. This arithmetic operation section 220 is supplied with the aforementioned timing flag $F_{US}$ and $F_{OS}$, turning-around inhibition flag $F_{US\_INH}$, countersteer flag $F_{CS\_ABS}$, forced pressure-reduction inhibition flag $F_{REL\_INH}$, valve actuation times $T_{APL\_F}$, $T_{APL\_R}$, $T_{REL\_F}$ and $T_{REL\_R}$ and select-low flag $F_{S\_L}$. Based on those inputs, the arithmetic operation section 220 executes the overriding process with respect to the actuation modes and pulse widths of the outside front wheel, outside rear wheel and the inside rear wheel as viewed in the vehicle's turning direction.

Specifically, when the value of the timing flag $F_{OS}$ is changed to "1" from "0" (under oversteer control):

the actuation mode $M_{F\_OUT}$ and the pulse width $W_{F\_OUT}$ of the outside front wheel are set as follows:
$M_{F\_OUT}$=pressure increase mode and $W_{F\_OUT}$=$T_{APL\_F}$ the actuation mode $M_{R\_IN}$ and the pulse width $W_{R\_IN}$ of the inside rear wheel are set as follows:
$M_{R\_IN}$=pressure decrease mode and $W_{R\_IN}$=$T_{REL\_R}$ the actuation mode $M_{R\_OUT}$ and the pulse width $W_{R\_OUT}$ of the outside rear wheel are set as follows:
$M_{R\_OUT}$=pressure decrease mode and $W_{R\_OUT}$=$T_{REL\_R}$ When the value of the timing flag $F_{US}$ is changed to "1" from "0" (under understeer control):

the actuation mode $M_{F\_OUT}$ and the pulse width $W_{F\_OUT}$ of the outside front wheel are set as follows:
$M_{F\_OUT}$=pressure decrease mode and $W_{F\_OUT}$=$T_{REL\_F}$ the actuation mode $M_{R\_IN}$ and the pulse width $W_{R\_IN}$ of the inside rear wheel are set as follows:
$M_{R\_IN}$=pressure increase mode and $W_{R\_IN}$=$T_{APL\_R}$ the actuation mode $M_{R\_OUT}$ and the pulse width $W_{R\_OUT}$ of the outside rear wheel are set as follows:
$M_{R\_OUT}$=noncontrol mode and $W_{R\_OUT}$=0

In the other cases, the actuation modes $M_{F\_OUT}$, $M_{R\_IN}$ and $M_{R\_OUT}$ are all set to the noncontrol mode and their pulse widths $W_{F\_OUT}$, $W_{R\_IN}$ and $W_{R\_OUT}$ are all set to "0".

As exceptional processes, when the countersteer flag $F_{CS\_ABS}$ is "0" or the select-low flag $F_{S\_L}$ is "0", however, the pulse widths $W_{R\_IN}$ and $W_{R\_OUT}$ of the inside and outside rear wheels are both set to "0"; when the turning-around inhibition flag $F_{US\_INH}$ is "1" and the reference correction amount $C_{SB}$ of slip is smaller than "0", the pulse width $W_{F\_OUT}$ of the outside front wheel is set to "0"; and when the forced pressure-reduction inhibition flag $F_{REL\_INH}$ is "1", the actuation modes of the individual wheels are not set to the pressure decrease mode.

Figure 43:
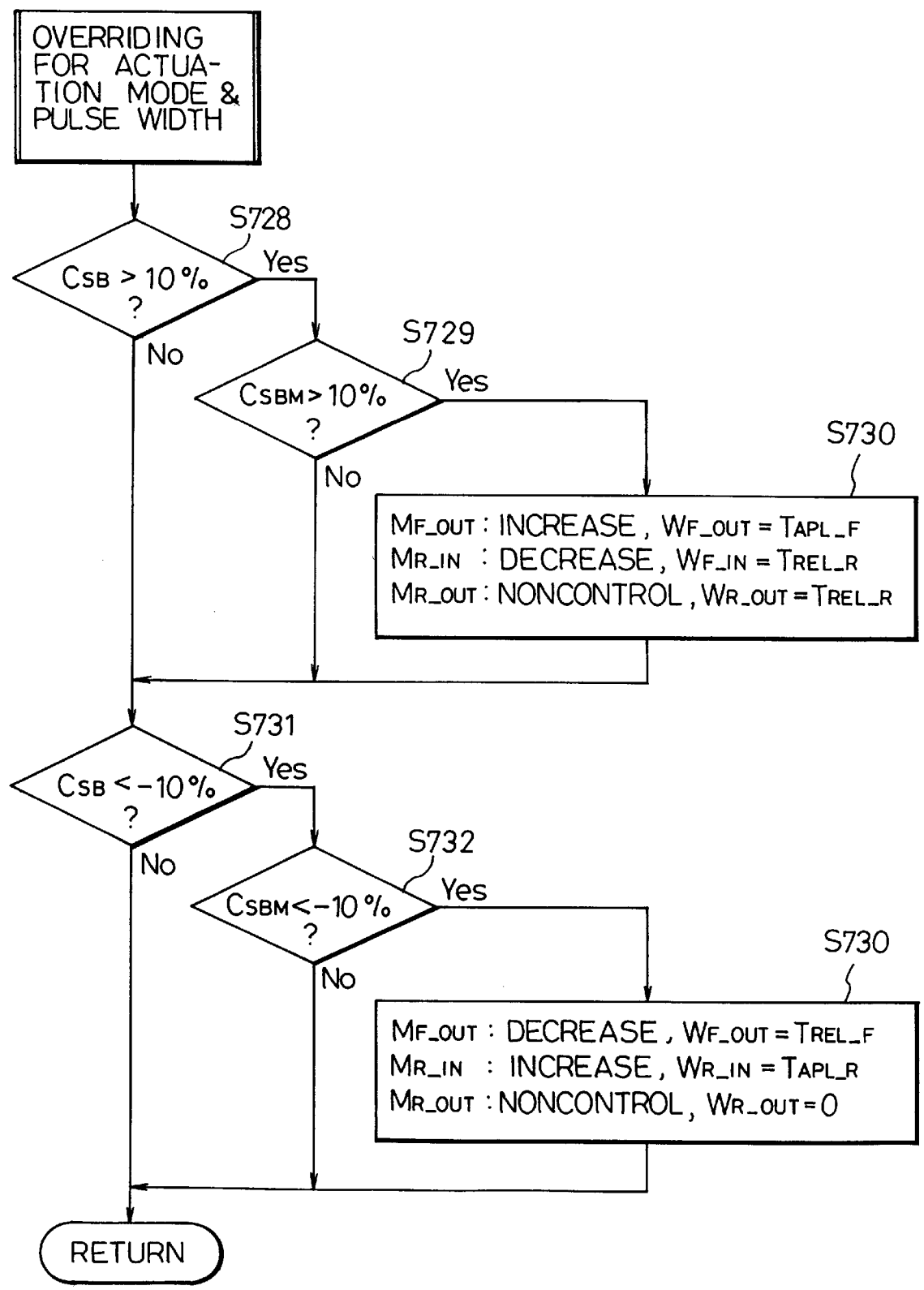
FIG. 43 is a flowchart illustrating an overriding process of the actuation mode and control pulse width.
Figure 44:
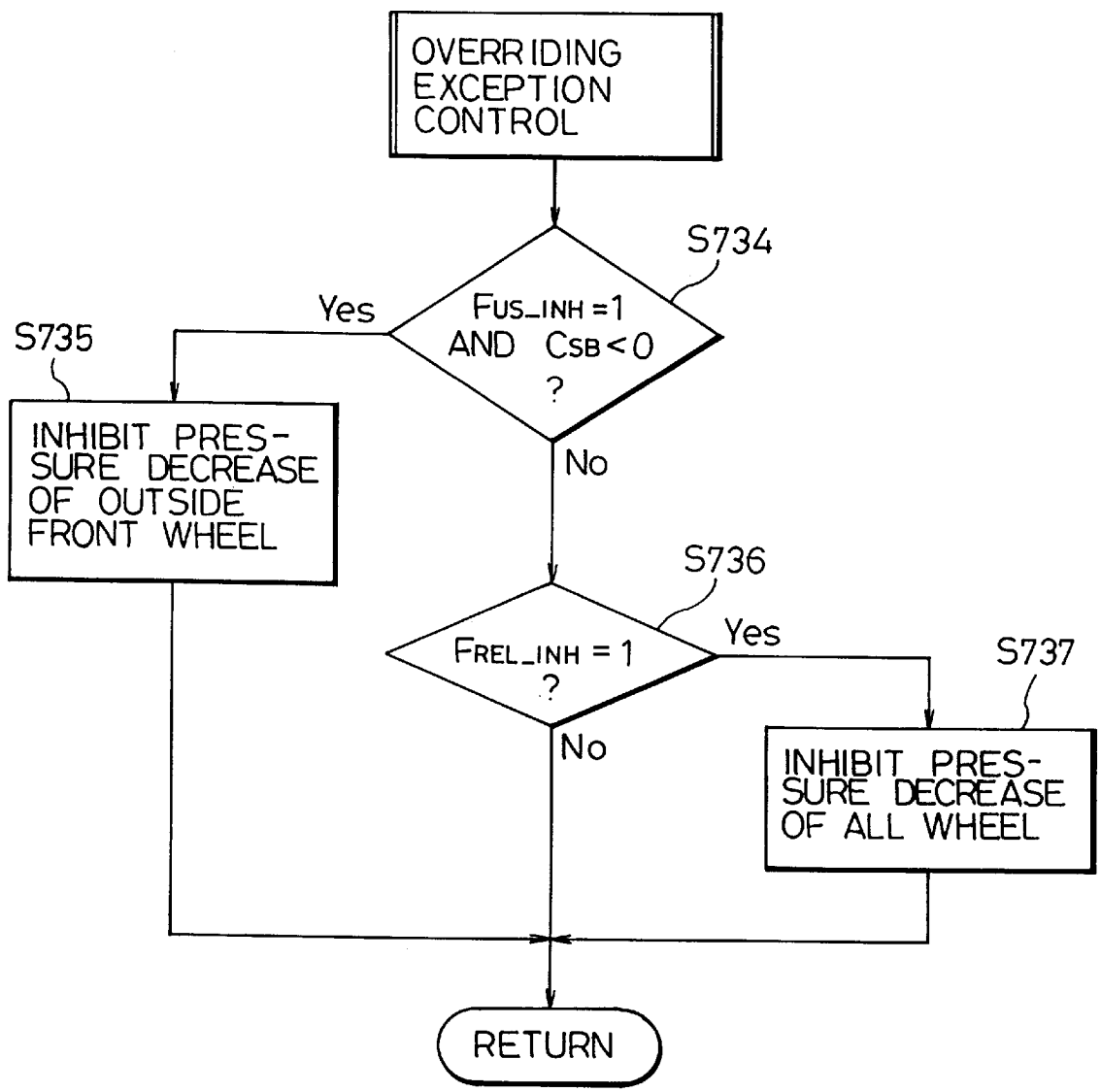
FIG. 44 is a flowchart illustrating an exceptional process in an overriding routine in FIG. 43.

The above-described overriding process of the actuation mode and pulse width and its exceptional processes are executed in Steps S704 and S705 in the routine shown in FIG. 35, and only their basic portions are illustrated in FIGS. 43 and 44. In Step S728 in FIG. 43, it is determined if the reference correction amount $C_{SB}$ of slip has exceeded 10%. When the decision is YES, the previous value CSBM of the reference correction amount $C_{SB}$ is greater than 10% (Step S729). When this decision is YES too, which indicates that the timing flag $F_{OS}$ has been changed to "1" from "0", the actuation mode and the pulse width are set in the above-described manner in next Step S730.

When the reference correction amount $C_{SB}$ of slip is smaller than –10% and when the previous value $C_{SBM}$ of the reference correction amount $C_{SB}$ is also smaller than –10%, i.e., when the decisions in Steps S731 and S732 are both YES, which indicates that the timing flag $F_{US}$ has been changed to "1" from "0", the actuation mode and the pulse width are set in the above-described manner in next Step S733.

In Step S734 in FIG. 44, it is determined if the inhibition flag $F_{US\_INH}$ is "1" and the reference correction amount $C_{SB}$ of slip is smaller than "0". When the decision is YES, the pressure decrease of the outside front wheel as viewed in the vehicle's turning direction is inhibited (Step S735). It is determined in Step S736 if the inhibition flag $F_{REL\_INH}$ for the forced pressure reduction is "1" and when the decision is YES, the pressure reduction of all the wheels is inhibited (Step S737).

When the actuation mode and the pulse width are set in the arithmetic operation section 220 in the above-discussed manner, they are then supplied to a setting section 221 (see FIG. 36). This setting section 221 is also supplied with the turning flag Fd and start flag $F_{ABS}(i)$, based on which the setting section 221 sets the actuation mode $M_{ABS0}(i)$ and pulse width $W_{ABS0}(i)$ of each wheel while the ABS in operation, as follows:

When Fd=1,
$M_{ABS0}(1)=M_{F\_OUT}$, $W_{ABS0}(1)=W_{F\_OUT}$,
$M_{ABS0}(2)$=noncontrol mode, $W_{ABS0}(2)=0$,
$M_{ABS0}(3)=M_{R\_OUT}$, $W_{ABS0}(3)=W_{R\_OUT}$,
$M_{ABS0}(4)=M_{R\_IN}$, $W_{ABS0}(4)=W_{R\_IN}$.

When Fd=0,
$M_{ABS0}(1)$=noncontrol mode, $W_{ABS0}(1)=0$,
$M_{ABS0}(2)=M_{F\_OUT}$, $W_{ABS0}(2)=W_{F\_OUT}$,
$M_{ABS0}(3)=M_{R\_IN}$, $W_{ABS0}(3)=W_{R\_IN}$,
$M_{ABS0}(4)=M_{R\_OUT}$, $W_{ABS0}(4)=W_{R\_OUT}$.

The actuation mode $M_{ABS0}(i)$ and pulse width $W_{ABS0}(i)$ set by the setting section 221 are supplied to a drive signal overriding section 222 (see FIG. 33). Before going to the explanation of this overriding section 222, the aforementioned determining circuit 209 for determining the start and end of the ABS operation and a select-low processing section 223 will be described.

Figure 45:
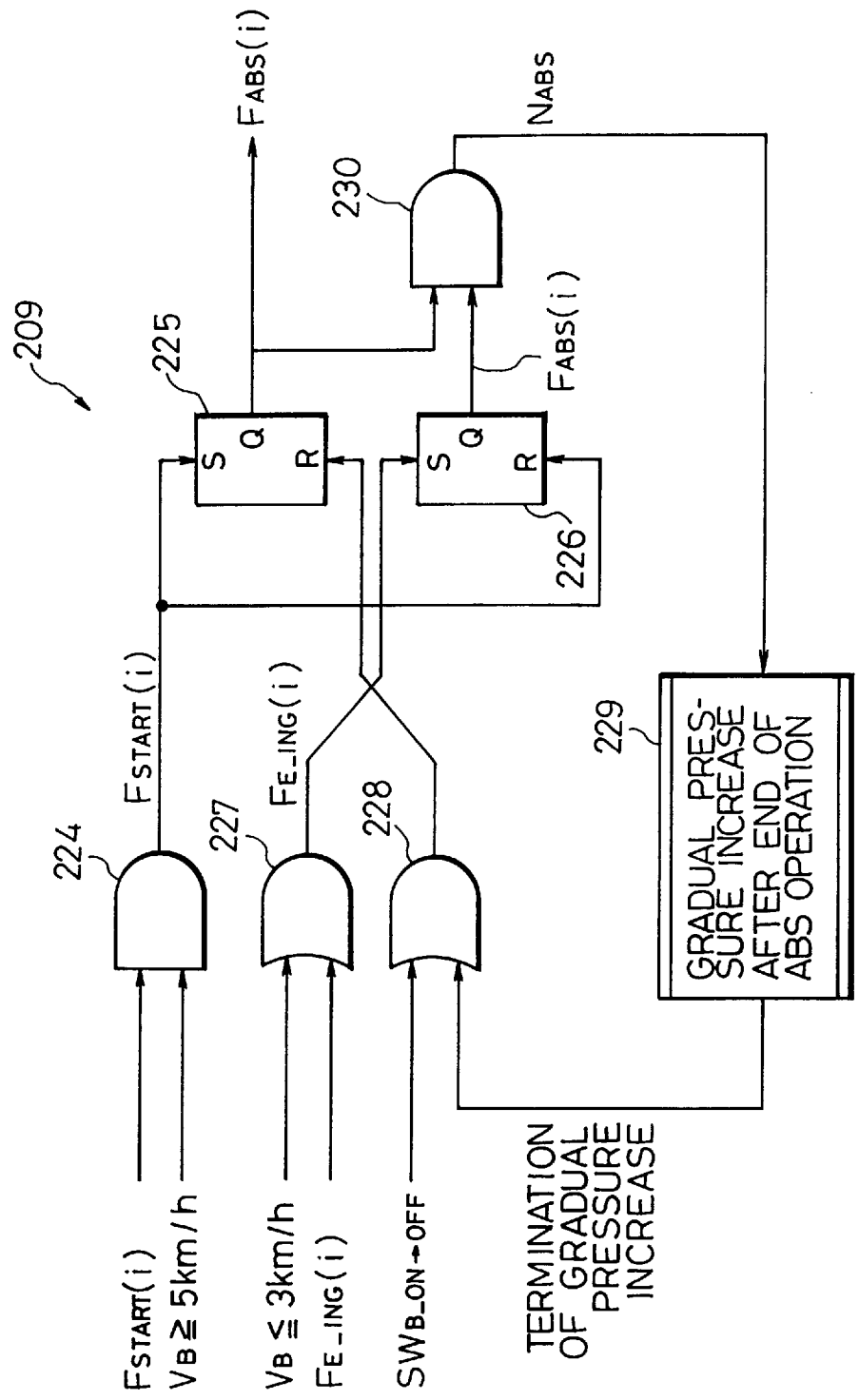
FIG. 45 is a detailed diagram of a determining section for determining the initiation and termination of the operation of the antiskid braking system in FIG. 33.

The determining circuit 209 whose details are illustrated in FIG. 45 has an AND gate 224. One input to the AND gate 224 is enabled when the aforementioned reference change amount DP(i) becomes smaller than a negative predetermined value in two successions. That is, the start flag $F_{START}(i)=1$ is supplied to one input terminal of the AND gate 224. The other input to the AND gate 224 is enabled when the vehicle body speed $V_B$ is equal to or greater than, for example, 5 km/h. The output of the AND gate 224 is supplied to the set terminal of a flip-flop 225 and the reset terminal of a flip-flop 226.

The determining circuit 209 has an OR gate 227 whose one input is enabled when the vehicle body speed $V_B$ is equal to or smaller than, for example, 3 km/h. The other input of the OR gate 227 is enabled when the state of the reference change amount DP(i) kept at a positive value continues for an end judgment time. That is, a flag $F_{E-ING}(i)=1$ (enable signal) indicating the termination process being in process is supplied to the other input terminal of the OR gate 227. The output of the OR gate 227 is supplied to the set terminal of the flip-flop 226.

The state of the reference change amount DP(i) kept at a positive value continues for the end judgment time means that the brake pressure of the target wheel is gradually increased as the termination process after the activation of the ABS (the gradual pressure increase process in progress).

The reset terminal of the flip-flop 225 is connected to the output terminal of another OR gate 228. One input to the OR gate 228 is enabled when the brake switch $SW_B$ (not shown in FIGS. 1 and 2) is switched off. The output of a determining section 229 which determines the gradual pressure increase process to be discussed later is supplied to the other input to the OR gate 228.

The aforementioned start/end flag $F_{ABS}(i)$ is output from the output terminal of the flip-flop 225, and is supplied to one input terminal of an AND gate 230. The output of the flip-flop 226 is supplied to the other input terminal of the AND gate 230.

The start/end flag $F_{ABS}(i)$ output from the flip-flop 225 outputs is supplied to one of the input terminal of an AND gate 230. The other input terminal of the AND gate 230 is supplied with the output from the flip-flop 226.

When both inputs to the AND gate 224 in the determining circuit 209 are enabled and the ABS operation start conditions are fulfilled, "1" is set to the start flags $F_{START}(i)$ of the associated wheels and those start flags $F_{START}(i)$ are supplied to the set terminal of the flip-flop 225. Therefore, the flip-flop 225 sets the value of the start/end flag $F_{ABS}(i)$ corresponding to the start flag $F_{START}(i)=1$ to "1" and outputs the start/end flag $F_{ABS}(i)$. The start/end flag $F_{ABS}(i)$ is also supplied to the AND gate 230.

With regard to the terminating flag $F_{E-ING}(i)$, the end judgment time is changed by the number of wheels to be targeted for the brake pressure control by ABS. For example, the judgment time is set to 1.5 sec when the number of wheels to be the targets of the ABS operation is 3 or greater, and it is set to 200 msec when the number of wheels to be the targets is 2 or less. The number of wheels to be the targets of the ABS operation can be acquired from the number of the start/end flags $F_{ABS}(i)$ whose values are set to "1" or the number-of-wheels $N_{ABS}$ which will be discussed later.

The start flag $F_{START}(i)=1$ output from the AND gate 224 is also supplied to the reset terminal of the flip-flop 226. In this case, after resetting the value of an inversion flag $F_{-ABS}(i)$ corresponding to the start flag $F_{START}(i)=1$ to "0", the flip-flop 226 supplies the inversion flag $F_{-ABS}(i)$ to the AND gate 230. Therefore, there are no start flags $F_{START}(i)$ and inversion flags $F_{-ABS}(i)$ of which the corresponding inputs to the AND gate 230 have values of "1", so that the AND gate 230 sends out no output.

When the driver releases the depression on the brake pedal and the brake switch $SW_B$ is switched off under this situation, the reset signal from the OR gate 228 is supplied to the reset terminal of the flip-flop 225. At this point of time, the values of the start/end flags $F_{ABS}(i)$ output from the flip-flop 225 are all reset to "0". The AND gate 230 sends out no output in this case too.

When one of the inputs to the OR gate 227 is enabled ($V_B<3$ km/h) with any one of the start/end flags $F_{ABS}(i)$ being set to "1", the conditions for terminating the ABS operation are met. In this case, the terminating flags $F_{E-ING}(i)$ whose values are all set to "1" are output from the OR gate 227. If any of the values of the terminating flags $F_{E-ING}(i)$ supplied to the OR gate 227 is set to "1", the terminating flag $F_{E-ING}(i)$ set to "1" is directly output from the OR gate 227, and this output is supplied to the set terminal of the flip-flop 226.

When receiving the terminating flags $F_{E-ING}(i)=1$, the flip-flop 226 sets the value of the corresponding inversion flag $F_{-ABS}(i)$ to "1" and supplies it to the AND gate 230. Since some of the start flags $F_{START}(i)$ and inversion flags $F_{-ABS}(i)$ of which the corresponding inputs to the AND gate 230 have values of "1" exist, the number of the flags having values of "1" or the number-of-wheels $N_{ABS}$ indicating the number of wheels to be targeted by the ABS operation is output from the AND gate 230.

The number-of-wheels $N_{ABS}$ is supplied to the aforementioned determining section 229, which sends an end signal indicating an enable signal to the OR gate 228 when the number-of-wheels $N_{ABS}$ is 2 or smaller. In this case, therefore, the OR gate 228 supplies the reset signal to the reset terminal of the flip-flop 225 at which time the values of the start/end flags $F_{ABS}(i)$ output from the flip-flop 225 are all reset to "0". When the number-of-wheels NABS is equal to or greater than "3", however, the determining section 229 does not output the end signal. When the brake switch $SW_B$ is switched off, therefore, the reset signal is output to the reset terminal of the flip-flop 225 from the OR gate 228.

That is, when the ABS operation is terminated while the condition, vehicle body speed $V_B<3$ km/h or $N_{ABS}<-2$, is satisfied, the aforementioned gradual pressure increase process is not executed.

Figure 46:
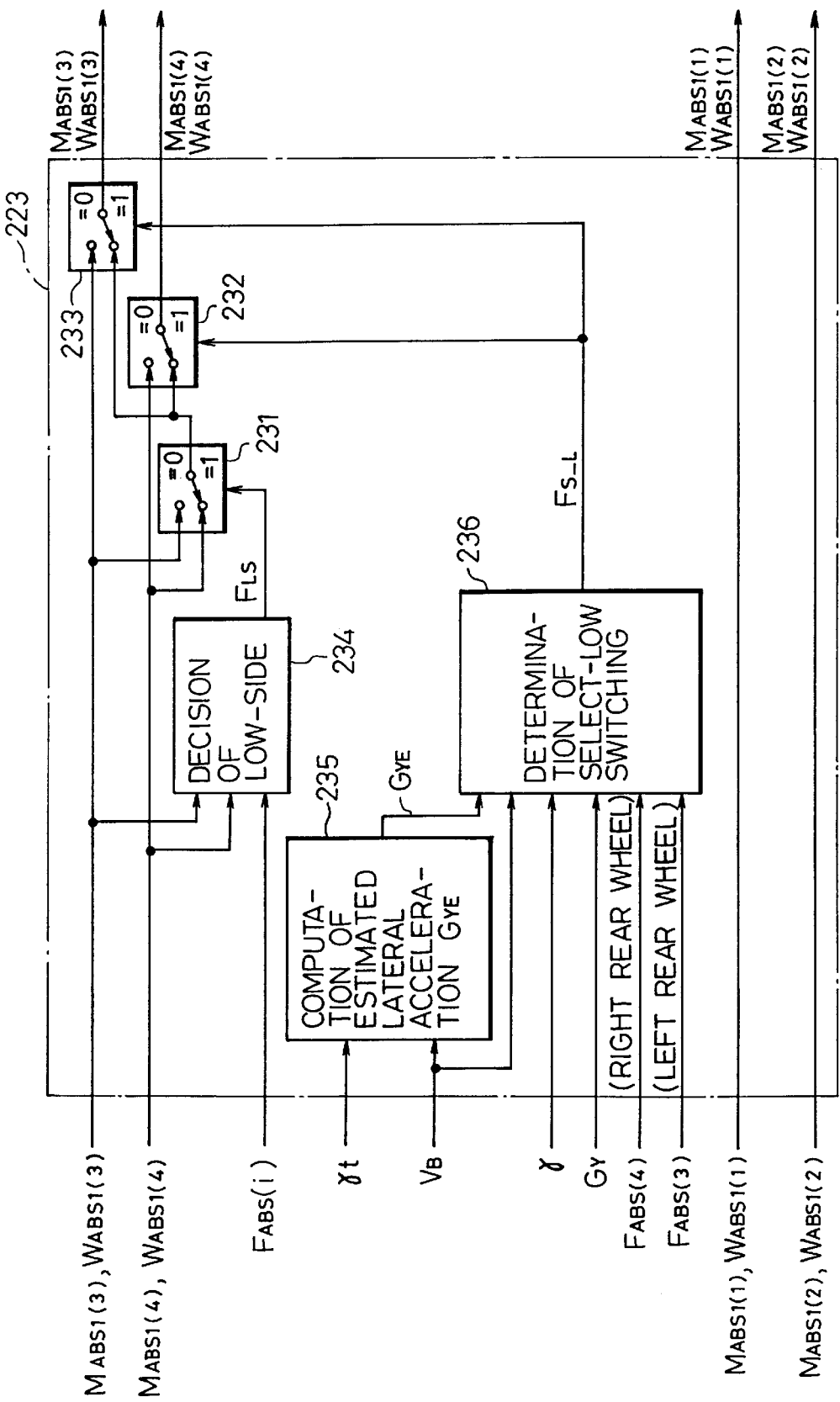
FIG. 46 is a detailed diagram of a processing section for a select-low process in FIG. 33.

FIG. 46 illustrates the details of the aforementioned select-low processing section 223. This processing section 223 has three switches 231, 232 and 234 which are actuated in accordance with the values of associated flags. The actuation mode $M_{ABS1}(3)$ and pulse width $W_{ABS1}(3)$ of the left rear wheel when the ABS operation is performed are respectively supplied to one input terminals of the switches 231 and 233. The actuation mode $M_{ABS1}(4)$ and pulse width $W_{ABS1}(4)$ of the right rear wheel when the ABS operation is performed are respectively supplied to the other input terminal of the switch 231 and one input terminal of the switch 232. The output terminal of the switch 231 is connected to the other input terminals of the switches 232 and 233. The actuation mode $M_{ABS1}(3)$, the pulse width $W_{ABS1}(3)$, the actuation mode $M_{ABS1}(4)$ and the pulse width $W_{ABS1}(4)$ are set and computed in the above-described manner. As seen from FIG. 46, the actuation modes and pulse widths of the left and right front wheels, namely, $M_{ABS1}(1)$, $W_{ABS1}(1)$, $M_{ABS1}(2)$ and $W_{ABS1}(2)$, directly pass through the processing section 223.

The processing section 223 includes a low-side determining section 234, which is supplied with the start/end flag $F_{ABS}(i)$ in addition to the actuation mode $M_{ABS1}(3)$ and the pulse width $W_{ABS1}(3)$ of the left rear wheel and the actuation mode $M_{ABS1}(4)$ and the pulse width $W_{ABS1}(4)$ of the right rear wheel.

Figure 47:
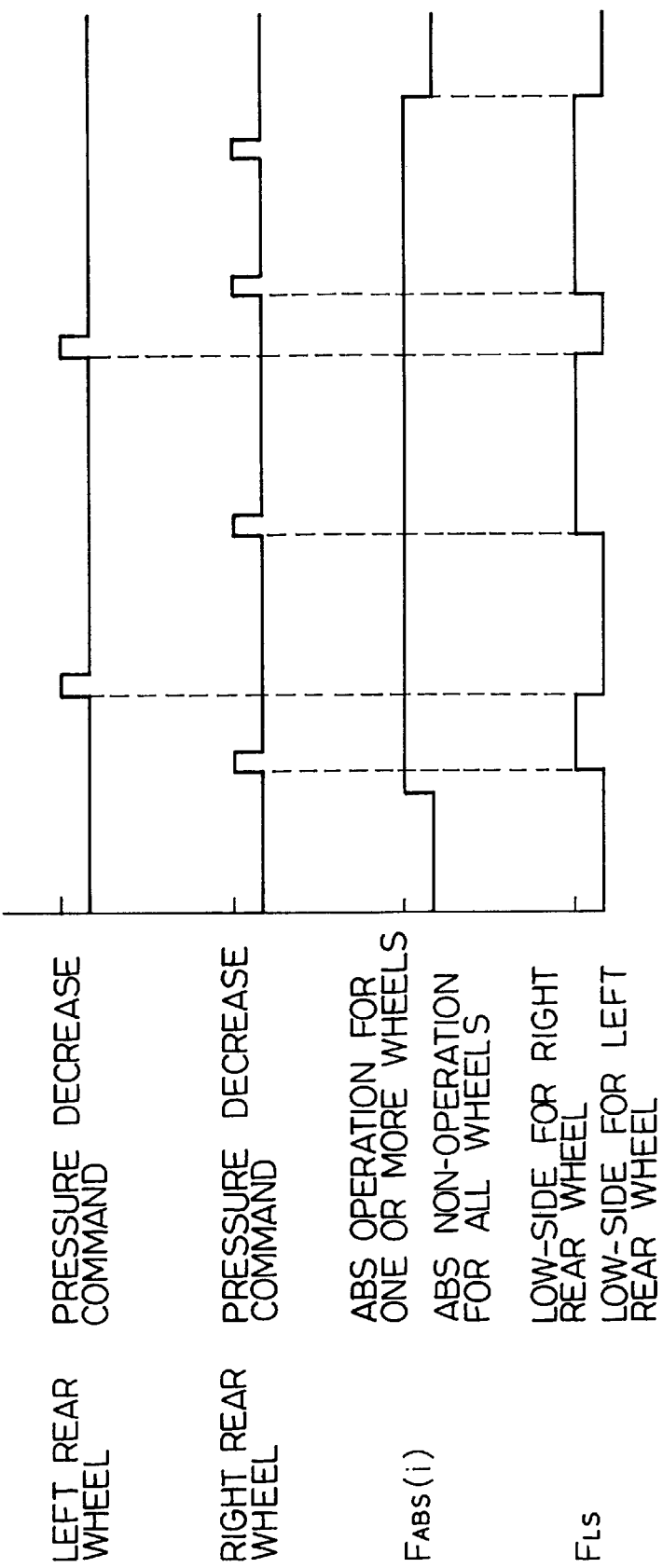
FIG. 47 is a timing chart showing a timing for setting the low side in the select-low process.

In executing the select-low control of the rear wheels at the ABS operation, first, the determining section 234 determines the low side rear wheel. Basically, as shown in the timing chart in FIG. 47, that of the right and left rear wheels which receives the brake pressure decrease instruction is determined as the low side rear wheel. When the left rear wheel is the low side, for example, the determining section 234 resets the low-side flag $F_{LS}$ to "0" and then supplies it to the switch 231. When the right rear wheel is the low side, on the other hand, the determining section 234 sets the low-side flag $F_{LS}$ to "1" and then supplies it to the switch 231.

Determination as to whether or not the left and right rear wheels have received the brake pressure decrease instruction can be made based on the actuation modes $M_{ABS1}(3)$ and $M_{ABS1}(4)$ and the pulse widths $W_{ABS1}(3)$ and $W_{ABS1}(4)$. When the right and left rear wheels simultaneously receive the brake pressure decrease instruction, it is determined that the rear wheel whose pulse width is longer is the low side.

The switch 231 is changed over in accordance with the value of the low-side flag $F_{LS}$. When the switch 231 receives $F_{LS}=0$ (the left rear wheel is the low side), the actuation mode $M_{ABS1}(3)$ and the pulse width $W_{ABS1}(3)$ of the left rear wheel are supplied to the other input terminals of the switches 232 and 233 from the output terminal of the switch 231. When the switch 231 receives $F_{LS}=1$ (the right rear wheel is the low side), the actuation mode $M_{ABS1}(4)$ and the pulse width $W_{ABS1}(4)$ of the right rear wheel are supplied to the other input terminals of the switches 232 and 233, respectively, from the output terminal of the switch 231.

The processing section 223 further has a computing section 235 for computing an estimated lateral acceleration. This computing section 235 computes estimated lateral acceleration $G_{YE}$ based on the target yaw rate γt and the vehicle body speed $V_B$ according to the following equation:

$$G_{YE} = \gamma t \times V_B$$

The processing section 223 further includes a determining section 236 for determining the switching of the select low. This determining section 236 is supplied with the estimated lateral acceleration $G_{YE}$, the yaw rate γ, the lateral $G_Y$, and the start/end flags $F_{ABS}(3)$ and $F_{ABS}(4)$ for the left and right rear wheels. Based on those inputs, the determining section 236 sets the value of the aforementioned select-low flag $F_{S\_L}$. The setting routine for the select-low flag $F_{S\_L}$ is executed in Step S706 in the routine in FIG. 35, and its details are illustrated in FIG. 48.

Figure 48:
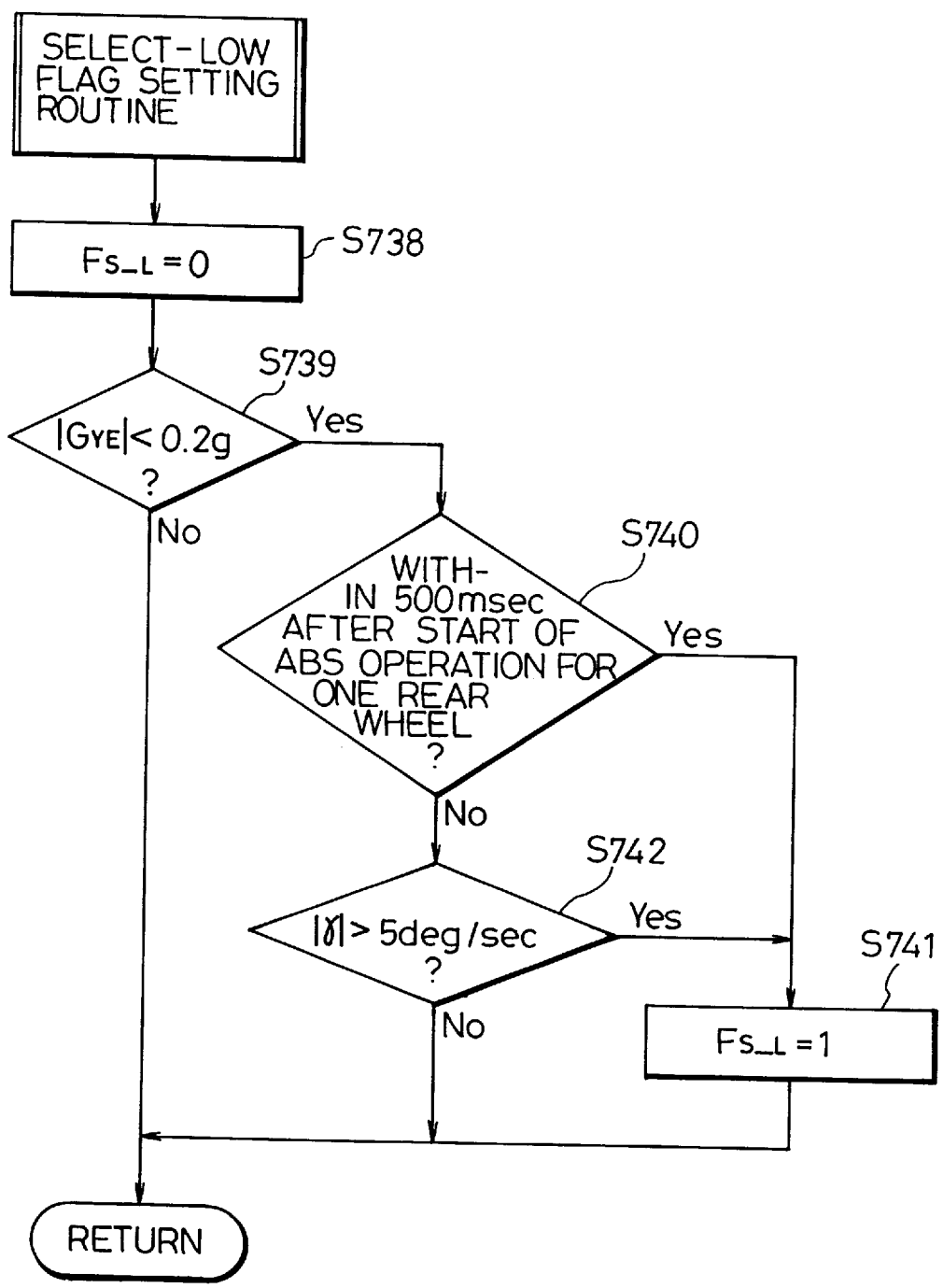
FIG. 48 is a flowchart illustrating a routine for setting a select-low flag.

In the flowchart in FIG. 48, first, the select-low flag $F_{S\_L}$ is reset to "0" (Step S738) after which it is then determined if the absolute value of the estimated lateral acceleration $G_{YE}$ is smaller than 0.2 g, for example (Step S739). When the decision is YES, it is predicated that the vehicle is traveling straight. It is then determined if the time passed after the start of the ABS operation on one rear wheel is within 500 msec (Step S740). With regard to the determination in this Step S740, specifically, the time passed after the setting of one of the start/end flags $F_{ABS}(3)$ and $F_{ABS}(4)$ of the left and right rear wheels to "1" is within 500 msec.

When the decision in Step S740 is YES, "1" is set to the select-low flag $F_{S\_L}$ (Step S741). Even if the decision in Step S740 is NO, when it is determined whether the absolute value of the yaw rate γ is greater than, for example, 5 deg/sec (Step S742) and the decision here becomes YES, i.e., when the turning action of the vehicle is unstable, "1" is set to the select-low flag $F_{S\_L}$ (Step S741). When the decision in Step S379 or S742 becomes NO, the select-low flag $F_{S\_L}$ is kept at "0". Even when the vehicle body speed $V_B$ is in the high speed range, the lateral $G_Y$ is small or the longitudinal $G_X$ is large, the select-low flag $F_{S\_L}$ is set to "1".

As seen from FIG. 46, the select-low flag $F_{S\_L}$ set in the determining section 236 is supplied to the switches 232 and 233. When the select-low flag $F_{S\_L}=1$ is supplied to those switches 232 and 233, the switches 232 and 233 are switched to the illustrated positions so that the actuation mode and pulse width of the low-side rear wheel which are determined according to the value of the low-side flag $F_{LS}$ are output from the output terminals of the switches 232 and 233. When the select-low flag $F_{S\_L}=0$ is supplied to those switches 232 and 233, however, the switches 232 and 233 are switched from the illustrated positions. Consequently, the actuation mode $M_{ABS1}(3)$ and the pulse width $W_{ABS1}(3)$ of the left rear wheel, and the actuation mode $M_{ABS1}(4)$ and the pulse width $W_{ABS1}(4)$ of the right rear wheel are respectively output from the output terminals of the switches 232 and 233, so that the brake pressures of the right and left rear wheels are controlled independently.

The actuation mode $M_{ABS1}(i)$ and the pulse width $W_{ABS1}(i)$ output from the select-low processing section 223 are supplied to the aforementioned drive-signal overriding section 222 (see FIG. 33). The overriding section 222 is also supplied with the actuation mode $M_{ABS0}(i)$ and the pulse width $W_{ABS0}(i)$ output from the yaw moment computing section 211. The overriding section 222 selects one pair of the actuation modes and pulse widths based on the aforementioned timing flags $F_{US}$ and $F_{OS}$ and brake switch $SW_B$, and sends out the selected actuation mode and pulse width as the actuation mode $M_{ABS}(i)$ and the pulse width $W_{ABS}(i)$.

Specifically, when one of the timing flags $F_{US}$ and $F_{OS}$ is changed to "1" from "0" and the brake switch $SW_B$ is enabled (when the brake pedal is thrust down), the actuation mode $M_{ABS0}(i)$ and the pulse width $W_{ABS0}(i)$ are selected as the actuation mode $M_{ABS}(i)$ and the pulse width $W_{ABS}(i)$.

That is, $M_{ABS}(i) = M_{ABS0}(i)$ $W_{ABS}(i) = W_{ABS0}(i)$

In other conditions than the aforementioned ones, the actuation mode $M_{ABS1}(i)$ and the pulse width $W_{ABS1}(i)$ are selected as the actuation mode $M_{ABS}(i)$ and the pulse width $W_{ABS}(i)$.

That is, $M_{ABS}(i) = M_{ABS1}(i)$ $W_{ABS}(i) = W_{ABS1}(i)$

Selection of Control Signal

Figure 49:
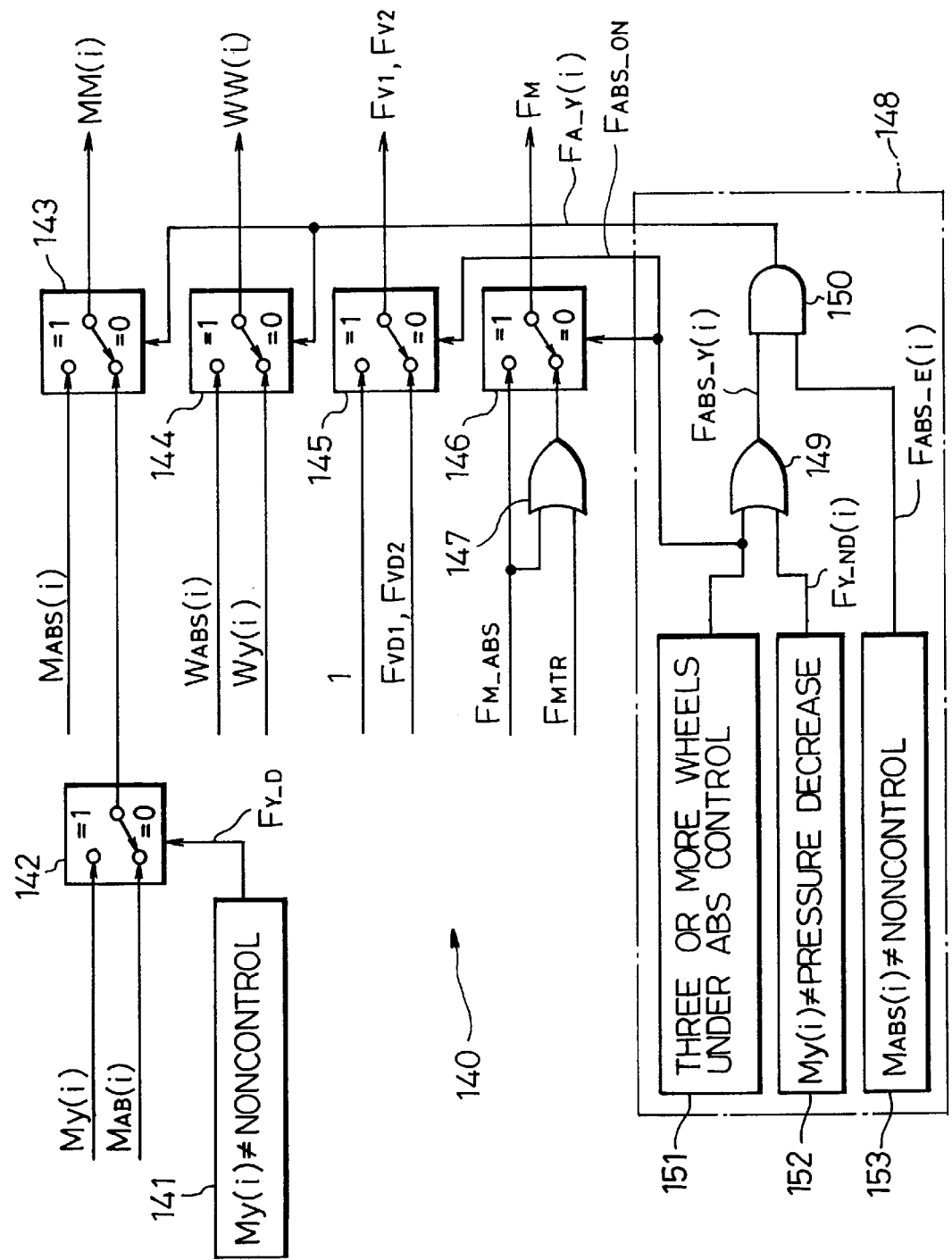
FIG. 49 is a block diagram showing the details of a selection section in FIG. 3.

Referring again to FIG. 3, it is apparent that the actuation mode $M_{ABS}(i)$ and the pulse width $W_{ABS}(i)$ output from the aforementioned cooperative control block 200 and the actuation mode My(i) and pulse width Wy(i) output from the yaw moment control block 78 are supplied to a control signal selecting block 140. FIG. 49 shows the details of this selecting block 140. The selecting block 140 is equivalent to Step S8 in the main routine in FIG. 4.

The selecting block 140 has five switches 142 to 146. The switch 142 has two input terminals one of which is supplied with the actuation mode My(i) for yaw moment control and the other one supplied with actuation mode $M_{DB}(i)$ that is set in the braking force allocation control in association with the front and rear wheels. The braking force allocation control, though not discussed in detail, will be discussed briefly as follows. In the braking force allocation control, first, it is determined if the slips of the rear wheels are excessive based on the relative slip amounts of the rear wheels to the front wheels and the wheel speeds $V_W(3)$ and $V_W(4)$ of the rear wheels. When the decision is YES, i.e., when the slips of the rear wheels are excessive, the hold mode is set for the actuation mode $M_{DB}(3)$ and $M_{DB}(4)$ of the rear wheels. In this case, the actuation mode $M_{DB}(1)$ and $M_{DB}(2)$ of the front wheels are kept to the noncontrol mode.

The actuation mode $M_{ABS}(i)$ set in the ABS cooperative control is supplied to one input terminal of the switch 143 whose other input terminal is connected to the output terminal of the switch 142. In accordance with the switched position of the switch 142, therefore, one of the actuation modes $My(i)$ and $M_{DB}(i)$ is supplied to the other input terminal of the switch 143. The pulse width $W_{ABS}(i)$ set in the ABS cooperative control is supplied to one input terminal of the switch 144 whose other input terminal is supplied with the pulse width $Wy(i)$ set in the yaw moment control. A value "1" is supplied to one input terminal of the switch 145 whose other terminal is supplied with the actuation flag $F_{VD1}$ and $F_{VD2}$ set in the yaw moment control. When the switch 145 is shifted from the illustrated position, the actuation flags $F_{VD1}$ and $F_{VD2}$ are forcibly set to "1". The actuation flag $F_{M-ABS}$ (see the determining section 210 in FIG. 33) for the ABS's brake pressure control is supplied to one input terminal of the switch 146. Connected to the other input terminal of the switch 146 is the output terminal of an OR gate 147 whose two input terminals are respectively supplied with the actuation flag $F_{M-ABS}$ and the actuation flag $F_{MTR}$ set in the yaw moment control.

The switch 142 is switched by the value of a flag output from the determining section 141 and the switches 143–146 are switched by the values of flags output from a determining section 148. More specifically, the determining section 141 sets a switch flag $F_{Y-D}$ to "1" and supplies it to the switch 142 when the actuation mode $My(i)$ is not the noncontrol mode. Upon reception of the switch flag $F_{Y-D}=1$, the switch 142 is switched from the illustrated position to output the actuation mode $My(i)$.

The determining section 148 has an OR gate 149 whose one input terminal is connected to a determining section 151. When the ABS's brake pressure control on three or more wheels is in progress, this determining section 151 sets a switch flag $F_{ABS-ON}(i)$ corresponding to the wheel under brake pressure control to "1" and supplies the flag to one input terminal of the OR gate 149. The switch flag $F_{ABS-ON}(i)$ is also supplied to the switches 145 and 146. The other input terminal of the OR gate 149 is connected to a determining section 152, which sets a switch flag $F_{Y-ND}(i)$ for the wheel whose actuation mode $My(i)$ is other than the pressure decrease mode to "1" and sends the flag to the other input terminal of the OR gate 149. When the switch flag $F_{ABS-ON}(i)$ or $F_{Y-ND}(i)$ is set to "1" by the determining section 151 or 152, therefore, the OR gate 149 sets a switch flag $F_{ABS-Y}(i)$ for the associated wheel to "1" and sends it out. The output terminal of the OR gate 149 is connected to one input terminal of an AND gate 150 whose other input terminal is connected to a determining section 153. The determining section 153 sets a switch flag $F_{ABS-E}(i)$ for the wheel whose actuation mode $M_{ABS}(i)$ is other than the noncontrol mode to "1" and sends the flag to the other input terminal of the AND gate 150. The AND gate 150 sets a switch flag $F_{A-Y}(i)$ for the wheel, whose associated switch flags $F_{ABS-Y}(i)$ and $F_{ABS-E}(i)$ are both set to "1", to "1" and supplies it to the switches 143 and 144.

When the ABS's brake pressure control on three or more wheels is in progress, the determining section 151 in the determining section 148 immediately supplies the switch flag $F_{ABS-ON}=1$ to the switches 145 and 146. As the switch 145 is switched from the illustrated position, the actuation flag $F_{V1}=F_{V2}=1$ is sent out from the output terminal of the switch 145. As the switch 146 is likewise switched from the illustrated position, the actuation flag $FM_{M-ABS}$ is sent out as the actuation flag $F_M$ from the output terminal of the switch 146. When the switch flag $F_{ABS-ON}=0$ is supplied to the switches 145 and 146, on the other hand, the switch 145 sends out the actuation flags $F_{VD1}$ and $F_{VD2}$ as the actuation flags $F_{V1}$ and $F_{V2}$, and the switch 146 sends out the actuation flags $F_{MTR}$ or $F_{M-ABS}$ as the actuation flag $F_M$.

When the input conditions of the AND gate 150 are fulfilled, the switch flag $F_{A-Y}(i)=1$ is supplied to the switches 143 and 144 from the AND gate 150. In this case, the switch 143 outputs the actuation mode $M_{ABS}(i)$ of the wheel corresponding to the switch flag $F_{A-Y}(i)=1$ and the actuation mode $My(i)$ or $M_{DB}(i)$ of the wheel corresponding to the switch flag $F_{A-Y}(i)=0$ as the actuation modes $MM(i)$. The switch 144 outputs the pulse width $W_{ABS}(i)$ of the wheel corresponding to the switch flag $F_{A-Y}(i)=1$ and the pulse width $Wy(i)$ of the wheel corresponding to the switch flag $F_{A-Y}(i)=0$ as the pulse widths $WW(i)$.

Figure 50:
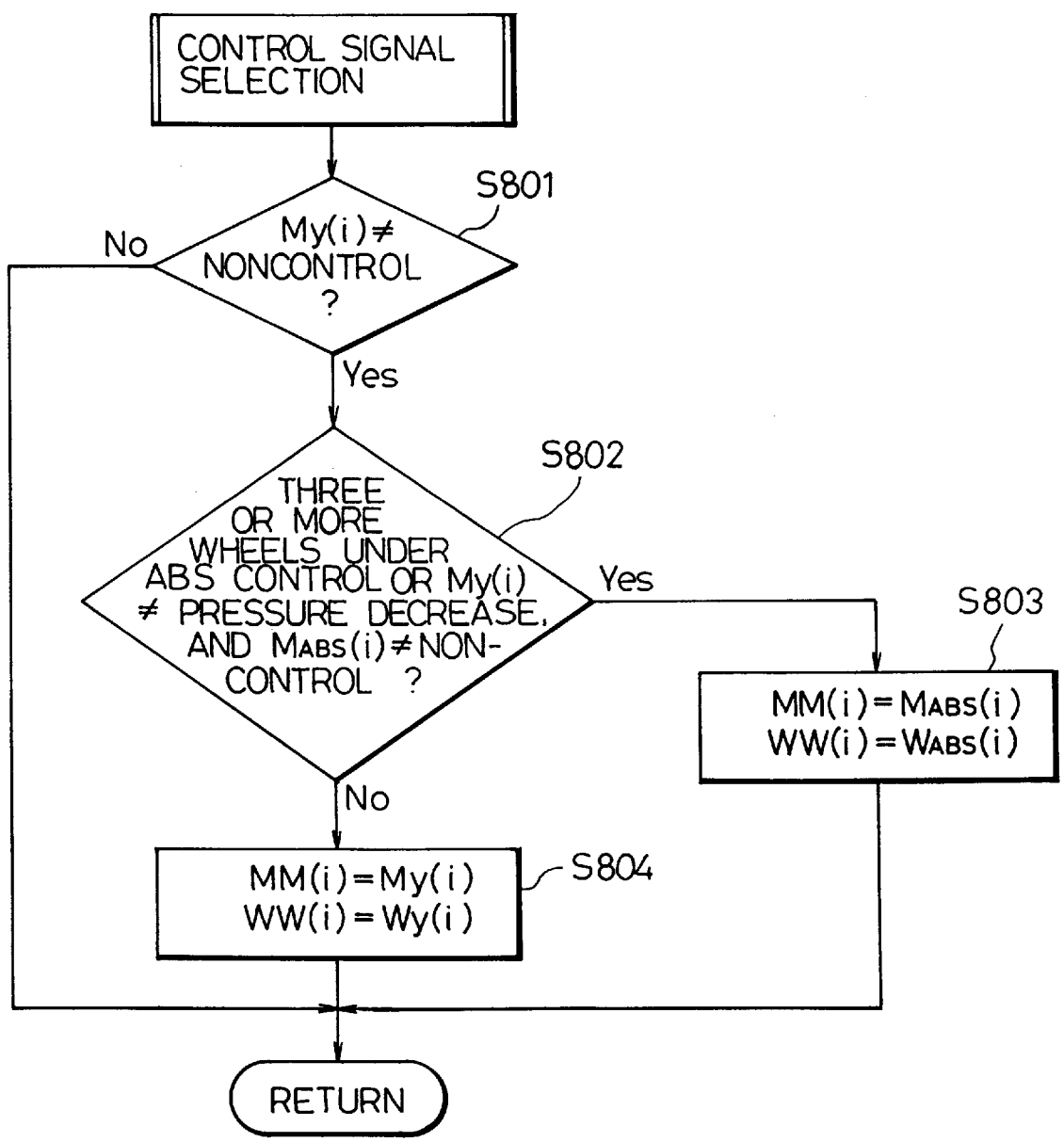
FIG. 50 is a flowchart illustrating a routine for selecting control signals.

As apparent from the above explanation, the outputs of the switches 143 and 144 are selected in accordance with the status of the ABS operation and the status of the yaw moment control. Such an output selecting routine is executed in Step S8 in the main routine in FIG. 4. The basic portion of Step S8 or the functional portion of the determining section 148 is illustrated in the flowchart in FIG. 50. As seen from FIG. 50, it is first determined if the actuation mode $My(i)$ under the yaw moment control is the noncontrol mode (Step S801). When the decision is YES and the yaw moment control is to be performed, it is then determined if the ABS is working on three or more wheels or the actuation mode $My(i)$ is not the pressure decrease mode and the actuation mode $M_{ABS}(i)$ under the ABS cooperative control is not the noncontrol mode (Step S802). When the decision in this step is YES, the actuation mode $M_{ABS}(i)$ and the pulse width $W_{ABS}(i)$ for the cooperative control are respectively set for the actuation mode $MM(i)$ and the pulse width $WW(i)$ (Step S803).

On the other hand, when the decision in Step S802 is NO, the actuation mode $My(i)$ and the pulse width $Wy(i)$ for the yaw moment control are respectively set for the actuation mode $MM(i)$ and the pulse width $WW(i)$ (Step S804).

Initial Setting of Drive Signals

When the actuation mode $MM(i)$ and the pulse width $WW(i)$ are output from the valve-control signal selecting block 140, they are supplied to an initial setting section 302 (Step S9 in FIG. 4) for the drive signals in FIG. 3. This section 302 sets the actuation mode $MM(i)$ and the pulse width $WW(i)$ as an actual actuation mode $M_{EXE}(i)$ and an actual pulse width $W_{EXE}(i)$ and gives an initial value to the actual pulse width $W_{EXE}(i)$.

Figure 51:
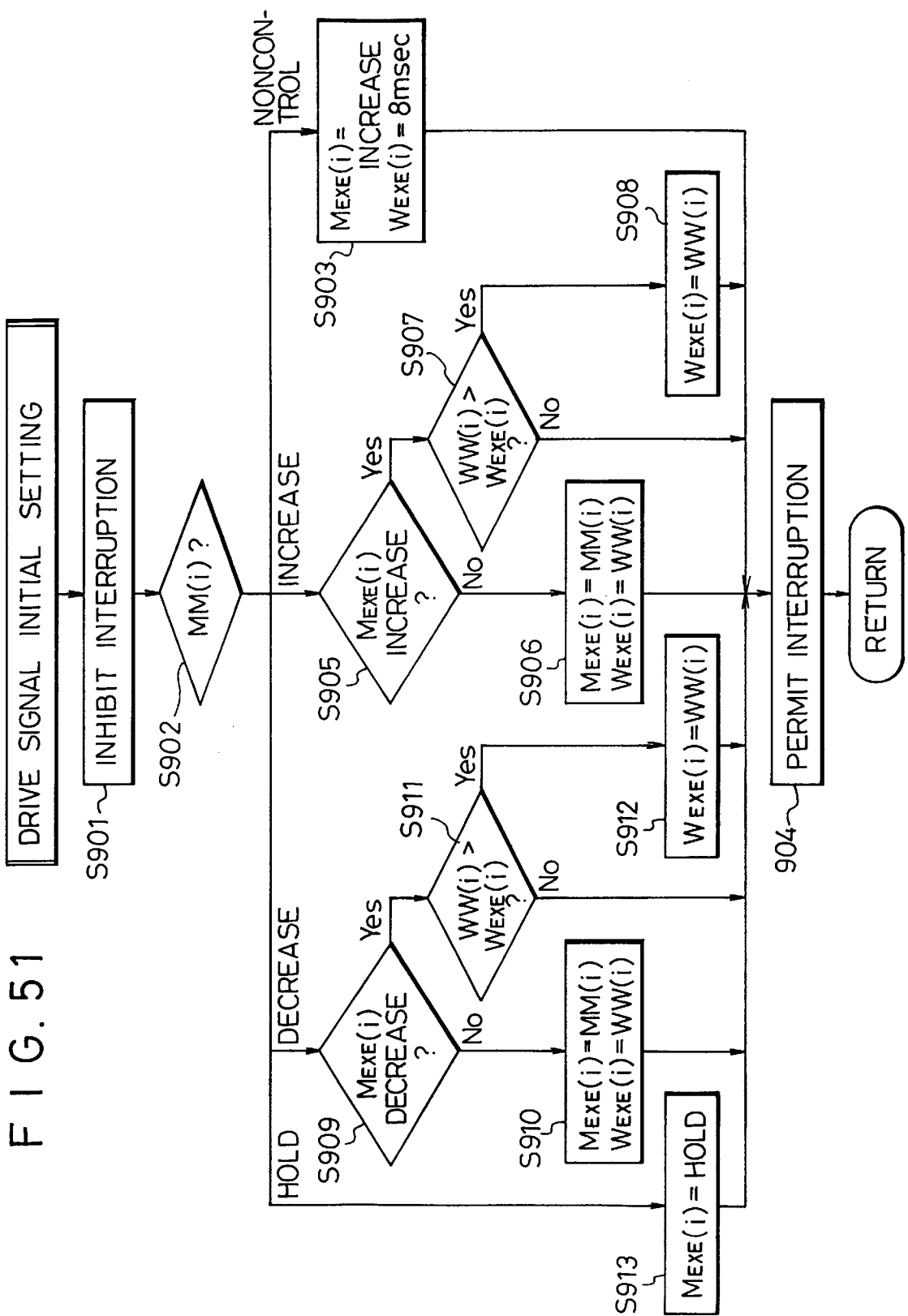
FIG. 51 is a flowchart illustrating a routine for initializing drive signals.

Step S9 is illustrated in detail in FIG. 51. As seen from FIG. 51, after an interruption inhibiting process is executed first (Step S901), the actuation mode $MM(i)$ is identified (Step S902).

When the identification result in Step S902 is the noncontrol mode, the pressure increase mode is set for the actual actuation mode $M_{EXE}(i)$ and the control period T (=8 msec) in the main routine is set for the actual pulse width $W_{EXE}(i)$ (Step S903). After an interruption permission process is executed (Step S904), this routine is terminated.

When the identification result in Step S902 is the pressure increase mode, it is determined if the actual actuation mode $M_{EXE}(i)$ is the pressure increase mode (Step S905). Because the actual actuation mode $M_{EXE}(i)$ has not been set yet at this point of time, the decision becomes NO. In this case, the actuation mode MM(i) or the pressure increase mode is set for the actual actuation mode $M_{EXE}(i)$ and the pulse width WW(i) is set as the actual pulse width $W_{EXE}(i)$ (Step S906). Then, this routine is terminated after going through Step S904.

If the decision in Step S902 shows the actuation mode MM(i) kept to the pressure increase mode when the routine is repeatedly executed next time, the decision in Step S905 becomes YES. In this case, it is determined if the pulse width WW(i) is greater than the actual pulse width $W_{EXE}(i)$ (Step S907). As the main routine is executed every control period T, the pulse width WW(i) is newly set every control period T. When the inlet or outlet valve 12 or 13 is actually actuated, however, the actual pulse width $W_{EXE}(i)$ decreases in accordance with the actuation of that valve as will be discussed later. If the decision in Step S907 shows that the newly set pulse width WW(i) is currently longer than the remaining actual pulse width $W_{EXE}(i)$, therefore, the newly set pulse width WW(i) is set for the actual pulse width $W_{EXE}(i)$ (Step S908). If the decision in Step S907 is NO, on the other hand, the remaining actual pulse width $W_{EXE}(i)$ is maintained without setting the newly set pulse width WW(i) for the actual pulse width $W_{EXE}(i)$.

When the decision in Step S902 indicates the pressure decrease mode, the sequence of Steps S909 to S912 is performed to set the actual actuation mode $M_{EXE}(i)$ and the actual pulse width $W_{EXE}(i)$ in the same manner as done in the aforementioned case of the pressure increase mode.

When the decision in Step S902 indicates the hold mode, the hold mode is set for the actual actuation mode $M_{EXE}(i)$ (Step S913).

Output of Drive Signals

When the actual actuation mode $M_{EXE}(i)$ and the actual pulse width $W_{EXE}(i)$ are set in the above-described manner, they are output to a valve actuation section 304 from the initial setting section 302 for the drive signals in FIG. 3 and Step S10 (FIG. 4) is executed.

In Step S10, the drive signals for the cutoff valves 19 and 20 and the motor 18 are also output, based on the actuation flags $F_{V1}$ and $FV_2$ and the flag $F_M$ set in the aforementioned control signal selecting routine in addition to the actual actuation mode $M_{EXE}(i)$ and the actual pulse width $W_{EXE}(i)$.

When the actuation flag $F_{V1}$ is set to "1", the drive signal to close the cutoff valve 19 is output, and when the actuation flag $F_{V2}$ is set to "1", the drive signal to close the cutoff valve 20 is output. When the actuation flags $F_{V1}$ and $F_{V2}$ are reset to "0", the cutoff valves 19 and 20 are kept open. When the actuation flag $F_M$ is set to "1", the drive signal to activate the motor 18 is output, and when the actuation flag $F_M$ is reset to "0", the motor 18 is not driven.

Actuation of Inlet and Outlet Valves

Figure 52:
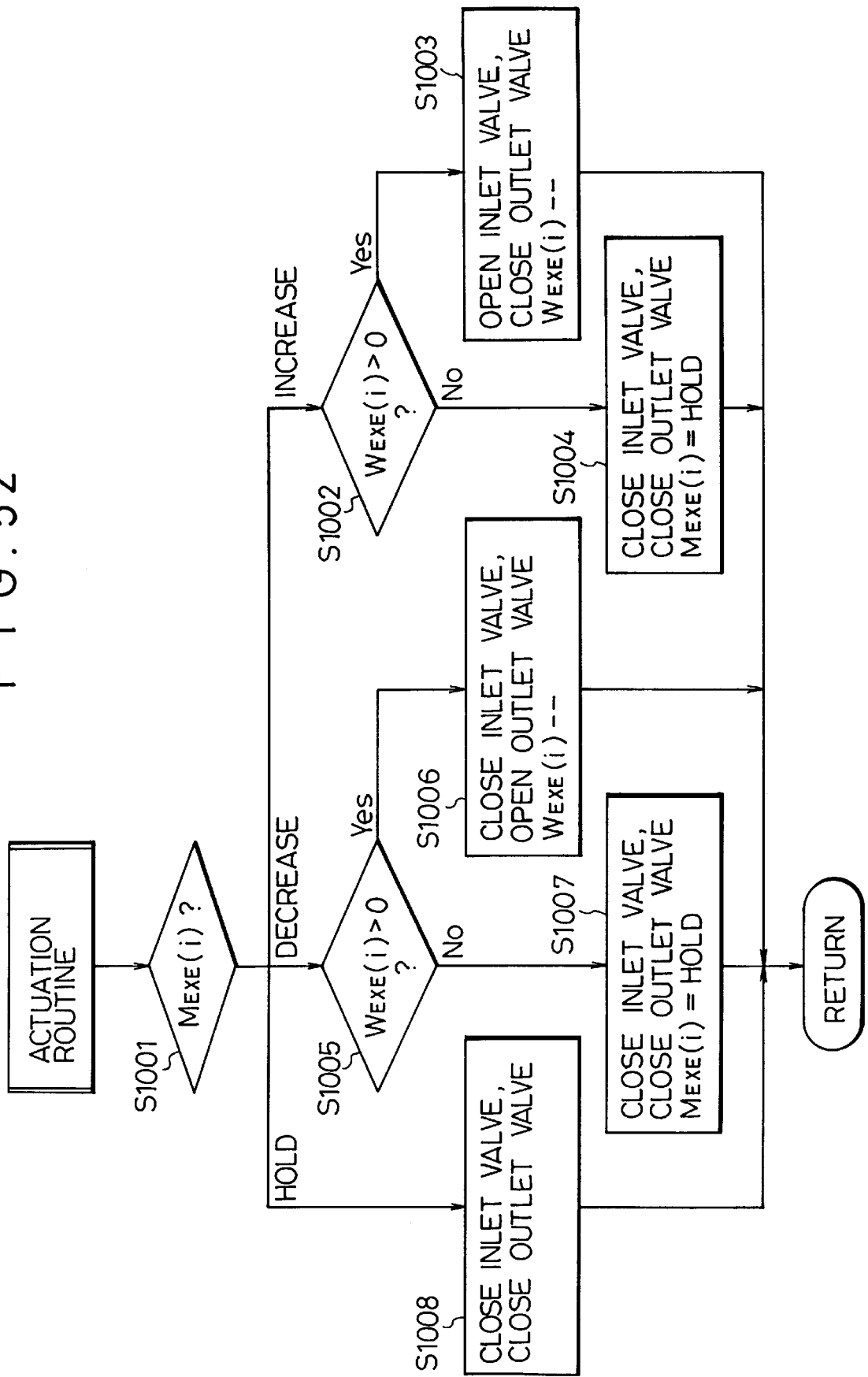
FIG. 52 is a flowchart showing a drive routine.

When the actual actuation mode $M_{EXE}(i)$ and the actual pulse width $W_{EXE}(i)$ are supplied to the valve actuation section 304, this actuation section 304 actuates the inlet and outlet valves 12 and 13 in accordance with an actuation routine shown in FIG. 52. The actuation routine shown in FIG. 52 is executed independently of the main routine in FIG. 4 at the cycle of 1 msec.

In the actuation routine, the actual actuation mode $M_{EXE}(i)$ is identified first (Step S1001). When this identification result shows that the actual actuation mode $M_{EXE}(i)$ is the pressure increase mode, it is determined if the actual pulse width $W_{EXE}(i)$ is greater than "0" (Step S1002). When the decision is YES, the inlet valve 12 of the associated wheel is open and the outlet valve 13 of the associated wheel is closed, and the actual pulse width $W_{EXE}(i)$ is decreased by the execution cycle of the actuation routine (Step S1003). When Step S1003 is executed, therefore, the brake pressure of the associated wheel increases if the motor 18 has already been activated and the associated cutoff valve 19 or 20 is closed.

When the decision in Step S1002 becomes NO while the actuation routine is executed repeatedly with the actual actuation mode $M_{EXE}(i)$ kept at the pressure increase mode, the inlet and outlet valves 12 and 13 of the associated wheel are both closed and the actual actuation mode $M_{EXE}(i)$ is set to the hold mode (Step S1004).

When the identification in Step S1001 shows that the actual actuation mode $M_{EXE}(i)$ is the pressure decrease mode, it is determined if the actual pulse width $W_{EXE}(i)$ is greater than "0" (Step S1005). When the decision is YES, the inlet valve 12 of the associated wheel is closed and the outlet valve 13 of the associated wheel is open, and the actual pulse width $W_{EXE}(i)$ is decreased by the execution cycle of the actuation routine (Step S1006). As Step S1006 is executed, therefore, the brake pressure of the associated wheel decreases.

When the decision in Step S1005 becomes NO while the actuation routine is repeatedly executed with the actual actuation mode $M_{EXE}(i)$ kept at the pressure decrease mode, the inlet and outlet valves 12 and 13 of the associated wheel are both closed and the actual actuation mode $M_{EXE}(i)$ is set to the hold mode (Step S1007).

When this identification in Step S1001 shows that the actual actuation mode $M_{EXE}(i)$ is the hold mode, the inlet and outlet valves 12 and 13 of the associated wheel are both closed (Step S1008).

Figure 53:
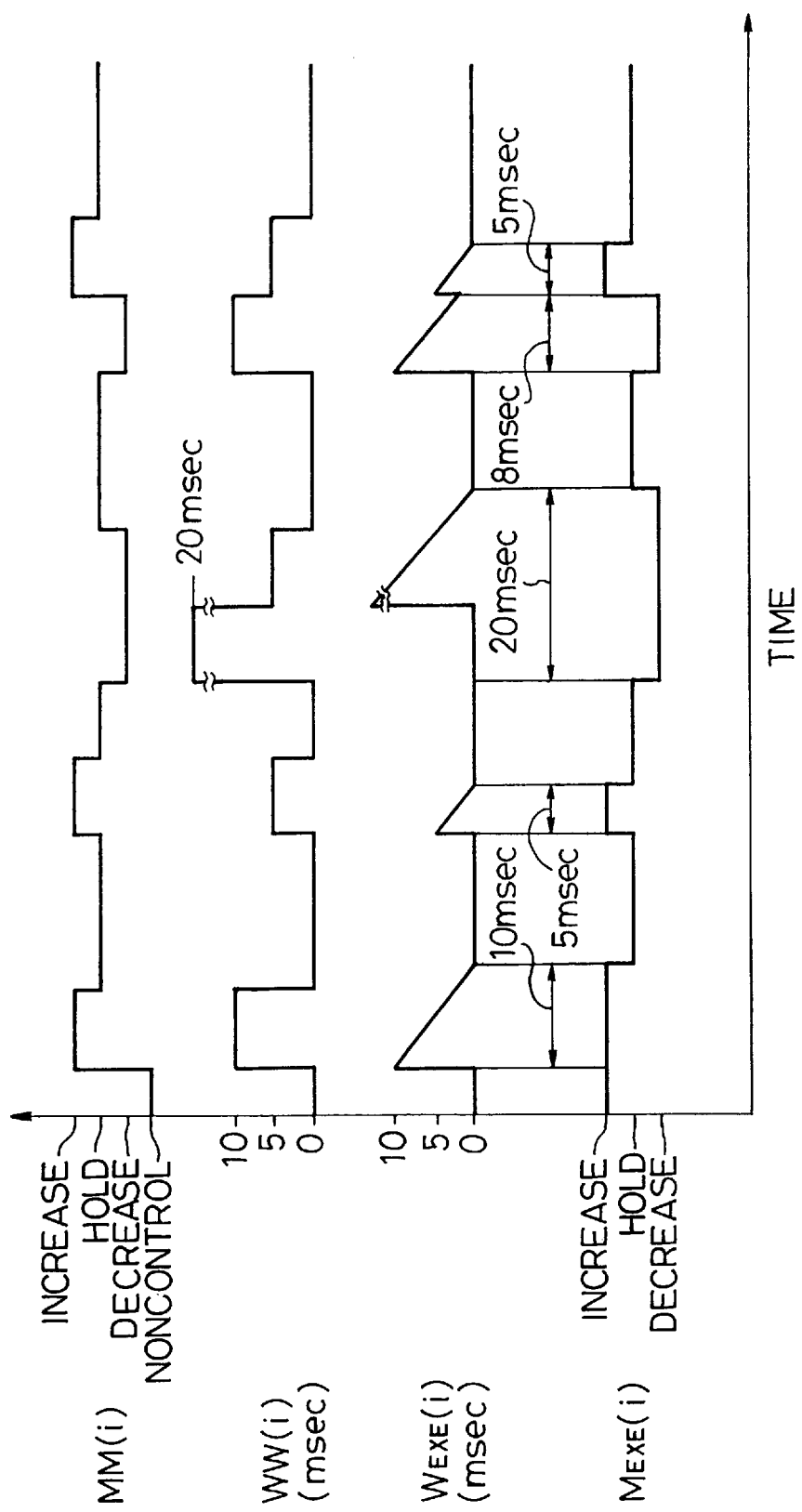
FIG. 53 is a time chart showing the relationship among the actuation mode, pulse width, actual actuation mode and actual pulse width.

FIG. 53 shows the relationship among the actuation mode MM(i), the pulse width WW(i), the actual actuation mode $M_{EXE}(i)$ and the actual pulse width $W_{EXE}(i)$ in the form of a time chart.

The yaw moment control and ABS cooperative control will now be described in order.

Effectiveness of Yaw Moment Control

When this control is applied to the wheels located on the diagonal line of the vehicle:

Assume that the vehicle is currently running and the main routine in FIG. 4 is repeatedly executed. In this situation, when the turning flag Fd is set to "1" based on the steering-wheel angle θ and the yaw rate γ in the turn determining routine in FIG. 6, the vehicle is making a right turn.

(a) During Right Turn of Vehicle

When the required yaw moment γd is then acquired in Step S5 in the main routine and the yaw moment control is executed in Step S6, the control mode selecting routine is executed in this yaw moment control under the condition that the enable/disable flag Fymc (see the determining circuit in FIG. 24) is set to "1". In other words, the control mode M(i) for each wheel is set according to the selecting routine in FIG. 23.

As it is assumed that the vehicle is turning to the right, the decision in Step S601 in the selecting routine in FIG. 23 becomes YES and the steps on and following Step S602 are to be executed.

(b) Right Turn of Vehicle with Understeer Tendency

When the decision in Step S602 is YES, i.e., the control execution flag FCUS is set to "1" and the vehicle shows a strong understeer tendency, the control mode M(1) of the left front wheel (outside front wheel) $FW_L$ is set to the pressure decrease mode and the control mode M(4) of the right rear wheel (inside rear wheel) $RW_R$ is set to the pressure increase mode. The control modes M(2) and M(3) of the other two wheels are set to the noncontrol mode (see Table 1 and Step S603).

Thereafter, the actuation mode $M_{PLS}(i)$ is set based on the control mode M(i) and the required yaw moment γd of each wheel (see the setting routine in FIG. 25), and the pulse width $W_{PLS}(i)$ for each wheel is set. Those actuation mode $M_{PLS}(i)$ and pulse width $W_{PLS}(i)$ become the actuation mode My(i) and pulse width Wy(i) through the inhibition section 90 and forcible alteration section 111 in FIG. 20.

In the actuation determining section 124 in FIG. 20 (FIGS. 29–32) or in the determining circuit 125 shown in FIG. 29, the brake flag Fb is set to "1" (the vehicle is being braked) and the actuation mode My(i) is the pressure increase mode, those of the request flags $F_{MON}(i)$ output via the AND gate 126 and OR gate 128 and the request flags $F_{COV}(i)$ output via the flip-flop 130 which are associated with the wheel to be controlled are set to "1". Specifically, when the brake pedal 3 is thrust down while the vehicle showing a strong understeer tendency is turning to the right, $F_{MON}(4)$ and $F_{COV}(4)$ among the outputs of the determining circuit 125 (see FIG. 29) are set to "1". Then, "1" is set to the actuation flag $F_{VD1}$ from the determining circuit 131 (OR gate 132) in FIG. 30. Further, "1" is set to the actuation flag $F_{MTR}$ from the determining circuit in FIG. 32 or the OR gate 139. As the request flags $F_{COV}(2)$ and $F_{COV}(3)$ are both reset to "0," the actuation flag $F_{VD2}$ output from the determining circuit 135 (OR gate 136) in FIG. 31 is reset to "0". At the time braking is applied to the vehicle, therefore, one of the actuation flags, $F_{VD1}$, alone is set to "1".

Thereafter, the actuation flags $F_{V1}$=1, $F_{V2}$=0 and $F_M$=1 are output from the control signal selecting section 140 in FIG. 3 (the switches 145 and 146 in FIG. 49) and those actuation flags are respectively supplied to the cutoff valves 19 and 20 and the motor 18 as drive signals. That is, the cutoff valves 19 which make pairs with the wheel brakes of the left front wheel $FW_L$ and right rear wheel $RW_R$ are closed, the cutoff valves 20 which make pairs with the wheel brakes of the right front wheel $FW_R$ and left rear wheel $RW_L$ are kept open, and the motor 18 is driven. The activation of the motor 18 causes the fluids under pressure to be discharged from the pumps 16 and 17.

When no braking is applied to the vehicle whose brake pedal 3 is not thrust down, the control mode M(1) of the left front wheel $FW_L$ and the control mode M(4) of the right rear wheel $RW_R$ are not in the noncontrol mode. Therefore, the request flags $F_{MON}(1)$ and $F_{MON}(4)$ output from the OR gate 128 in the determining circuit 125 are set to "1" and the request flags $F_{COV}(1)$ and $F_{COV}(4)$ output from the flip-flop 130 are set to "1". In this case, therefore, the actuation flag $F_{MTR}$ is set to "1" so that the motor 18, i.e., the pumps 16 and 17, are driven. Because only the actuation flag $F_{VD1}$ is set to "1", only the cutoff valve 19 is closed.

With no braking applied, when the aforementioned actuation mode $M_{PLS}(i)$ is processed in the forcible alteration section 111 (FIG. 20), "1" is set to the flag $F_{HLD}(i)$ output from the hold determining section 118 (FIG. 28). In this case, the switch 112 is changed over, and the actuation mode $M_{PLS}(i)$ in the noncontrol mode is forcibly changed to the hold mode.

With no braking applied (Fb =0), since the correction value Cpi is set to 1.5 greater than 1.0 at the time of computing the required yaw moment γd (see FIG. 8), the required yaw moment γd is increased. This increase shortens the pulse period $T_{PLS}$ in which the actuation mode $M_{PLS}(i)$ or My(i) is executed. Consequently, when the actuation mode My(i) is the pressure increase mode or the pressure decrease mode, the brake pressure is strongly increased or decreased.

Thereafter, the actuation mode My(i) and pulse width Wy(i) are set through the aforementioned control signal selecting section 140 as the actuation mode MM(i) and the pulse width WW(i), based on which the actual actuation mode $M_{EXE}(i)$ and the actual pulse width $W_{EXE}(i)$ are set. As a result, the inlet and outlet valves 12 and 13 are actuated in accordance with the actual actuation mode $M_{EXE}(i)$ and the actual pulse width $W_{EXE}(I)$ (see the actuation routine in FIG. 52).

Specifically, when the vehicle showing a strong understeer tendency is turning to the right and braking is applied to the vehicle, the actual actuation mode $M_{EXE}(1)$ for the left front wheel $FW_L$ is the pressure decrease mode so that the inlet valve 12 and the outlet valve 13 for the left front wheel $FW_L$ are closed and open, respectively (Step S1006 in FIG. 52). As a result, the brake pressure of the left front wheel $FW_L$ is reduced. As the actual actuation mode $M_{EXE}(4)$ for the right rear wheel $RW_R$ is the pressure increase mode, the inlet valve 12 and the outlet valve 13 for the right rear wheel $RW_R$ are open and closed, respectively (Step S1003 in FIG. 52). At this point of time, since the cutoff valve 19 is closed and the pumps 16 and 17 are driven by the motor 18 as mentioned earlier, the pressure in the branch brake line 8 (see FIG. 1) extending to the wheel brake of the right rear wheel $RW_R$ has already been built up independently of the master cylinder pressure. Accordingly, the wheel brake of the right rear wheel $RW_R$ is supplied with the pressurized fluid from the branch brake line 8 through the inlet valve 12, with the result that the brake pressure of the right rear wheel $RW_R$ is increased.

Figure 54:
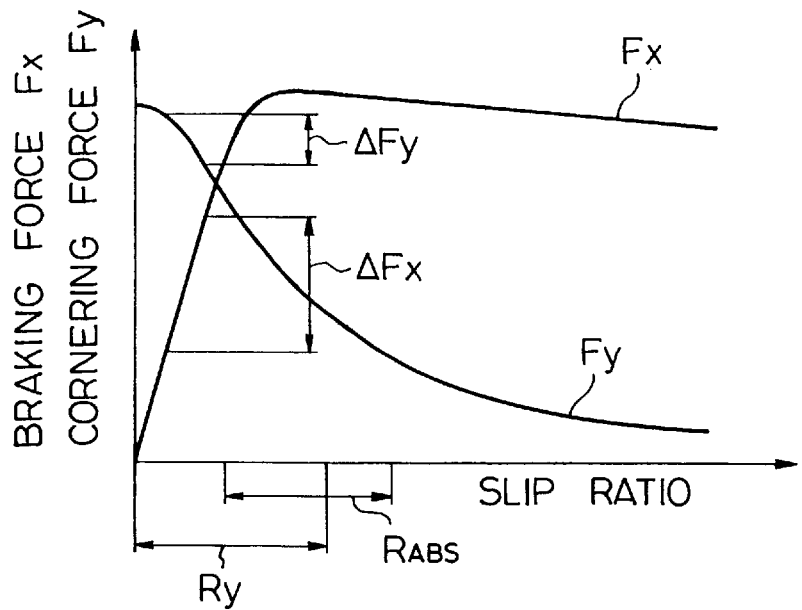
FIG. 54 is a graph showing the braking force/cornering force characteristic with respect to the wheel slip ratio.

FIG. 54 illustrates the characteristics of the braking force and cornering force with respect to the slip ratios of the wheels. As seen from FIG. 54, when the brake pressure of the target wheel or the braking force Fx decreases in the slip ratio range of the wheels for which the vehicle is running normally, the slip ratio decreases too, whereas when the cornering force Fy increases, the slip ratio increases too. The reduction in slip ratio increases the cornering force, and the increase in slip ratio decreases the cornering force. In FIG. 54, an area Ry indicates the control range of the wheel slip ratio under yaw moment control and an area $R_{ABS}$ indicates the control range of the wheel slip ratio under ABS-invoked brake pressure control.

Figure 55:
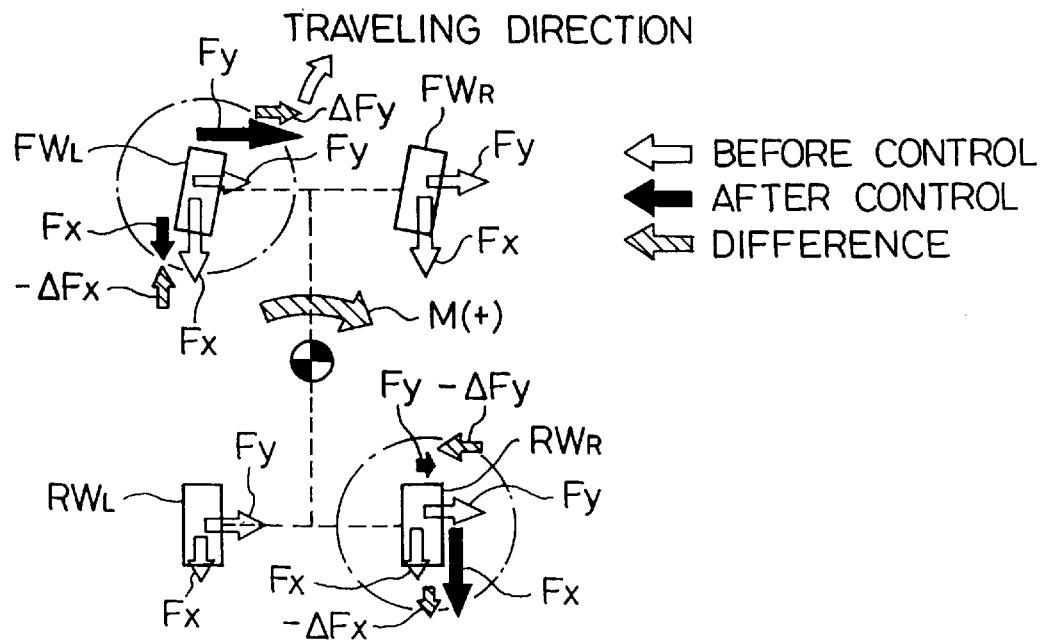
FIG. 55 is a diagram for explaining the results of the execution of the yaw moment control when the vehicle is turning to the right in an understeer condition while braking is being applied to the vehicle.

When the vehicle is making an understeer right turn and is braked as shown in FIG. 55, therefore, as the braking force Fx of the left front wheel $FW_L$ decreases from the level of the white arrow to that of the black arrow, the cornering force Fy of the left front wheel $FW_L$ increases from the level of the white arrow to that of the black arrow, whereas as the braking force Fx of the right rear wheel $RW_R$ increases from the level of the white arrow to that of the black arrow, the cornering force Fy of the right rear wheel $RW_R$ decreases from the level of the white arrow to that of the black arrow. With regard to the left front wheel FWL, therefore, the cornering force Fy acts strongly while the brake force Fx decreases. With regard to the right rear wheel RWR, on the other hand, the brake force Fx increases while the cornering force Fy decreases. As a result, the turning moment M(+)

occurs in the turning direction of the vehicle head. The hatched arrows in FIG. 55 show changes ±ΔFx and ±ΔFy of the braking force Fx and the cornering force Fy.

Because the inlet and outlet valves 12 and 13 for the left front wheel $FW_L$ and the right rear wheel $RW_R$ diagonally located in the vehicle are open and closed in accordance with the actual actuation mode $M_{EXE}(i)$ and the actual pulse width $W_{EXE}(i)$ set based on the required yaw moment γd, it is possible to properly add the turning moment M(+) to the vehicle head. As a result, the understeer tendency of the vehicle is canceled out, thus preventing the drift-out of the vehicle.

Because the increase amount and the decrease amount of the brake pressures of the left front wheel $FW_L$ and the right rear wheel $RW_R$ are computed based on the same required yaw moment γd, the absolute value of the increase amount is the same as the absolute value of the decrease amount. Even if the brake pressures of the left front wheel $FW_L$ and the right rear wheel $RW_R$ are decreased and increased, respectively, the overall braking force of the vehicle does not change so that the braking feeling on the vehicle is not impaired.

Further, the required yaw moment γd is computed in consideration of the driving conditions of the vehicle and the driving manipulation as mentioned earlier (see Steps S504 and S505 in the computing routine in FIG. 9). If the braking forces of the diagonally located wheels of the vehicle are increased or decreased based on the required yaw moment γd, therefore, the yaw moment control of the vehicle can be executed finely in accordance with the turning state of the vehicle.

Since the required yaw moment γd is computed based on the yaw rate deviation Δγ and the derivative Δγs of the yaw rate deviation, the computed required yaw moment yd accurately shows the turning behavior of the vehicle at that time point. If the braking forces of the diagonally located wheels of the vehicle are increased or decreased based on the required yaw moment γd, therefore, an unstable turning behavior of the vehicle is cleared immediately so that the vehicle can make a very stable turn.

In computing the required yaw moment γd, open control according to the lateral $G_Y$, the vehicle speed V and the steered angle δ may be employed instead of the above-described yaw rate feedback control.

As the turning direction of the vehicle is determined based on the output of the yaw rate sensor 30, the vehicle's turning direction can be determined at high accuracy, so that the yaw moment control can be executed accurately.

When the yaw moment control is in progress and the vehicle is braked, the actual actuation modes $M_{EXE}(i)$ of the inlet and outlet valves 12 and 13 for the right front wheel $FW_R$ and the left rear wheel $RW_L$ are set to the noncontrol mode. Therefore, the cutoff valves 20 which make pairs with the wheel brakes of the right front wheel $FW_R$ and left rear wheel $RW_L$ are kept open. Accordingly, the wheel brakes of the right front wheel $FW_R$ and left rear wheel $RW_L$ can receive the master cylinder pressure, so that the brake pressures of the right front wheel $FW_R$ and left rear wheel $RW_L$ are controlled by the driver's manipulation of the brake pedal 3. As a result, the brake pressures of the right front wheel $FW_R$ and left rear wheel $RW_L$ are controlled as intended by the driver and a sufficient failsafe function is secured during the yaw moment control.

When the vehicle is not braked under yaw moment control, the actual actuation modes $M_{EXE}(i)$ of the inlet and outlet valves 12 and 13 for the right front wheel $FW_R$ and the left rear wheel $RW_L$ are forcibly changed to the hold mode, and those inlet and outlet valves 12 and 13 are both closed (see Step S1008 in the actuation routine in FIG. 52).

Even if the pump 16 is driven by the motor 18 then, the discharge pressure of the pump 16 is not applied via the inlet and outlet valves 12 and 13 to the wheel brakes of the right front wheel $FW_R$ and the left rear wheel $RW_L$, and the brake pressures of the right front wheel $FW_R$ and the left rear wheel $RW_L$ do not undesirably increase.

When the vehicle is not braked, the brake pressure of the left front wheel $FW_L$ is not built up. In this case, it is substantially impossible to control the reduction in the brake pressure of the left front wheel $FW_L$, resulting in an insufficient turning moment M(+) to be applied to the vehicle head. With no braking applied to the vehicle, however, the required yaw moment γd is increased in the computation thereof as mentioned above. In this case, the brake pressure of the right rear wheel $RW_R$ is increased more than that when the vehicle is braked. As the slip ratio of the right rear wheel $RW_R$ increases, therefore, the cornering force Fy of the right rear wheel $RW_R$ decreases further. Consequently, the cornering force of the left front wheel $FW_L$ acts relatively strongly, so that about the same turning moment M(+) as that when the vehicle is braked is applied to the vehicle.

When the driver steps on the brake pedal 3 at a faster speed than a predetermined pedal stroke speed (50 mm/s) under yaw moment control, "1" is set to the depression increment flag $F_{PP}$ of the brake pedal 3 as mentioned earlier. In this case, the switch 116 (see FIG. 28) in the forcible alteration section 111 (see FIG. 20) is switched from the illustrated position, so that the actuation modes My(i) of all the wheels are forcibly changed to the noncontrol mode.

As a result, any of the request flags $F_{MON}(i)$ and $F_{COV}(i)$ is reset to "0" (see FIG. 29), and the actuation flags $F_{VD1}$ ($F_{V1}$) and $F_{MTR}$ ($F_M$) are also reset to "0" by the depression increment flag $F_{PP}$ =1 (see FIGS. 30 and 31). Thus, while the cutoff valve 19 is open, the motor 18 is stopped driven. The inlet valves 12 for the individual wheels are open and the outlet valves 13 are closed. In this case, Step S1003 in the actuation routine in FIG. 52 on the pressure increase mode side is executed, so that the wheel brakes of the individual wheels can receive the master cylinder pressure. Accordingly, the brake pressure according to the driver's depression of the brake pedal 3 is built up in the wheel brake of each wheel, thus securing sufficient braking force of the vehicle.

Right Turn of Vehicle with Oversteer Tendency:

When the decision in Step S602 is NO and the decision in Step S604 becomes YES, i.e., $F_{COS}$=1 in the selecting routine in FIG. 23, the vehicle is making a strong oversteer turn. In this situation, unlike in the case of the understeer tendency described above, the control mode M(1) of the left front wheel $FW_L$ is set to the pressure increase mode and the control mode M(4) of the right rear wheel $RW_R$ is set to the pressure decrease mode (see Table 1 and Step S605).

Figure 56:
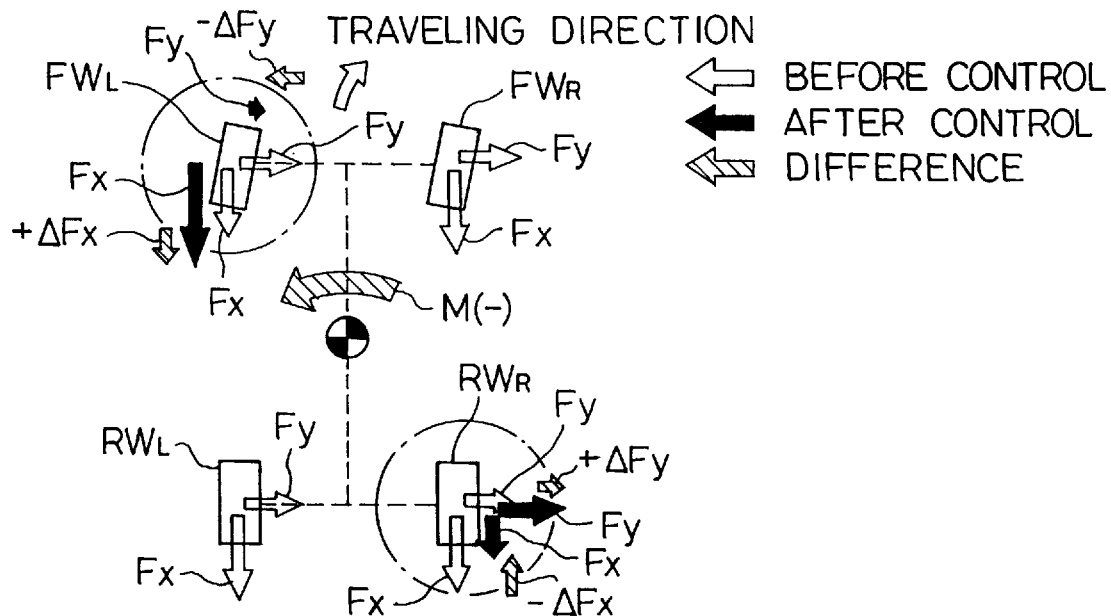
FIG. 56 is a diagram for explaining the results of the execution of the yaw moment control when the vehicle is turning to the right in an oversteer condition while braking is being applied to the vehicle.

When braking is applied to the vehicle, the cornering force Fy of the left front wheel $FW_L$ decreases while the braking force Fx increases, as shown in FIG. 56. The braking force Fx of the right rear wheel $RW_R$ decreases and the cornering force Fy increases. In this case, the restoration moment M(−) is applied to the vehicle head. This restoration moment M(−) cancels out the oversteer tendency of the vehicle, thus allowing the vehicle to surely avoid the spinning due to the tack-in thereof.

When no braking is applied to the vehicle or "1" is set to the depression increment flag $F_{PP}$ while the vehicle is making an oversteer right turn, the same function as has been discussed in the description of the understeer case is performed.

When Vehicle Makes Non-understeer and Non-oversteer Right Turn:

When the decisions in Steps S602 and S604 in the selecting routine in FIG. 23 are both NO and the vehicle is making a non-understeer and non-oversteer turn, the control modes M(1) and M(4) of the left front wheel $FW_L$ and the right rear wheel $RW_R$ are both set to the hold mode (see Table 1 and Step S606).

In this case, the inlet and outlet valves 12 and 13 for the left front wheel $FW_L$ and the right rear wheel $RW_R$ are both closed. Thus, the brake pressures of the left front wheel $FW_L$ and the right rear wheel $RW_R$ are held and neither the turning moment M(+) nor the restoration moment M(−) is applied to the vehicle head in this case.

Left Turn of Vehicle:

When the aforementioned turning flag Fd and enable/disable flag Fymc are set to "1", yaw moment control is executed when the vehicle makes a left turn. In this case, like in the above-discussed case of the right turning of the vehicle, the brake pressures of the right front wheel $FW_R$ and the left rear wheel $RW_L$ are controlled in such a way that the turning moment M(+) is applied to the vehicle head which shows a strong understeer tendency and the restoration moment M(−) is applied to the vehicle head which shows a strong oversteer tendency. Consequently, even when the vehicle turns to the left, the same advantages as obtained in the case of the right turning can be acquired (see Table 1 and Steps S607–S611 in FIG. 23 and the actuation routine in FIG. 52).

The above has described the basic function of the yaw moment control and the following discusses the ABS cooperative control.

Function of ABS Cooperative Control:

When ABS-invoked brake pressure control on the wheel whose actuation mode is not the pressure decrease mode is initiated or the ABS operation on three or more wheels is initiated during the above-described yaw moment control, the selecting block 140 in FIG. 49, i.e., the AND gate 150 in the determining section 148 sets "1" to the switch flag $F_{A \rightarrow Y}(i)$ for the target wheel to be controlled by the ABS operation and sends out the flag. Consequently, the actuation mode $M_{ABS}(i)$ and the pulse width $W_{ABS}(i)$ for the ABS cooperative control are selected as the actuation mode MM(i) and the pulse width WW(i).

In computing the actuation mode $M_{ABS}(i)$ and the pulse width $W_{ABS}(i)$, i.e, $M_{ABS1}(i)$ and $W_{ABS1}(i)$ (see FIG. 33), the computing section 201 corrects the slip ratio $S_X(i)$ based on the correction allocated value $Y_S(i)$ output from the arithmetic operation section 211. Since the correction allocated value $Y_S(i)$ is computed based on the required yaw moment γd and the turning tendency of the vehicle (see FIGS. 37 and 41), the slip ratio $S_X(i)$ for the brake pressure control by the ABS is effectively corrected. It is therefore possible to properly execute the yaw moment control in cooperation with the ABS's control. Even when the ABS's brake pressure control is initiated, therefore, the turning behavior of the vehicle is effectively controlled to improve the yaw response of the vehicle body.

Specifically, with regard to the target wheel which needs braking force to be increased by the yaw moment control, the slip ratio $S_X(i)$ of the target wheel is corrected to increase (see Step S721 in FIG. 41), so that the ABS-invoked brake pressure control on the target wheel is unlikely to be initiated. In this case, the braking force of the target wheel is increased based on the yaw moment control, so that the yawing of the vehicle is effectively controlled.

With regard to the target wheel which needs braking force to be decreased by the yaw moment control, on the other hand, the slip ratio $S_X(i)$ of the target wheel is corrected to decrease (see Step S724 in FIG. 41), making the ABS-invoked brake pressure control on the target wheel likely to be initiated. As the braking force of the target wheel is further reduced with the help of the ABS, the yawing of the vehicle is effectively controlled.

Regarding the computation of the actuation mode $M_{ABS}(i)$ and the pulse width $W_{ABS}(i)$, at the time one of the timing flags $F_{US}$ and $F_{OS}$ is set to "1" (see FIG. 43), specifically, when the absolute value of the required yaw moment γd becomes equal to or greater than a predetermined value, the drive signal overriding section 222 in FIG. 33 respectively selects the actuation mode $M_{ABS0}(i)$ and the pulse width $W_{ABS0}(i)$ set by the arithmetic operation section 211, which acquires the yaw moment control amount, as the actuation mode $M_{ABS}(i)$ and the pulse width $W_{ABS}(i)$. Those actuation mode $M_{ABS0}(i)$ and the pulse width $W_{ABS0}(i)$ are set regardless of the wheel slip ratio $S_X(i)$, the braking force of the target wheel is forcibly controlled, making it easier to put the ABS operation. Thereafter, the aforementioned $M_{ABS1}(i)$ and $W_{ABS1}(i)$ are respectively selected as the actuation mode $M_{ABS}(i)$ and the pulse width $W_{ABS}(i)$ of the target wheel, so that the braking force of the target wheel is controlled based on the corrected slip ratio $S_X(i)$. Consequently, the ABS operation suitably works in cooperation with the yaw moment control, thus improving the response of the ABS's brake pressure control.

Figure 37:
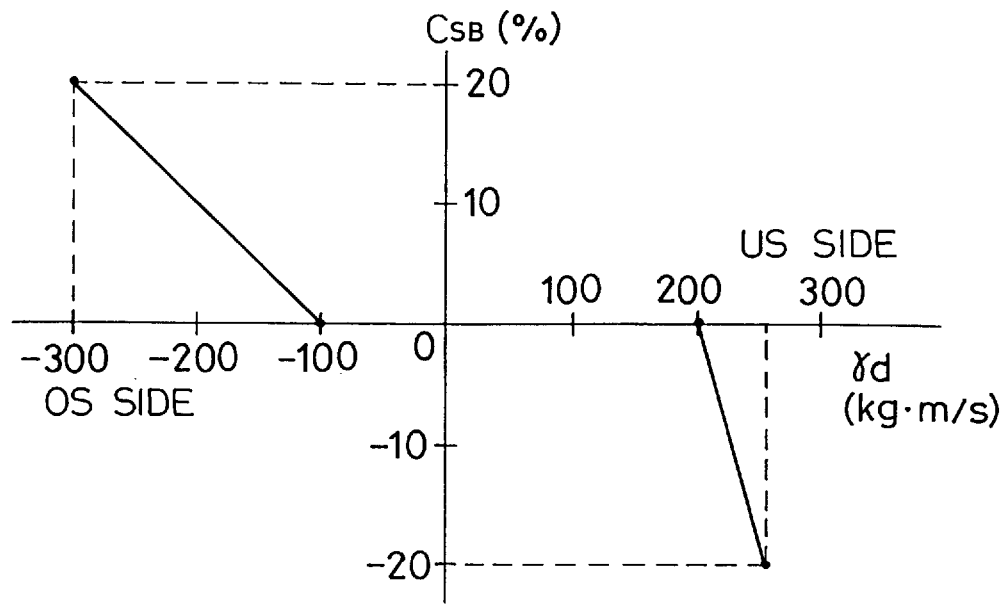
FIG. 37 is a graph showing the relationship between the required yaw moment and a reference slip correction amount.
Figure 38:
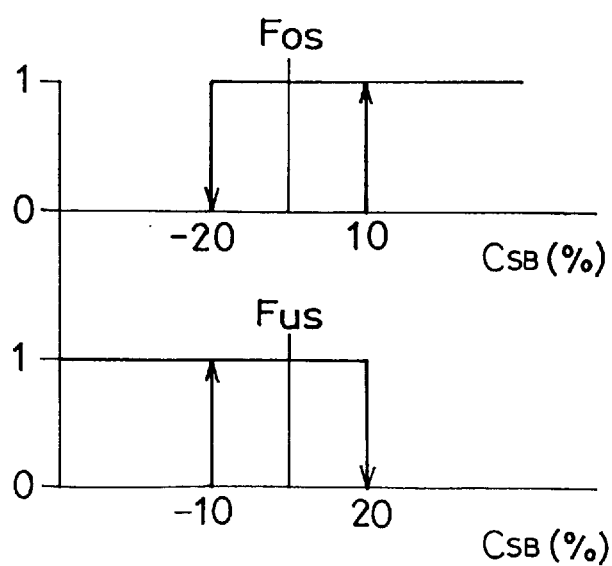
FIG. 38 is a graph showing the relationship between the reference slip correction amount and a timing flag.

As apparent from the comparison of FIG. 37 with FIG. 38, at the time one of the timing flags $F_{US}$ and $F_{OS}$ is set to "1", i.e., the actuation mode $M_{ABS1}(i)$ and the pulse width $W_{ABS1}(i)$ are overridden by the actuation mode $M_{ABS0}(i)$ and the pulse width $W_{ABS0}(i)$, the reference correction amount $C_{SB}$ of slip has already been output and the slip ratio $S_X(i)$ has already been corrected. Even if the actuation mode $M_{ABS1}(i)$ and the pulse width $W_{ABS1}(i)$ are respectively selected thereafter as the actuation mode $M_{ABS}(i)$ and the pulse width $W_{ABS}(i)$ and the ABS's brake pressure control starts, therefore, the behavior of the vehicle does not change suddenly. Accordingly, the ABS's brake pressure control and the yaw moment control work in cooperation with each other to effectively stabilize the yawing of the vehicle.

Figure 57:
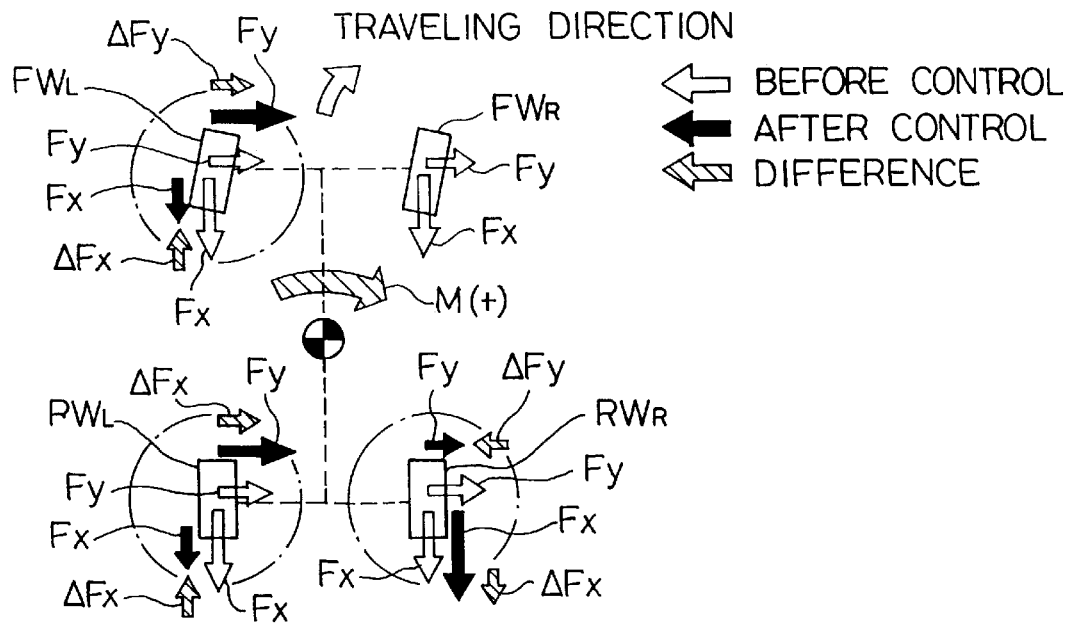
FIG. 57 is a diagram for explaining the results of the execution of the yaw moment control when the vehicle is turning to the right in an understeer condition and the antiskid brake control is working, while braking is being applied to the vehicle.

With regard to the correction of the slip ratio $S_X(i)$ or the computation of the reference correction amount $C_{SB}$ of slip, when the vehicle is making an understeer turn, the slip ratio $S_X(i)$ of the outside front wheel as viewed in the vehicle's turning direction is corrected to decrease whereas the slip ratio $S_X(i)$ of the inside rear wheel is corrected to increase. Thus, the ABS is likely to work on the outside front wheel, so that the reduction of the braking force on the outside front wheel is demanded. The ABS is however unlikely to work on the inside rear wheel, so that an increase in the braking force on the inside rear wheel is required. Specifically, when the ABS functions while the vehicle is making an understeer right turn as shown in FIG. 57, the braking force of the right rear wheel is likely to be increased while the braking force of the left front wheel is reduced. As a result, the turning moment M(+) can be applied to the vehicle head, thus allowing the turning behavior of the vehicle to be stabilized even during the ABS operation.

Figure 58:
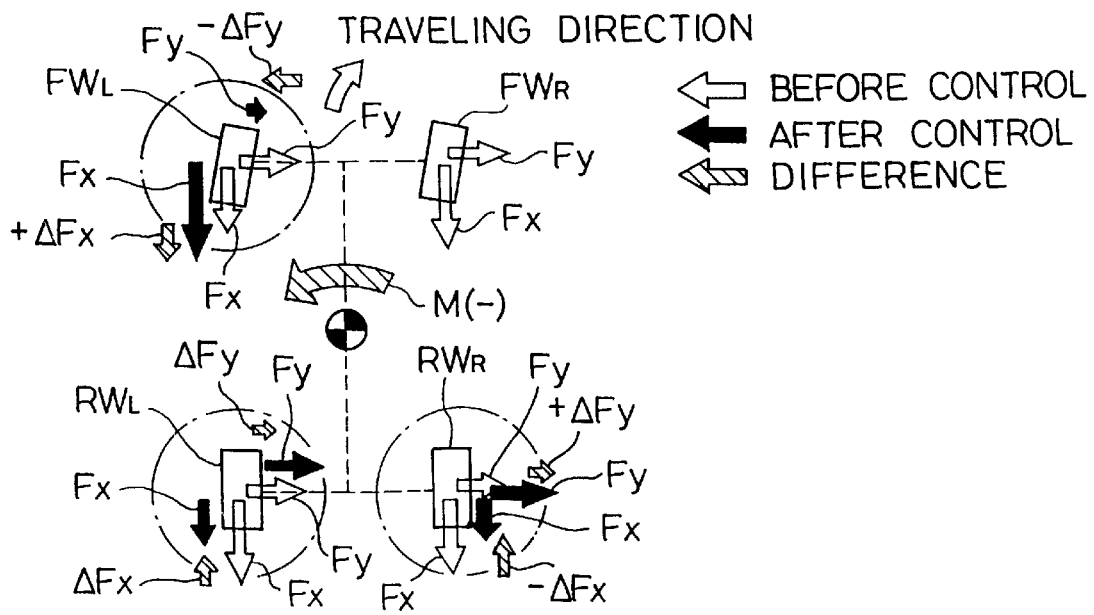
FIG. 58 is a diagram for explaining the results of the execution of the yaw moment control when the vehicle is turning to the right in an oversteer condition and the antiskid brake control is working, while braking is being applied to the vehicle.

When the vehicle is making an oversteer turn, on the other hand, the slip ratio $S_X(i)$ of the outside front wheel is corrected to increase whereas the slip ratio $S_X(i)$ of the inside rear wheel is corrected to decrease. This makes it difficult for the ABS operation to work on the outside front wheel, so that the increase in the braking force on the outside front wheel is required. The ABS is however likely to work on the inside rear wheel, so that a decrease in the braking force on the inside rear wheel is required. Specifically, when the ABS functions while the vehicle is making an oversteer right turn as shown in FIG. 58, the braking force of the right rear wheel is likely to be decreased while the braking force of the left front wheel is increased. As a result, the restoration moment M(−) can be applied to the vehicle head, thus allowing the turning behavior of the vehicle to be stabilized even during the ABS operation.

As seen from FIGS. 57 and 58, when the ABS is in operation, the braking force of the outside rear wheel as viewed in the vehicle's turning direction is reduced too (see the flowchart in FIG. 42). When the ABS is in operation, therefore, another wheel is added as the target wheel in addition to two wheels to be controlled by the yaw moment control. Thus, the insufficiency of the turning or restoration moment due to the ABS operation is compensated by reducing the braking force of the added target wheel.

As regards the actuation mode $M_{ABS0}(i)$ and the pulse width $W_{ABS0}(i)$ for the ABS cooperative control, when the driver keeps steering the steering wheel, i.e., when the driver keeps manipulating the steering wheel, "1" is set to the inhibition flag $F_{US\_INH}$ for the turning-round control as apparent from FIG. 40.

When the inhibition flag $F_{US\_INH}$ is "1" and the reference correction amount $C_{SB}$ of slip takes a negative value (understeer tendency), the slip correction amount and the pulse width $W_{F\_OUT}$ are set to "0" as has been discussed in the foregoing description of the exceptional process. In this case, the slip ratio $S_X(i)$ of the outside front wheel is not corrected, and the pulse width $W_{ABS0}(i)$ thereof is set to "0" too, inhibiting the braking force reducing control in association with the outside front wheel as shown in Step S735 in FIG. 44. Namely, when the driver is not taking any emergency avoidance of an obstruction, the yaw moment control of the vehicle is inhibited, permitting sufficient braking force to be applied to the outside front wheel.

With regard to the setting of the inhibition flag $F_{US\_INH}$, the deceleration of the vehicle is taken into account. When the vehicle has a sufficiently great deceleration, therefore, the reduction control of the braking force on the outside front wheel is inhibited so that sufficient braking force of the vehicle can be acquired.

Because the determination on whether the driver keeps steering the steering wheel is made based on the level of the effective value OAE Of the steering-wheel angle, it is possible to accurately and promptly detect the vehicle's emergency avoidance by the driver.

After the braking of the vehicle starts, specifically, the ABS works on, for example, one rear wheel, and when the time passed since the initiation of the ABS operation is within a predetermined time (e.g., 500 msec) and the vehicle is traveling straight, "1" is set to the inhibition flag $F_{REL\_INH}$ for the forced pressure reduction as illustrated in the flowchart in FIG. 40. In this case, the forced pressure reduction of the whole wheels is inhibited as has been discussed in the foregoing description of the exceptional process (see Step S737 in FIG. 44). Even when the vehicle drives on the road surface, or a so-called $\mu$ split road, which has different frictional coefficients on the right and left surface portions, the forced reduction of the brake pressures on the entire wheels based on an instruction from the yaw moment control is inhibited for the predetermined period of time after the start of the ABS operation. In other words, even when the actuation mode $M_{ABS0}(i)$ is the pressure decrease mode, the pulse width $W_{ABS0}(i)$ is set to "0". When the driver does not intend to turn the vehicle, the yaw moment control is inhibited for a period immediately after the initiation of the braking of the vehicle, specifically, for a period immediately after the initiation of the ABS operation. Thus, the ABS's brake pressure control works effectively to sufficiently effect the braking force of the vehicle.

After the passage of a predetermined time, the forced increase or decrease of the brake pressure by the yaw moment control is executed only when the required yaw moment γd gets equal to or greater than a predetermined value, i.e., when the timing flag $F_{OS}$ or $F_{US}$ is set to "1". Consequently, when the cooperation of the ABS with the yaw moment control is accomplished and the driver has no intention to turn the vehicle, the braking force of the vehicle immediately after braking can be secured sufficiently.

When the vehicle is running straight and the time passed after the initiation of the ABS operation is within a predetermined time (e.g., 500 msec), the braking forces of the right and left rear wheels are controlled in accordance with the select-low control (select-low flag $F_{S\_L}$=1) as shown in FIG. 48. Thereafter, the braking forces of the right and left rear wheels are controlled independently (select-low flag $F_{S\_L}$=0) only when the vehicle's behavior is stable. In other words, when the vehicle is running straight and the ABS operation is in the initial stage, the stability of the braking of the vehicle can be secured by controlling the braking forces of the right and left rear wheels according to the principle of the select-low, rather than by executing the yaw moment control. When the vehicle is not running straight, the braking forces of the right and left rear wheels are controlled independently so that the yaw moment control of the vehicle can cooperate with the ABS-invoked control.

Because the determination on whether the vehicle is running straight is made based on the vehicle body speed $V_B$ and the absolute value of the estimated lateral acceleration $G_{YE}$ acquired from the target yaw rate γt, it is possible to accurately determine the linear traveling of the vehicle. In other words, when the vehicle body speed $V_B$ is fast even if the target yaw rate γt is small (the absolute value of the steering-wheel angle θ is small), it is determined that the vehicle is not running straight. In this case, the braking forces of the right and left rear wheels are controlled independently.

Since the determination on whether the vehicle's behavior is stable is made on the basis of the absolute value of the yaw moment γ, this determination becomes accurate.

With regard to the selection between the actuation mode $M_{ABS}(i)$ and the pulse width $W_{ABS}(i)$ set in the cooperative control and the actuation mode My(i) and pulse width Wy(i) set in the yaw moment control (see FIG. 50), if the actuation mode My(i) under the cooperative control is not the pressure decrease mode, the actuation mode $M_{ABS}(i)$ and the pulse width $W_{ABS}(i)$ are selected as the actuation mode MM(i) and the pulse width WW(i) and the braking force of the vehicle is controlled based on those actuation mode $M_{ABS}(i)$ and the pulse width $W_{ABS}(i)$. In this case, therefore, the braking forces of the wheels do not decrease under the yaw moment control, so that the ABS operation is not adversely affected and the braking force of the vehicle can be secured sufficiently.

If the actuation mode My(i) of the target wheel under the cooperative control is the pressure decrease mode and the ABS is ready to work on the target wheel, the actuation mode My(i) and pulse width Wy(i) are selected as the actuation mode MM(i) and the pulse width WW(i) and the braking force of the vehicle is controlled based on those actuation mode My(i) and pulse width Wy(i). In this case, when the ABS works on the target wheel as the yaw moment control is carried out, the reduction of the braking force of that wheel is permitted by the yaw moment control. Therefore, the yaw moment control itself can restore the wheel slip ratio increased by the execution of the yaw moment control, thus restricting an increase in the wheel slip ratio.

In a situation where the ABS is working on three or more wheels, however, the actuation mode $M_{ABS}(i)$ and the pulse width $W_{ABS}(i)$ are selected as the actuation mode MM(i) and the pulse width WW(i) so that the reduction of the braking force of the vehicle under the yaw moment control can be inhibited. As a result, it is possible to prevent the braking force of the vehicle from being reduced during the ABS operation.

With regard to the start/end flag $F_{ABS}(i)$ (see FIG. 45), when the above-described gradual pressure increase process is performed on the wheel on which the ABS has been working, i.e., when the slip of that wheel is reduced and the end flag $F_{E\_ING}=1$ indicative of the start for the gradual pressure increase process is output from the OR gate 227, the number-of-wheels $N_{ABS}$ is supplied to the determining section 229 from the AND gate 230. When the number-of-wheels $N_{ABS}$ is equal to or smaller than "2" at this time, the determining section 229 sends out a signal indicative of the termination of the gradual pressure increase to the OR gate 228. At this point of time, the start/end flag $F_{ABS}(i)$ for the ABS is reset to "0".

The probable situation where the number-of-wheels $N_{ABS}$ is equal to or smaller than "2" is such that the braking force on the target wheel increases as the yaw moment control is performed, so that the ABS works on that target wheel. In this case, therefore, when the ABS operation is terminated, the gradual pressure increase process is not executed and the start/end flag $F_{ABS}(i)$ is immediately reset to "0". This permits the prompt return to the yaw moment control from the ABS-invoked brake pressure control.

What is claimed is:

1. A turn control apparatus for a motor vehicle, the vehicle having a set of wheels including an outside front wheel and an inside rear wheel as viewed in a turning direction of said vehicle, and equipped with an antiskid braking system, comprising:

detection means for detecting a kinetic condition of said vehicle;

turning condition determining means for determining whether the vehicle is turning in an understeer condition or an oversteer condition based on an actual yaw rate and a required yaw moment;

computation means for computing a required control amount of a braking force to be applied to each of said wheels such that a target slip ratio for each of said wheels coincides with an actual slip ratio in order to match an actual yaw rate of said vehicle with the target yaw rate;

first determining means for determining a condition prior to an activation of said antiskid braking system;

correction means for correcting the target slip ratio for each of said wheels to be controlled, when the condition prior to the activation of said antiskid braking system is determined, based on said computed required control amount, such that a target slip ratio of said outside front wheel is decreased and a target slip ratio of said inside rear wheel is increased when said vehicle is running in the understeer condition, and the target slip ratio of said outside front wheel is increased and the target slip ratio of said inside rear wheel is decreased when said vehicle is running in the oversteer condition;

second determination means for determining whether an operation of said antiskid braking system has been initiated; and control execution means for activating said antiskid braking system based on said corrected target slip ratio when said determination means determines that the operation of said antiskid braking system has been initiated.

2. The turn control apparatus according to claim 1, wherein said detection means detects at least one of driving conditions of said vehicle, from the group consisting of steering wheel angle and brake pedal stroke, and a maneuvering condition of said vehicle, from the group consisting of a vehicle body speed, slip ratio of wheels, and a center-of-gravity slip angular velocity, as said kinetic condition of said vehicle.

3. The turn control apparatus according to claim 2, wherein said correction means decreases said target slip ratio of one of said wheels when decreasing said braking force applied to said one of said wheels in accordance with yaw moment control of said vehicle.

4. The turn control apparatus according to claim 3, further comprising:

forcible alteration means for causing a control output of yaw moment control to override the control output of said control execution means with respect to said wheels to be controlled at the time that the correction by said correction means is started.

5. The turn control apparatus of claim 4, wherein said correction means corrects said target slip ratio of said wheels to be controlled before said braking force of said wheels to be controlled is controlled by said control execution means.

6. The turn control apparatus according to claim 2, wherein said correction means corrects said target slip ratio of said wheels to be controlled when the required control amount becomes equal to or greater than a predetermined value.

7. The turn control apparatus according to claim 2, wherein said computation means computes said required control amount based on at least one of a difference between a target yaw rate of said vehicle and an actual yaw rate of said vechicle and a time derivative of said difference.

8. The turn control apparatus according to claim 2, wherein said set of wheels further includes an outside rear wheel, and said correction means reduces the braking force of the outside rear wheel when the antiskid braking system is in operation.

9. The turn control apparatus according to claim 2, further comprising:

yaw moment control means for controlling said braking force of said wheels to be controlled based on said required control amount when said antiskid braking system is not activated.

10. The turn control apparatus according to claim 1, wherein said first determination means determines the condition prior to the activation of said antiskid braking system based on at least one of a vehicle body speed and a parameter indicative of slipping of the wheel.

* * * * *